US012492378B2

(12) United States Patent
Ikeya et al.

(10) Patent No.: US 12,492,378 B2
(45) Date of Patent: Dec. 9, 2025

(54) STEPWISE METHOD OF PRODUCING VARIOUS TYPES OF CELLS FROM PLURIPOTENT STEM CELLS

(71) Applicant: Kyoto University, Kyoto (JP)

(72) Inventors: Makoto Ikeya, Kyoto (JP); Taiki Nakajima, Brookline, MA (US)

(73) Assignee: Kyoto University, Kyoto (JP)

( * ) Notice: Subject to any disclaimer, the term of this patent is extended or adjusted under 35 U.S.C. 154(b) by 1207 days.

(21) Appl. No.: 16/979,956

(22) PCT Filed: Mar. 14, 2019

(86) PCT No.: PCT/JP2019/010664
§ 371 (c)(1),
(2) Date: Sep. 11, 2020

(87) PCT Pub. No.: WO2019/177118
PCT Pub. Date: Sep. 19, 2019

(65) Prior Publication Data
US 2021/0363485 A1 Nov. 25, 2021

(30) Foreign Application Priority Data
Mar. 15, 2018 (JP) ................................ 2018-048439

(51) Int. Cl.
*C12N 5/077* (2010.01)
*C12N 5/071* (2010.01)

(52) U.S. Cl.
CPC ......... *C12N 5/0652* (2013.01); *C12N 5/0625* (2013.01); *C12N 5/0654* (2013.01); *C12N 5/0655* (2013.01); *C12N 5/0658* (2013.01); *C12N 5/066* (2013.01); *C12N 2501/115* (2013.01); *C12N 2501/119* (2013.01); *C12N 2501/15* (2013.01); *C12N 2501/155* (2013.01); *C12N 2501/727* (2013.01); *C12N 2506/45* (2013.01)

(58) Field of Classification Search
None
See application file for complete search history.

(56) References Cited

FOREIGN PATENT DOCUMENTS

| WO | WO 2011025179 A2 | 3/2011 | |
|----|------------------|--------|--|
| WO | WO 2016108288 A1 | 7/2016 | |
| WO | WO 2016141084 A1 | 9/2016 | |
| WO | WO-2017032856 A2 * | 3/2017 | ............. A61K 38/16 |

OTHER PUBLICATIONS

Yang, Guang, Benjamin B. Rothrauff, and Rocky S. Tuan. "Tendon and ligament regeneration and repair: clinical relevance and developmental paradigm." Birth defects research part C: embryo today: reviews 99.3 (2013): 203-222. (Year: 2013).*
Durgam, Sushmitha S., and Matthew C. Stewart. "Tendon-derived progenitor cells: in vitro characterization and clinical applications for tendon repair." J Stem Cell Res Med 1.1 (2016): 8-17. (Year: 2016).*
Zhao, Jiangang, et al. "Small molecule-directed specification of sclerotome-like chondroprogenitors and induction of a somitic chondrogenesis program from embryonic stem cells." Development 141.20 (2014): 3848-3858. (Year: 2014).*
Nakajima, Taiki, Hidetoshi Sakurai, and Makoto Ikeya. "In vitro generation of somite derivatives from human induced pluripotent stem cells." Journal of Visualized Experiments (JoVE) 146 (2019): e59359. (Year: 2019).*
Tran et al., "Efficient Differentiation of Human Pluripotent Stem Cells into Mesenchymal Stem Cells by Modulating Intracellular Signaling Pathways in a Feeder/Serum-Free System", Stem Cells and Development, 2012, 21(7): 1165-1175.
Ahmed, M.U. et al., "Establishment of the epaxial-hypaxial boundary in the avian myotome" Dev. Dyn., 2006, vol. 235, pp. 1884-1894.
Benazeraf, B. et al, "Formation and segmentation of the vertebrate body axis" Annual review of cell and developmental biology, 2013, vol. 29, pp. 1-26.
Bernardo, A.S., et al., "BRACHYURY and CDX2 mediate BMP-induced differentiation of human and mouse pluripotent stem cells into embryonic and extraembryonic lineages", Cell Stem Cell, 2011, vol. 9, pp. 144-155.
Brent, A.E. et al. "Developmental regulation of somite derivatives: muscle, cartilage and tendon" Current opinion in genetics & development, 2002, vol. 12, pp. 548-557.
Brent, A.E. et al "A somitic compartment of tendon progenitors", Cell, 2003 vol. 113, pp. 235-248.
Buckingham, M. et al "The formation of skeletal muscle: from somite to limb" Journal of anatomy, 2003, vol. 202, pp. 59-68.
Chal, J., et al. "Differentiation of pluripotent stem cells to muscle fiber to model Duchenne muscular dystrophy" Nat. Biotechnol., 2015, vol. 33, pp. 962-969.
Chambers, S.M., et al "Highly efficient neural conversion of human ES and IPS cells by dual inhibition of SMAD signaling", Nat. Biotechnol., 2009, vol. 27, 275-280.

(Continued)

*Primary Examiner* — Kara D Johnson
*Assistant Examiner* — Constantina E Stavrou
(74) *Attorney, Agent, or Firm* — Leydig, Voit & Mayer, Ltd.

(57) ABSTRACT

Provided is a method of producing a somite cell from a pluripotent stem cell, comprising the step of culturing a pluripotent stem cell in a medium comprising a GSK3β inhibitor. Provided is a method of producing a dermatome cell from a somite cell, comprising the step of culturing a somite cell in a medium comprising a GSK3β inhibitor and BMP. Provided is a method of producing a syndetome cell from a sclerotome cell, comprising the steps of culturing a sclerotome cell in a medium comprising FGF and then culturing the cell in a medium comprising BMP and TGFβ. Provided is a method of producing a mesenchymal stromal cell from a somite cell, comprising the step of culturing a somite cell in a medium comprising FGF. Provided are methods of producing a myotome cell, a dermatome cell, a sclerotome cell, and a syndetome cell from a pluripotent stem cell through a somite cell by appropriately combining the above methods and known methods.

18 Claims, 30 Drawing Sheets

(56) References Cited

OTHER PUBLICATIONS

Chapman, S.C., et al., "Expression analysis of chick Wnt and frizzled genes and selected inhibitors in early chick patterning" Dev. Dyn., 2004 vol. 229, pp. 668-676.

Chapman, S.C., et al., "Analysis of spatial and temporal gene expression patterns in blastula and gastrula stage chick embryos", Developmental biology, 2002, vol. 245, pp. 187-199.

Chong, J.J., et al, "Human embryonic-stem-cell-derived cardiomyocytes regenerate non-human primate hearts" Nature, 2014, vol. 510, pp. 273-277.

Dey, D. et al., "Two tissue-resident progenitor lineages drive distinct phenotypes of heterotopic ossification" Science translational medicine, 2016 vol. 8, 366ra163.

Fasano, C.A., et al., "Efficient derivation of functional floor plate tissue from human embryonic stem cells" Cell Stem Cell, 2010, vol. 6, pp. 336-347.

Faure, S., et al., "Endogenous patterns of BMP signaling during early chick development" Developmental biology, 2002, vol. 244, pp. 44-65.

Fomenou, M.D. et al "Cells of all somitic compartments are determined with respect to segmental identity" Dev. Dyn., 2005, vol. 233, pp. 1386-1393.

Fukuta, M., et al., "Derivation of mesenchymal stromal cells from pluripotent stem cells through a neural crest lineage using small molecule compounds with defined media" PLoS One, 2014, vol. 9, e112291.

Galli, L.M., et al., "A proliferative role for Wnt-3a in chick somites" Developmental biology, 2004, vol. 269, pp. 489-504.

Gouti, M. et al., "A Gene Regulatory Network Balances Neural and Mesoderm Specification during Vertebrate Trunk Development", Developmental cell, 2017, vol. 41, pp. 243-261 e247.

Hardy, K.M., "FGF signalling through RAS/MAPK and PI3K pathways regulates cell movement and gene expression in the chicken primitive streak without affecting E-cadherin expression", BMC developmental biology, 2011, vol. 11, p. 20.

Hino, K., et al., "Activin-A enhances mTOR signaling to promote aberrant chondrogenesis in fibrodysplasia ossificans progressiva", The Journal of clinical investigation, 2017, vol. 127, pp. 3339-3352.

Hino, K., et al., "Neofunction of ACVR1 in fibrodysplasia ossificans progressiva" Proc. Natl. Acad. Sci U S A, 2015, vol. 112, pp. 15438-15443.

Hirsinger, E., "Noggin acts downstream of Wnt and Sonic Hedgehog to antagonize BMP4 in avian somite patterning" Development, 1997, vol. 124, pp. 4605-4614.

Hubaud, A., et al., "Signalling dynamics in vertebrate segmentation", Nature reviews Molecular cell biology, 2014, vol. 15, pp. 709-721.

Limura, T., et al., "Dual mode of paraxial mesoderm formation during chick gastrulation" Proc. Natl. Acad. Sci U S A, 2007, vol. 104, pp. 2744-2749.

Ikeya, M., et al., "Wnt signaling from the dorsal neural tube is required for the formation of the medial dermomyotome", Development, 1998, vol. 125, pp. 4969-4976.

Jiang, Y.J., et al., "Notch signalling and the synchronization of the somite segmentation clock", Nature, 2000, vol. 408, pp. 475-479.

Jouve, C., et al., "Onset of the segmentation clock in the chick embryo: evidence for oscillations in the somite precursors in the primitive streak", Development, 2002, vol. 129, pp. 1107-1117.

Kam, R.K. et al., "Retinoic acid synthesis and functions in early embryonic development". Cell & bioscience, 2012, vol. 2, p. 11.

Koyanagi-Aoi, M., et al., "Differentiation-defective phenotypes revealed by large-scale analyses of human pluripotent stem cells", Proc. Natl. Acad. Sci U S A, 2013, vol. 110, pp. 20569-20574.

Lagha, M., et al., "Transcriptome analyses based on genetic screens for Pax3 myogenic targets in the mouse embryo", BMC genomics, 2010, vol. 11, p. 696.

Lee, J.Y., et al., "BMP-12 treatment of adult mesenchymal stem cells in vitro augments tendon-like tissue formation and defect repair in vivo", PLoS One, 2011, vol. 6, e17531.

Loh, K.M., et al., "Mapping the Pairwise Choices Leading from Pluripotency to Human Bone, Heart, and Other Mesoderm Cell Types", Cell, 2016, vol. 166, pp. 451-467.

Marcelle, C., et al., "Coordinate actions of BMPs, Wnts, Shh and noggin mediate patterning of the dorsal somite", Development, 1997, vol. 124, pp. 3955-3963.

Maretto, S., et al., "Mapping Wnt/beta-catenin signaling during mouse development and in colorectal tumors", Proc. Natl. Acad. Sci U S A, 2003, vol. 100, pp. 3299-3304.

Matsumoto, Y et al., "Induced pluripotent stem cells from patients with human fibrodysplasia ossificans progressiva show increased mineralization and cartilage formation", Orphanet journal of rare diseases, 2013, vol. 8, p. 190.

Matsumoto, Y., et al., "New Protocol to Optimize iPS Cells for Genome Analysis of Fibrodysplasia Ossificans Progressiva", Stem Cells, 2015, vol. 33, pp. 1730-1742.

Moriyama, A., Kii, I., Sunabori, T., Kurihara, S., Takayama, I., Shimazaki, M., Tanabe, H., Oginuma, M., Fukayama, M., Matsuzaki, Y., et al. (2007). GFP transgenic mice reveal active canonical Wnt signal in neonatal brain and in adult liver and spleen. Genesis 45, 90-100.

Nakagawa, M., et al., "A novel efficient feeder-free culture system for the derivation of human induced pluripotent stem cells", Sci. Rep., 2014, vol. 4, p. 3594.

Nakajima, T. et al., "Modeling human somite development and fibrodysplasia ossificans progressiva with induced pluripotent stem cells", Development, Aug. 23, 2018, vol. 145, dev165431, <DOI: 10.1242/dev.165431>.

Nakashima, H. et al., "Reproduction of human segment development using human IPS cells and pathophysiology of progressive ossifying fibrodysplasia", 17th Annual Meeting of the Japanese Society of Regenerative Medicine, [online], Feb. 23, 2018, p. 767 [Retrieved on May 22, 2019], Retrieved from the Internet: <URL: http://www2.convention.co.jp/17jsrm/>.

Nimmagadda, S., et al., "BMP4 and noggin control embryonic blood vessel formation by antagonistic regulation of VEGFR-2 (Quek1) expression" Developmental biology, 2005, vol. 280, pp. 100-110.

Okita, K., et al., "A more efficient method to generate integration-free human IPS cells", Nature methods, 2011, vol. 8, pp. 409-412.

Orr-Hurteger, A. et al., "Developmental expression of the alpha receptor for platelet-derived growth factor, which is deleted in the embryonic lethal Patch mutation" Development, 1992, vol. 115, pp. 289-303.

Patwardhan, V., et al., "Acceleration of early chick embryo morphogenesis by insulin is associated with altered expression of embryonic genes", Int. J. Dev. Biol., 2004, vol. 48, pp. 319-326.

Pryce, B.A., et al., "Recruitment and maintenance of tendon progenitors by TGFbeta signaling are essential for tendon formation", Development, 2009, vol. 136, pp. 1351-1361.

Rhinn, M., et al., "Retinoic acid signaling during development" Development, 2012, vol. 139, pp. 843-858.

Sakurai, H., et al., "Bidirectional induction toward paraxial mesodermal derivatives from mouse ES cells in chemically defined medium", Stem cell research, 2009, vol. 3, pp. 157-169.

Sakurai, H., et al., "In vitro modeling of paraxial mesodermal progenitors derived from induced pluripotent stem cells", PLoS One, 2012, vol. 7, e47078.

Schwarting, T., et al., "Bone morphogenetic protein 7 (BMP-7) influences tendon-bone integration in vitro", PLoS One, 2015, vol. 10, e0116833.

Sheng, G., "The developmental basis of mesenchymal stem/stromal cells (MSCs)", BMC developmental biology, 2015, vol. 15, p. 44.

Streit. A., et al., "Establishment and maintenance of the border of the neural plate in the chick: involvement of FGF and BMP activity", Mechanisms of development, 1999. vol. 82, pp. 51-66.

Sudheer, S., et al., "Different Concentrations of FGF Ligands, FGF2 or FGF8 Determine Distinct States of WNT-Induced Presomitic Mesoderm", Stem Cells, 2016, vol. 34, pp. 1790-1800.

Sumi, T., et al., "Defining early lineage specification of human embryonic stem cells by the orchestrated balance of canonical Wnt/beta-catenin, Activin/Nodal and BMP signaling", Development, 2008, vol. 135, pp. 2969-2979.

(56) References Cited

OTHER PUBLICATIONS

Tajbakhsh, S., et al., "Differential activation of Myf5 and MyoD by different Wnts in explants of mouse paraxial mesoderm and the later activation of myogenesis in the absence of Myf5", Development, 1998, vol. 125, pp. 4155-4162.
Takada, S., et al., "Wnt-3a regulates somite and tailbud formation in the mouse embryo", Genes & development, 1994, vol. 8, pp. 174-189.
Takashi, K., et al., "Induction of pluripotent stem cells from adult human fibroblasts by defined factors", Cell, 2007, vol. 131, pp. 861-872.
Takemoto, T., et al., "Tbx6-dependent Sox2 regulation determines neural or mesodermal fate in axial stem cells", Nature, 2011, vol. 470, pp. 394-398.
Tanaka, A., et al., "Efficient and reproducible myogenic differentiation from human IPS cells: prospects for modeling Miyoshi Myopathy in vitro", PLoS One, 2013, vol. 8, e61540.
Thomson, J.A., et al., "Embryonic stem cell lines derived from human blastocysts", Science, 1998, vol. 282, pp. 1145-1147.
Umeda, K.,, et al., "Human chondrogenic paraxial mesoderm, directed specification and prospective isolation from pluripotent stem cells", Sci. Rep., 2012, vol. 2, pp. 455.
Xi, H., et al., "In Vivo Human Somitogenesis Guides Somite Development from hPSCs", Cell Rep., 2017, vol. 18, pp. 1573-1585.
Yang, G. et al., Tendon and Ligament Regeneration and Repair: Clinical Relevance and Developmental Paradigm, Birth Defects Research (Part C), Sep. 23, 2013. vol. 99, pp. 203-222, <DOI: 10.1002/bdrc.21041>.
Yoshikawa, Y., et al., "Evidence that absence of Wnt-3a signaling promotes neuralization instead of paraxial mesoderm development in the mouse", Developmental biology, 1997, vol. 183, pp. 234-242.
Yusuf, F. et al., "The eventful somite: patterning, fate determination and cell division in the somite", Anat. Embryol, Sep. 26, 2006, vol. 211, Suppl. 1, pp. S21-S30, <DOI: 10.1007/s00429-006-0119-8>.
Zhao, J., et al., "Small molecule-directed specification of sclerotome-like chondroprogenitors and induction of a somitic chondrogenesis program from embryonic stem cells", Development, 2014, vol. 141, pp. 3848-3858.
International Preliminary Report on Patentability corresponding to PCT Application PCT/JP2019/010664, mailed on Mar. 14, 2019.
International Search Report corresponding to PCT Application PCT/JP2019/010664, mailed on Jun. 4, 2019.
Liu et al., "Spatial and Temporal Expression of Molecular Markers and Cell Signals During Normal Development of the Mouse Patellar Tendon", Tissue of Engineering: Part A, 2012, vol. 18, pp. 598-608.
Brent et al., "FGF acts directly on the somitic tendon progenitors through the Ets transcription factors Pea3 and Erm to regulate scleraxis expression", Development, 2004, vol. 131, Issue 16, pp. 3885-3896.
Schweitzer et al., "Analysis of the Tendon Cell Fate Using Scleraxis, a Specific Marker for Tendons and Ligaments," Development, 128(19): 3855-3866 (2001).

\* cited by examiner

STEPWISE METHOD OF PRODUCING VARIOUS TYPES OF CELLS FROM PLURIPOTENT STEM CELLS

TECHNICAL FIELD

This application relates to a method of producing somite cells from pluripotent stem cells. This application also relates to a method of producing myotome cells, dermatome cells, sclerotome cells, syndetome cells, and mesenchymal stromal cells from pluripotent stem cells by further inducing the differentiation of the somite cells produced from pluripotent stem cells. This application also relates to a method of producing dermatome cells, syndetome cells, and mesenchymal stromal cells from somite cells.

BACKGROUND

The recapitulation of endogenous signaling environments is considered key for the induction of desired cell types from pluripotent stem cells (PSCs). Based on knowledge from developmental biology, it has been shown that Activin/Nodal/TGFβ signaling induces mesendoderm from pluripotent stem cells and BMP signaling induces mesoderm from pluripotent stem cells, whereas blockade of these signals induces neural cells (non-patent literatures 1 to 4).

Of note, it has been reported that mesoderm induced by Activin/Nodal/TGFβ signaling and BMP signaling mainly consist of lateral plate mesoderm, a lateral (ventral) subpopulation of mesoderm, but not paraxial mesoderm, a subpopulation of mesoderm formed between neural tube and lateral plate mesoderm. Although several trials have been performed to induce paraxial mesoderm by modifying Activin/Nodal/TGFβ-based protocols, it has been reported that the induction ratio remains relatively low (approximately 20%) (non-patent literature 5).

Recently, several groups have reported successful induction of paraxial mesoderm based on different ideas (non-patent literatures 6 to 9). In these reports, cells were treated without Activin/Nodal/TGFβ or with a TGFβ inhibitor to induce neural (dorsal) fate, and with a relatively high concentration of a GSK3 inhibitor (WNT signaling activator). Using these protocols, the induction rate of paraxial mesoderm reached approximately 70-95% (non-patent literatures 7 and 9). This conversion from neural to paraxial mesoderm suggests a common precursor of neural and paraxial mesoderm during embryogenesis, named neuromesoderm progenitor, axial mesoderm (non-patent literatures 10 and 11). This prediction was further supported by the fact that Wnt3a knockout mice show ectopic (secondary) neural tube rather than the loss of paraxial mesoderm (non-patent literature 12).

Despite these gains on the induction of paraxial mesoderm and its derivatives, there are several points to be addressed. During the course of vertebrate development, paraxial mesoderm first forms presomitic mesoderm (PSM) posteriorly and somite (SM) anteriorly. Somite eventually differentiates into dermomyotome (DM) dorsally and sclerotome ventrally. Dermomyotome gives rise to dermatome (D), and a precursor of dermis, and myotome (MYO), a precursor of skeletal muscle, and a subpopulation of sclerotome forms syndetome: (SYN), a precursor of tendons and ligaments (non-patent literature 14). To show the full competence of somite cells induced from pluripotent stem cells, it is important to show the multiple differentiation capacity of the induced somite cells into dermatome cells, myotome cells, sclerotome cells, and syndetome cells. Although the aforementioned reports succeeded to induce myotome cells and sclerotome cells, induction protocols for dermatome cells and syndetome cells have never been established. Moreover, lateral plate mesoderm is a major source of mesenchymal stromal cells (MSCs) (non-patent literature 15), and somite cells also could be a source of mesenchymal stromal cells. There is, however, no report that induces mesenchymal stromal cells from pluripotent stem cells through paraxial mesoderm.

CITATION LIST

Non-Patent Literature

[Non-Patent Literature 1] Bernardo, A. S., Faial, T., Gardner, L., Niakan, K. K., Ortmann, D., Senner, C. E., Callery, E. M., Trotter, M. W., Hemberger, M., Smith, J. C., et al. (2011). BRACHYURY and CDX2 mediate BMP-induced differentiation of human and mouse pluripotent stem cells into embryonic and extraembryonic lineages. Cell Stem Cell 9, 144-155.

[Non-Patent Literature 2] Chambers, S. M., Fasano, C. A., Papapetrou, E. P., Tomishima, M., Sadelain, M., and Studer, L. (2009). Highly efficient neural conversion of human ES and iPS cells by dual inhibition of SMAD signaling. Nat Biotechnol 27, 275-280.

[Non-Patent Literature 3] Fasano, C. A., Chambers, S. M., Lee, G., Tomishima, M. J., and Studer, L. (2010). Efficient derivation of functional floor plate tissue from human embryonic stem cells. Cell Stem Cell 6, 336-347.

[Non-Patent Literature 4] Sumi, T., Tsuneyoshi, N., Nakatsuji, N., and Suemori, H. (2008). Defining early lineage specification of human embryonic stem cells by the orchestrated balance of canonical Wnt/beta-catenin, Activin/Nodal and BMP signaling. Development 135, 2969-2979.

[Non-Patent Literature 5] Sakurai, H., Sakaguchi, Y., Shoji, E., Nishino, T., Maki, I., Sakai, H., Hanaoka, K., Kakizuka, A., and Sehara-Fujisawa, A. (2012). In vitro modeling of paraxial mesodermal progenitors derived from induced pluripotent stem cells. PLOS One 7, e47078.

[Non-Patent Literature 6] Chal, J., Oginuma, M., Al Tanoury, Z., Gobert, B., Sumara, O., Hick, A., Bousson, F., Zidouni, Y., Mursch, C., Moncuquet, P., et al. (2015). Differentiation of pluripotent stem cells to muscle fiber to model Duchenne muscular dystrophy. Nat Biotechnol 33, 962-969.

[Non-Patent Literature 7] Loh, K. M., Chen, A., Koh, P. W., Deng, T. Z., Sinha, R., Tsai, J. M., Barkal, A. A., Shen, K. Y., Jain, R., Morganti, R. M., et al. (2016). Mapping the Pairwise Choices Leading from Pluripotency to Human Bone, Heart, and Other Mesoderm Cell Types. Cell 166, 451-467.

[Non-Patent Literature 8] Umeda, K., Zhao, J., Simmons, P., Stanley, E., Elefanty, A., and Nakayama, N. (2012). Human chondrogenic paraxial mesoderm, directed specification and prospective isolation from pluripotent stem cells. Sci Rep 2, 455.

[Non-Patent Literature 9] Xi, H., Fujiwara, W., Gonzalez, K., Jan, M., Liebscher, S., Van Handel, B., Schenke-Layland, K., and Pyle, A. D. (2017). In Vivo Human Somitogenesis Guides Somite Development from hPSCs. Cell Rep 18, 1573-1585.

[Non-Patent Literature 10] Gouti, M., Delile, J., Stamataki, D., Wymeersch, F. J., Huang, Y., Kleinjung, J., Wilson, V., and Briscoe, J. (2017). A Gene Regulatory Network Balances Neural and Mesoderm Specification during Vertebrate Trunk Development. Developmental cell 41, 243-261 e247.
[Non-Patent Literature 11] Takemoto, T., Uchikawa, M., Yoshida, M., Bell, D. M., Lovell-Badge, R., Papaioannou, V. E., and Kondoh, H. (2011). Tbx6-dependent Sox2 regulation determines neural or mesodermal fate in axial stem cells. Nature 470, 394-398.
[Non-Patent Literature 12] Takada, S., Stark, K. L., Shea, M. J., Vassileva, G., McMahon, J. A., and McMahon, A. P. (1994). Wnt-3a regulates somite and tailbud formation in the mouse embryo. Genes & development 8, 174-189.
[Non-Patent Literature 13] Yoshikawa, Y., Fujimori, T., McMahon, A. P., and Takada, S. (1997). Evidence that absence of Wnt-3a signaling promotes neuralization instead of paraxial mesoderm development in the mouse. Developmental biology 183, 234-242.
[Non-Patent Literature 14] Brent, A. E., Schweitzer, R., and Tabin, C. J. (2003). A somitic compartment of tendon progenitors. Cell 113, 235-248.
[Non-Patent Literature 15] Sheng, G. (2015). The developmental basis of mesenchymal stem/stromal cells (MSCs). BMC developmental biology 15, 44.

SUMMARY OF INVENTION

Technical Problem

An object of the present application is to provide a method of producing somite cells from pluripotent stem cells. Another object of the present application is to provide a method of producing dermatome cells from somite cells. Yet another object of the present application is to provide a method of inducing syndetome cells from somite cells. Yet another object of the present application is to provide a method of inducing mesenchymal stromal cells from somite cells.

Another object of the present application is to provide a method of inducing myotome cells, dermatome cells, sclerotome cells, syndetome cells, and mesenchymal stromal cells from pluripotent stem cells by inducing the differentiation from the pluripotent stem cells into somite cells and inducing further differentiations from the somite cell into myotome cells, dermatome cells, sclerotome cells, syndetome cells, and mesenchymal stromal cells.

Solution to Problem

FIG. 1 shows the overall picture of the methods of the present application, except for the production of mesenchymal stromal cells. Somite cells (SM) were produced from pluripotent stem cells in vitro through presomitic mesoderm (PSM). The obtained somite cells were differentiated into dermatome (D), myotome (MYO), sclerotome (SCL) and syndetome (SYN), which are known to be induced from somite in a living body, in vitro in a stepwise manner. Each induction protocol was determined. This figure is a figure modified from the literature (Buckingham et al., 2003).

The present application provides a method of producing a somite cell from a pluripotent stem cell, comprising the following steps:
  providing a pluripotent stem cell; and
  culturing the pluripotent stem cell in a medium comprising a GSK3β inhibitor. In this aspect, the step of culturing the pluripotent stem cell in a medium comprising a GSK3β inhibitor preferably comprises the following steps:

(1) culturing the pluripotent stem cell in a medium comprising a GSK3β inhibitor to obtain a presomitic mesoderm cell culture; and
(2) culturing the presomitic mesoderm cell culture in a medium comprising a GSK3β inhibitor to obtain a somite cell culture.

The present application also provides a method of producing a dermomyotome cell from a pluripotent stem cell, comprising the following steps:
  obtaining a somite cell by the above method; and
(3) culturing the somite cell in a medium comprising a GSK3β inhibitor and BMP. Further, the present application provides a method of producing a myotome cell from a pluripotent stem cell, comprising the step of (4) culturing a dermomyotome cell obtained in (3) in a medium comprising a GSK3β inhibitor. Further differentiation of the myotome cell can be induced by a known method to obtain a skeletal muscle cell. The method of producing a skeletal muscle cell from a pluripotent stem cell through a somite cell and a myotome cell is also included in the present application.

The present application also provides a method of producing a dermatome cell from a somite cell, comprising the following steps:
  providing a somite cell; and
(5) culturing the somite cell in a medium comprising a GSK3β inhibitor and BMP. In this aspect, the somite cell may be produced from a pluripotent stem cell by the above method, or obtained by other methods. Accordingly, this aspect provides a method of producing a dermatome cell from a pluripotent stem cell. Further differentiation of the dermatome cell can be induced by a known method to obtain a dermal cell. A method of producing a dermal cell, comprising the step of inducing further differentiation of the dermatome cell obtained in this aspect is also included in the present application.

The present application also provides a method of producing a sclerotome cell from a pluripotent stem cell, comprising the following steps:
  obtaining a somite cell by the above method; and
(6) culturing the obtained somite cell in a medium comprising a sonic hedgehog activator and a BMP inhibitor. A method of obtaining bone, cartilage and like by inducing further differentiation of sclerotome cells using a known method is known. A method of obtaining bone, cartilage and like from pluripotent stem cells through sclerotome cells is also included in the present application.

The present application also provides a method of producing a syndetome cell from a sclerotome cell, comprising the following steps:
  providing a sclerotome cell;
(7-1) culturing the sclerotome cell in a medium comprising FGF; and
(7-2) culturing the cell culture obtained by the step (7-1) in a medium comprising BMP and TGFβ. In this aspect, the sclerotome cell may be produced from a somite cell by the method of the present application, in which case the somite cell may be produced from a pluripotent stem cell by the method of the present application. Accordingly, this aspect provides a method of producing a syndetome cell from a somite cell and a method of producing a syndetome cell from a pluripotent stem cell. Further differentiation of the syndetome cells can be induced by a known method to produce tendon or ligament. A method of producing tendon or ligament by obtaining the syndetome cells according to this aspect and inducing further differentiation of the obtained syndetome cells is also included in the present application.

The present application further provides a method of producing a mesenchymal stromal cell from a somite cell, comprising the following steps:
providing a somite cell; and
culturing the somite cell in a medium comprising FGF.
The somite cell in this aspect may be induced from a pluripotent stem cell by the method of the present application, or provided by other known methods. Accordingly, this aspect provides a method of producing mesenchymal stromal cells from pluripotent stem cells through somite cells.

Further differentiation of the mesenchymal stromal cells obtained in this aspect can be induced by a known method to produce cartilage, bone or adipose cells. A method of producing cartilage, bone or adipose cells by obtaining mesenchymal stromal cells and inducing further differentiation of the mesenchymal stromal cells is also included in the present application.

Effects of the Invention

According to the present application, the differentiation from pluripotent stem cells into somite cells can be efficiently induced without introducing any gene. The somite cells obtained in the present application can be further differentiated into dermomyotome cells, myotome cells, sclerotome cells, and syndetome cells. The somite cells obtained in the present application can also be differentiated into mesenchymal stromal cells.

Accordingly, myotome cells, dermomyotome cells, sclerotome cells, syndetome cells, and mesenchymal stromal cells can be produced from pluripotent stem cells through somite cells by the methods of the present application without introducing any gene. In addition, these cells can be further differentiated to obtain dermal cells, skeletal muscle cells, bone, cartilage, tendon, and ligament.

The cells produced by the method of the present application can be applied to a cell transplantation therapy. For example, the cells produced by the method of the present application are expected to be used in a cell therapy for treating a musculoskeletal disorder such as muscular dystrophy, articular cartilage defect, bone defect and tendon rupture. Further, the cells produced by the method of the present invention from the iPS cells derived from a somatic cell of a patient with a genetic disease can be used as a disease model for the disease. The dermatome cells and dermal cells obtained by the method of the present application can be used as a model for dermatological research and development of cosmetics, or used for generating a product for treating skin wound by cell transplantation or a disease model for skin disease research.

The present application also provides a method for cell transplantation therapy using the cells induced from pluripotent stem cells by the method of the present application. The method of the present application can be used for treating a musculoskeletal disorder such as muscular dystrophy, articular cartilage defect, bone defect and tendon rupture.

BRIEF DESCRIPTION OF DRAWINGS

In FIGS. 8B to 8H and 8J to 8L, Error bar: mean±SE (n=3). *p<0.05; <0.01; *<0.001 by Student's t-test. n.s, no significant difference; FOP, fibrodysplasia ossificans progressiva; resFOP, rescued FOP clone; CI, chondrogenic induction; R667, R667 10 nM; Rapa, Rapamycin 10 nM.

FIG. 8C Relative expression levels of chondrogenic markers in the cells obtained by culturing each mesenchymal stromal cells, obtained from FOP-iPS cells and resFOP-iPS cells through somite cells, under chondrogenic induction condition supplemented with Activin A for 5 days. The expression level in resFOP-iPS-derived cells is set as 1.

FIG. 8D The GAG/DNA analysis result for the DNA level in each cell culture of FIG. 8D.

FIG. 8E Relative expression levels of chondrogenic markers in the cells obtained by culturing each sclerotome cells, obtained from FOP-iPS cells and resFOP-iPS cells through somite cells, under chondrogenic induction condition supplemented with Activin A for 5 days. The expression level in resFOP-iPS-derived cells is set as 1.

FIG. 8F The GAG/DNA analysis of each cell culture of FIG. 8E.

FIG. 8G Relative expression levels of chondrogenic markers in the cells obtained by culturing mesenchymal stromal cells that were obtained from FOP-iPS cells through somite cells, under the chondrogenic induction condition supplemented with Activin A with/without R667 or Rapamycin for 5 days.

FIG. 8H The GAG/DNA analysis of the cells of FIG. 8G.

FIG. 8J The GAG/DNA analysis when each cell population of FIG. 8I was cultured under chondrogenic induction condition for 5 days.

FIG. 8K Relative expression levels of chondrogenic markers in the cells of FIG. 8J. The expression level in $PDGER\alpha^-/CD31^-$ cells is set as 1.

FIG. 8L Relative expression levels of PAIL and MMP1, both surrogate markers of aberrant FOP-ACVR1 signaling, in the cells of FIG. 8J. The expression level in $PDGFR\alpha^-/CD31^-$ cells is set as 1.

DETAILED DESCRIPTION

Figure 1:
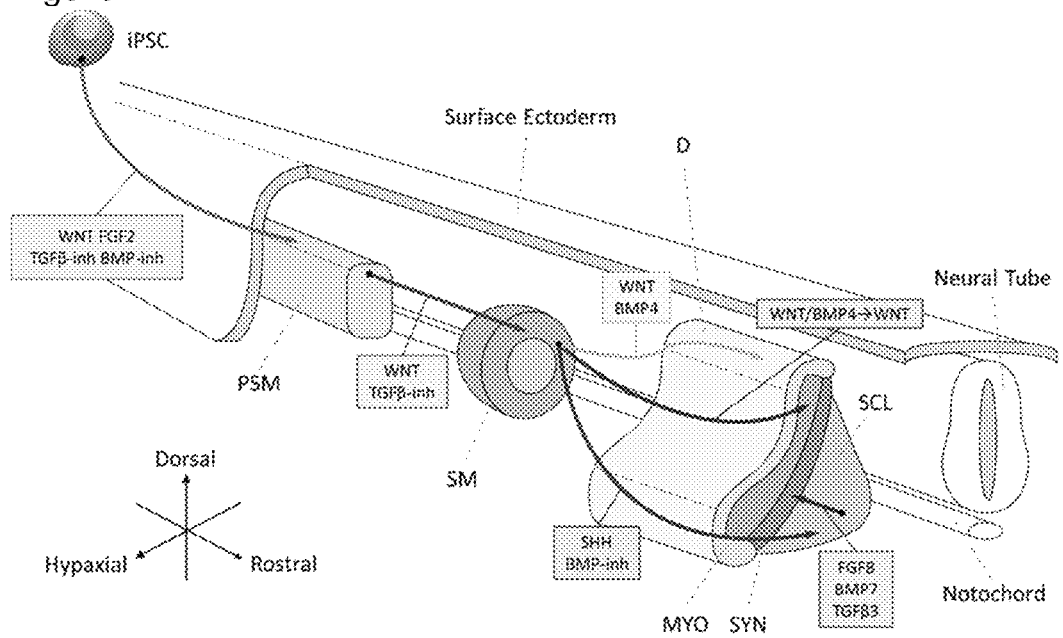
FIG. 1 Schematic view of the overall picture of the methods of the present application, except for the production of a mesenchymal stromal cell.

In the specification and claims of the present application, when a numerical value is accompanied with the term "about", the value is intended to include any value within the range of ±20%, ±158, ±10%, or ±5% of the indicated value.

The origin of the "cells" described in the specification are not particularly limited and may be human and non-human animals, for example, mice, rats, cattle, horses, pigs, sheep, monkeys, dogs, cats and birds. Human cells are preferably used.

In the methods of the present application, a basal medium for animal cell culture supplemented with necessary factors is used. Examples of basal media for animal cell culture which can be used in the present application include Iscove's modified Eagle's Medium, Ham's F12, MEM Zinc Option, IMEM Zinc Option, IMDM, Medium 199, Eagle's Minimum Essential Medium (EMEM), αMEM, Dulbecco's modified Eagle's Medium (DMEM), RPMI 1640, Fischer's medium, and a mixture thereof. The basal medium may contain serum (e.g. fetal bovine serum (FBS)) or may be a serum-free medium. If necessary, the basal medium may comprise one or more serum substitutes such as albumin, bovine serum albumin (BSA), transferrin, apo-transferrin, Knockout Serum Replacement (KSR) (Invitrogen) which is a serum substitute used for culturing an ES cell, N2 supplement (Invitrogen), B27 supplement (Invitrogen), a fatty acid, insulin, collagen precursor, a trace element, 2-mercaptethanol, 3'-Thiolglycerol, and monothiolglycerol. In addition, the basal medium may comprise one or more substances such as lipid (e.g. chemically defined lipid concentrate), an amino acid, L-glutamine, Glutamax (Invitrogen), a nonessential amino acid (NEAA), a vitamin, a growth factor, an antibiotic (e.g. penicillin and streptomycin), an anti-oxidant, pyruvic acid, a buffering agent, an inorganic salt, and equivalents thereof.

In one embodiment, a serum-free medium or a chemically defined medium (hereinafter called "CDM") is preferably used as the basal medium, except for the step of inducing mesenchymal stromal cells from somite cells described below. For example, the CDM medium is Iscove's modified Eagle's medium/Ham's F-12 1:1 (GIBCO, Grand Island, NY, USA) supplemented with 1× chemically defined lipid concentrate (GIBCO), 15 mg/ml apo-transferrin (Sigma, St. Louis, MO), 450 mM monothioglycerol (Sigma), 5 mg/ml purified BSA (99% purified by crystallization; Sigma), 7 mg/ml Insulin (WAKO), and penicillin/streptomycin (Invitrogen, Carlsbad, CA, USA). Hereinafter, "CDM basal medium" in the specification refers to the medium having this composition.

The culture may preferably be performed using a culture substrate as needed, without using feeder cells. For example, the culture substrate is Matrigel® (BD, Bedford, MA, USA), which is a commercially available extracellular matrix.

In other embodiment, the culture can be performed under xeno-free condition, except for the step of inducing mesenchymal stromal cells from somite cells described below. For example, the step of inducing presomitic mesoderm cells from pluripotent stem cells, the step of inducing somite cells from presomitic mesoderm cells, the step of inducing sclerotome cells from somite cells, and the step of inducing syndetome cells from sclerotome cells can be performed under xeno-free condition. "Xeno-free" means a medium or culture condition which does not contain the component derived from other organism than the organism species of cultured cells. The xeno-free medium is not particularly limited, but includes StemFit® AK02 Medium (Ajinomoto Co., Inc.), StemFit® AK03 Medium (Ajinomoto Co., Inc.), and CTS™ KnockOut™ SR XenoFree Medium (Gibco). For example, the xeno-free medium is AK03 medium. In xeno-free culture, a xeno-free culture substrate is preferably used with a xeno-free medium. For example, the xeno-free culture substrate is a fragment of integrin binding site (E8) in recombinant human laminin 511. Examples of the xeno-free culture substrate include iMatrix511 (Nippi Corporation), and CTS CELLstart™ Substrate (Gibco). For example, the xeno-free culture substrate is iMatrix511.

In the methods of the present application, the cells may be cultured under a condition generally employed for animal cell culture. The culture temperature is, but not limited to, about 30 to 40° C., preferably about 37° C. The culture is preferably performed under $CO_2$-containing air atmosphere. The $CO_2$ concentration is preferably about 2 to 5%.

The generation of the cells of interest in each step can be confirmed by determining the expression profile of cell surface markers on the obtained cells. The expression profile of a cell surface marker may be determined by a known method, e.g. RT-qPCR, immunocytochemistry analysis, and FACS (Fluorescence-activated cell sorting).

The cell culture obtained in each step may be purified before using it for further differentiations. The cell culture containing the cells of interest may be purified for the cells of interest and then provided. For example, the purification of the cells can be performed based on a cell surface marker. Examples of the purification procedures include the sorting by FACS using the antibody against a cell surface marker expressed or not expressed on the cell of interest.

Production of Somite Cells from Pluripotent Stem Cells

The present application provides a method of producing somite cells from pluripotent stem cells, comprising the following steps:
 providing pluripotent stem cells; and
 culturing the pluripotent stem cells in a medium comprising a GSK3β inhibitor.

A "pluripotent stem cell" refer to a stem cell which has pluripotency, that is the ability of a cell to differentiate into all types of the cell in the living body, as well as proliferative capacity. Examples of the pluripotent stem cell include an embryonic stem (ES) cell (J. A. Thomson et al., (1998), Science 282: 1145-1147; J. A. Thomson et al., (1995), Proc. Natl. Acad. Sci. USA, 92: 7844-7848; J. A. Thomson et al., (1996), Biol. Reprod., 55: 254-259; J. A. Thomson and V. S. Marshall (1998), Curr. Top. Dev. Biol., 38: 133-165), an embryonic stem cell derived from cloned embryo obtained by nuclear transfer (ntES cells) (T. Wakayama et al., (2001), Science, 292: 740-743; S. Wakayama et al., (2005), Biol. Reprod., 72: 932-936; J. Byrne et al., (2007), Nature, 450:

497-502), a germline stem cell ("GS cell") (M. Kanatsu-Shinohara et al., (2003) Biol. Reprod., 69: 612-616; K. Shinohara et al., (2004), Cell, 119: 1001-1012), an embryonic germ cell ("EG cell") (Y. Matsui et al., (1992), Cell, 70: 841-847; J. L. Resnick et al., (1992), Nature, 359: 550-551), an induced pluripotent stem (iPS) cell (K. Takahashi and S. Yamanaka (2006) Cell, 126: 663-676; K. Takahashi et al., (2007), Cell, 131: 861-872; J. Yu et al., (2007), Science, 318: 1917-1920; Nakagawa, M. et al., Nat. Biotechnol. 26: 101-106 (2008); WO 2007/069666), a pluripotent cell derived from a cultured fibroblast and a bone marrow stem cell (Muse cell) (WO 2011/007900). Preferably, a pluripotent stem cell is a human pluripotent stem cell, for example an ES cell or an iPS cell.

Preferably, iPS cells are used as material for producing cells used for a therapy or transplantation. When the cells obtained by the present application are used for a therapy, it is preferable to use iPS cells obtained from somatic cells derived from an individual whose HLA genes are same or substantially same as that of the subject who will receive the transplantation in order to avoid rejection upon transplantation. In this context, "substantially same" means the HLAs of the donor of the somatic cells match to those of the recipient to the extent that the immune reaction of the recipient against the transplanted cells can be suppressed by using an immunosuppressant. For example, the somatic cells may be derived from a donor whose three gene locus, HLA-A, HLA-B and HLA-DR, or four gene locus further including HLA-C are identical to those of the recipient to whom the cells are transplanted. Cells used for a therapy may also be produced using iPS cells induced from somatic cells derived from the patient who will receive the therapy.

As pluripotent stem cells, cells produced by a known method or commercially available cells may be used. The pluripotent stem cells stocked for research or transplantation therapy with the information of the individual from which they are derived may also be used. A project to construct a versatile iPS cell bank is now in progress in Japan by using a human having a frequent HLA haplotype in homozygous as the donor (CYRANOSKI, Nature vol. 488, 139 (2012)). The pluripotent stem cells obtained from the iPS cell bank may also be used. Methods of producing iPS cells from human somatic cells are, for example, reported in Koyanagi-Aoi et al., 2013; Nakagawa et al., 2014; Okita et al., 2011; Takahashi et al., 2007. Methods for inducing an iPS cell under complete xeno-free condition without using feeder cells are also known (Nakagawa M, et al. Scientific Reports 4:3594 (2014)). The iPS cell induced under the xeno-free condition may be used.

The pluripotent stem cells induced from a cell derived from a patient with a genetic disease may also be used. The somite cells obtained by the method of the present application from iPS cells derived from a patient with a genetic disease, and the cells further differentiated from the somite cells can be applied as disease model cells for drug discovery research and elucidation of the mechanism of the disease. For example, it is reported that iPS cells are induce from somatic cells of patients with fibrodysplasia ossificans progressiva (Matsumoto et al., 2014).

(1) Induction of the Differentiation from Pluripotent Stem Cells (PSC) into Presomitic Mesoderm Cells (PSM)

Methods for producing presomitic mesoderm cells from pluripotent stem cells are known, and any known method may be used. For example, presomitic mesoderm cells can be induced with a relatively high induction rate by culturing pluripotent stem cells in a medium containing a relatively high concentration of a GSK3β inhibitor (non-patent literatures 7 and 9: Loh et al 2016 and Xi 2017).

A GSK3β inhibitor is defined as a substance which inhibits the kinase activity of a GSK3β protein such as an ability to phosphorylate β-catenin, and many GSK3β inhibitors are known. A GSK3β inhibitor is also known as a WNT signaling activator. Examples of the GSK3β inhibitors include BIO (also called GSK-3B inhibitor IX; 6-bromoindirubin3'-oxime) which is a derivative of indirubin, SB216763 (3-(2,4-dichlorophenyl)-4-(1-methyl-1H-indol-3-yl)-1H-pyrrole-2,5-dione) and SB415286 (3-[(3-chloro-4-hydroxyphenyl)amino]-4-(2-nitrophenyl)-1H-pyrrole-2,5-dione) which are derivatives of maleimide, GSK-3β inhibitor VII (4-dibromoacetophenone) which is a phenyl a bromomethylketone compound, L803-mts (also called, GSK-3β peptide inhibitor; Myr-N-GKEAPPAPPQSpP-NH2) which is a cell-penetrating phosphorylated peptide, and CHIR99021 (6-[2-[4-(2,4-Dichlorophenyl)-5-(4-methyl-1H-imidazol-2-yl)pyrimidin-2-ylamino]ethylamino]pyridine-3-carbonitrile) which has high selectivity. These compounds are commercially and easily available, for example, from Calbiochem and Biomol. A GSK3β inhibitor may be obtained from other sources or may be produced by its user.

For example, the GSK3β inhibitor used for producing presomitic mesoderm cells from pluripotent stem cells is CHIR99021. The concentration of the GSK3β inhibitor may be appropriately determined by those skilled in the art and needs to be relatively high. When CHIR99021 is used as the GSK3β inhibitor, its concentration in the medium is for example 0.1 µM to 50 µM, preferably 1 µM to 20 µM, and more preferably about 10 µM.

The medium used for producing presomitic mesoderm cells from pluripotent stem cells may preferably further comprise at least one of a TGFβ inhibitor, a BMP inhibitor, and FGF, and most preferably all three of them.

A TGFβ inhibitor used in this specification and claims is a substance which inhibits the signal transduction starting from the binding of a TGFβ family molecule such as TGFβ, Activin and Nodal to its receptor and leading to downstream SMAD. The TGFβ inhibitor is not particularly limited as long as it inhibits the binding to the receptor, ALK family, or inhibits phosphorylation of SMAD caused by the ALK family. Examples of TGFβ inhibitors include Lefty-1 (e.g. NCBI Accession Nos: NM_010094 (mouse), and NM_020997 (human)), SB431542 and SB202190 (R. K. Lindemann et al., Mol. Cancer, 2003, 2:20), SB505124 (GlaxoSmithKline), NPC30345, SD093, SD908, SD208 (Scios), LY2109761, LY364947, LY580276 (Lilly Research Laboratories), A-83-01 (WO 2009146408), ALK5 inhibitor II (2-[3-[6-methylpyridin-2-yl]-1H-pyrazol-4-yl]-1,5-naphthyridine), TGFβRI kinase inhibitor VIII (6-[2-tert-butyl-5-[6-methyl-pyridin-2-yl]-1H-imidazol-4-yl]-quinoxaline) and derivatives thereof.

For example, the TGFβ inhibitor used for producing presomitic mesoderm cells from pluripotent stem cells is SB431542. The concentration of the TGFβ inhibitor may be appropriately determined by those skilled in the art and is not particularly limited. When SB431542 is used as the TGFβ inhibitor, its concentration in the medium is for example 0.1 µM to 50 µM, preferably 1 µM to 20 µM, and more preferably about 10 µM.

Examples of BMP inhibitors include protein inhibitors such as Chordin, Noggin and Follistatin, Dorsomorphin (6-[4-(2-piperidin-1-yl-ethoxy)phenyl]-3-pyridin-4-yl-pyrazolo[1,5-a]pyrimidine) and a derivative thereof such as DMH1 (P. B. Yu et al. (2007), Circulation, 116: II 60; P. B.

Yu et al. (2008), Nat. Chem. Biol., 4:33-41; J. Hao et al. (2008), PLOS ONE, 3 (8): e2904), and LDN-193189 (i.e. 4-(6-(4-(piperazin-1-yl)phenyl)pyrazolo[1,5-a]pyrimidin-3-yl)quinoline).

For example, DMH1 is used as the BMP inhibitor used for producing presomitic mesoderm cells from pluripotent stem cells. The concentration of the BMP inhibitor may be appropriately determined by those skilled in the art and is not particularly limited. When DMH1 is used as the BMP inhibitor, its concentration in the medium is for example 0.1 μM to 20 μM, preferably 1 μM to 5 μM, and more preferably about 2 μM.

Examples of FGF (fibroblast growth factors) include FGF2, FGF7, FGF8, and FGF10. For example, FGF2 is used as the FGF used for producing presomitic mesoderm cells from pluripotent stem cells. The concentration of the FGF may be appropriately determined by those skilled in the art and is not particularly limited. When FGF2 is used as the FGF, its concentration in the medium is for example 0.1 ng/ml to 100 ng/ml, preferably 1 ng/ml to 50 ng/ml, and more preferably about 20 ng/ml.

The culture period for producing presomitic mesoderm cells from pluripotent stem cells may be appropriately determined by those skilled in the art and is not particularly limited. The culture period may be for example 1 to 7 days, preferably 3 to 5 days, and more preferably about 4 days.

Presomitic mesoderm cells can be identified as, for example, cells expressing DLL1. When iPS cells are used as pluripotent stem cells, the production of presomitic mesoderm cells from the iPS cells can be confirmed by the lack of the expression of iPS cell-specific markers such as NANOG, OCT3/4, and SOX2, and the expression of one of presomitic mesoderm cell markers BRACHYURY, DLL1, TBX6, MSGN1, and WNT3A or a combination thereof.

The presomitic mesoderm cell culture obtained in this step may be purified and then used in the subsequent step, or may be used directly. Examples of the purification of a specific type of cells in a cell culture include the use of FACS using the antibody against a cell surface marker expressed or not expressed in presomitic mesoderm cells. One example is the sorting by FACS based on the cell surface expression of DLL1.

(2) Induction of the Differentiation from Presomitic Mesoderm Cells (PSM) into Somite Cells (SM)

Somite cells are transient stem cells that gives rise to multiple cell types such as dermatome (D), myotome (MYO), sclerotome (SCL), and syndetome (SYN). Somite cells could also be origin of mesenchymal stromal cells (MSC), which give rise to bone, cartilage and adipose postnatally.

Presomitic mesoderm cells are cultured in a medium comprising a GSK3β inhibitor to induce somite cells. The GSK3β inhibitor used for producing somite cells from presomitic mesoderm cells may be the same as described above, and for example CHIR99021. The concentration of the GSK3β inhibitor may be appropriately determined by those skilled in the art and is not particularly limited. When CHIR99021 is used as the GSK3β inhibitor, its concentration in the medium is for example 0.1 μM to 50 μM, preferably 1 μM to 20 μM, and more preferably about 5 μM.

The medium used for producing somite cells from presomitic mesoderm cells may further comprise a TGFβ inhibitor. The TGFβ inhibitor may be the same as described above, and for example SB431542. The concentration of the TGFβ inhibitor may be appropriately determined by those skilled in the art and is not limited. When SB431542 is used as the TGFβ inhibitor, its concentration in the medium is for example 0.1 μM to 50 μM, preferably 1 μM to 20 μM, and more preferably about 10 μM.

The culture period for producing somite cells from presomitic mesoderm cells is not particularly limited and may be for example 1 to 7 days, preferably 3 to 5 days, and more preferably about 4 days.

The production of somite cells can be confirmed by the appropriate combination of the expression of one or more somite cell markers such as MEOX1, PARAXIS and transcription factor PAX3 and the disappearance of the expression of one or more presomitic mesoderm cell markers.

Induction of Stepwise Differentiations from Somite Cells into Various Types of Cells (3) Induction of the Differentiation from Somite Cells (SM) into Dermomyotome Cells (DM)

Somite differentiates into dermomyotome dorsally, and dermomyotome gives rise to dermatome, a precursor of dermis, and myotome, a precursor of skeletal muscle.

Methods of producing dermomyotome cells from somite cells are known, and any known method may be used. For example, dermomyotome cells can be produced by the culture in a medium comprising a GSK3 inhibitor and BMP.

For the production of dermomyotome cells from somite cells, the somite cells used as starting material may be produced from pluripotent stem cells by the above steps (1) and (2), or obtained by another method. The somite cells may also be obtained from the living body of an animal.

The GSK3β inhibitor used for producing dermomyotome cells from somite cells may be the same as described above, and for example CHIR99021. The concentration of the GSK3β inhibitor is not particularly limited and may be appropriately determined by those skilled in the art. When CHIR99021 is used as the GSK3β inhibitor, its concentration in the medium is for example 0.1 μM to 50 M, preferably 1 μM to 20 μM, and more preferably about 5 μM.

Examples of BMP used for producing dermomyotome cells from somite cells include BMP2, BMP4, and BMP7. For example, the BMP is BMP4. The concentration of the BMP is not particularly limited and may be appropriately determined by those skilled in the art. When BMP4 is used as the BMP, its concentration in the medium is for example 0.1 ng/ml to 100 ng/ml, preferably 1 ng/ml to 50 ng/ml, and more preferably about 10 ng/ml.

The culture period for producing dermomyotome cells from somite cells is not particularly limited and may be appropriately determined by those skilled in the art. The culture period may be for example 1 to 5 days, preferably 2 to 4 days, and more preferably about 3 days. The medium may be appropriately replaced with a new one during the culture.

ALX4, EN1, NOGGIN and the like are known as dermomyotome cell markers. The production of dermomyotome cells from somite cells can be confirmed by the appropriate combination of the maintenance of PAX3, which is a common transcription factor with somite cells, the expression of one or more dermomyotome cell markers, and the disappearance of the expression of one or more somite cell markers.

The dermomyotome cell culture produced from somite cells may be directly used for the production of myotome cells or dermatome cells, or purified for dermomyotome cells and then used for producing dermatome cells. For example, the purification of dermomyotome cells is performed by FACS using the antibody against a marker known to be expressed and/or not expressed in dermomyotome cells.

(4) Induction of the Differentiation from Dermomyotome Cells (DM) into Myotome Cells (MYO)

In one aspect of this invention, provided is a method for obtaining dermomyotome cells from pluripotent stem cells by the above steps (1), (2) and (3), and then obtaining myotome cells from the dermomyotome cells. A myotome cell is a precursor of a skeletal muscle cell. For example, myotome cells can be produced by culturing dermomyotome cells in a medium comprising a GSK3β inhibitor.

The GSK3 inhibitor used for producing myotome cells from dermomyotome cells may be the same as described above, and for example CHIR99021. The concentration of the GSK3β inhibitor is not particularly limited and may be appropriately determined by those skilled in the art. When CHIR99021 is used as the GSK3β inhibitor, its concentration in the medium is for example 0.1 μM to 50 μM, preferably 1 μM to 20 μM, and more preferably about 5 μM.

The culture period for producing myotome cells from dermomyotome cells is not particularly limited and may be appropriately determined by those skilled in the art. The culture period may be for example 20 to 45 days, 25 to 40 days, or about 30 days. The medium is appropriately replaced with a new one during the culture. For example, the medium may be replaced every about 2 to 3 days.

MYOD, MYOG, PAX7 and the like are known as myotome cell markers. The production of myotome cells can be confirmed by the expression of one or more of these known markers and/or the lack of the expression of one or more dermomyotome cell markers. The obtained myotome cell culture may be purified by FACS using the antibody against a marker known to be expressed and/or not expressed in myotome cells.

The obtained myotome cells can be further differentiated to produce skeletal muscle cells. A method for inducing the differentiation from myotome cells into skeletal muscle cells is known.

(5) Induction of the Differentiation from Dermomyotome Cells (DM) into Dermatome Cells (D)

Dermatome is induced from dermomyotome and is a precursor of dorsal dermis. Dermatome cells can be produced by culturing dermomyotome cells in a medium comprising a GSK3β inhibitor and BMP. For the production of dermatome cells from dermomyotome cells, the dermomyotome cells used as starting material may be produced by step (3) from the somite cells produced from pluripotent stem cells by the above steps (1) and (2), produced from somite cells obtained by another method, or obtained by another method. The dermomyotome cells may also be obtained from the living body of an animal.

The GSK3 inhibitor used for producing dermatome cells from dermomyotome cells may be the same as described above, and for example CHIR99021. The concentration of the GSK3β inhibitor is not particularly limited and may be appropriately determined by those skilled in the art. When CHIR99021 is used as the GSK3β inhibitor, its concentration in the medium is for example 0.1 μM to 50 μM, preferably 1 μM to 20 μM, and more preferably about 5 μM.

Examples of BMP used for producing dermatome cells from dermomyotome cells include BMP2, BMP4, and BMP7. For example, the BMP BMP4. The concentration of the BMP is not particularly limited and may be appropriately determined by those skilled in the art. When BMP4 is used as the BMP, its concentration in the medium is for example 0.1 ng/ml to 100 ng/ml, preferably 1 ng/ml to 50 ng/ml, and more preferably about 10 ng/ml.

The culture period for producing dermatome cells from dermomyotome cells is not particularly limited and may be appropriately determined by those skilled in the art. In one aspect, the culture period may be for example 8 to 15 days, or about 9 days.

PDGFRα, EN1, ALX4, MSX1, COLIA2 and the like are known as dermatome cell markers. The production of dermatome cells can be confirmed by the appropriate combination of one or more of the expression of these known markers and the disappearance of the expression of dermomyotome cell markers. The obtained dermatome cell culture may also be purified by FACS using the antibody against a marker known to be expressed and/or not expressed in dermatome cells. For example, dermatome cells are purified by FACS using an anti-PDGFRα antibody.

The obtained dermatome cell can be further differentiated to produce dermal cells.

(6) Induction of the Differentiation from Somite Cells (SM) into Sclerotome Cells (SCL)

Somite differentiates into sclerotome ventrally, and sclerotome gives rise to syndetome, a precursor of tendons and ligaments. In one aspect of this invention, provided is a method for obtaining somite cells from pluripotent stem cells by the above steps (1) and (2), and then producing sclerotome cells from the somite cells.

A method of producing sclerotome cells from somite cells is known (Zhao et al., 2014). Sclerotome cells may be induced from the obtained somite cells by any known method. In one aspect, sclerotome cells are produced by culturing somite cells in a medium comprising a sonic hedgehog activator (SHH activator) and a BMP inhibitor.

Examples of sonic hedgehog activators include proteins belonging to hedgehog family (e.g. Shh and Shh-N), Shh receptors, and Shh receptor agonist (Purmorphamine, SAG). For example, SAG can be used as a sonic hedgehog activator. The concentration of the SHH activator is not particularly limited and may be appropriately determined by those skilled in the art. When SAG is used as the SHH activator, its concentration in the medium is for example 1 nM to 1 μM, preferably 10 nM to 500 nM, and more preferably about 100 nM.

The BMP inhibitor used for producing sclerotome cells from somite cells may be the same as described above, and for example LDN193189. The concentration of the BMP inhibitor is not particularly limited and may be appropriately determined by those skilled in the art. When LDN193189 is used as the BMP inhibitor, its concentration in the medium is for example 0.01 μM to 10 μM, preferably 0.1 μM to 1 μM, and more preferably about 0.6 μM.

The culture period for producing sclerotome cells from somite cells is not particularly limited and may be appropriately determined by those skilled in the art. The culture period may be for example 1 to 5 days, preferably 2 to 4 days, and more preferably about 3 days.

PAX1, PAX9, NKX3.2 and the like are known as sclerotome cell markers. The production of sclerotome cells can be confirmed by the appropriate combination of one or more of the expression of these known markers and the disappearance of the expression of somite cell-specific markers. The obtained sclerotome cell culture may also be purified by FACS using the antibody against a marker known to be expressed and/or not expressed in sclerotome cells.

(7) Induction of the Differentiation from Sclerotome Cells (SCL) into a Syndetome Cells (SYN)

The medial portion of sclerotome differentiates into syndetome, and syndetome gives rise to tendons and ligaments. In one aspect of the present application, provided is a method of producing syndetome cells from sclerotome cells, comprising the following steps:

(7-1) culturing sclerotome cells in a medium comprising FGF; and (7-2) culturing the cells obtained by the step (7-1) in a medium comprising BMP and TGFβ.

The sclerotome cells used as starting material may be induced from other cell types such as somite cells by a known method. When the sclerotome cells is produced from somite cells, the somite cells may be produced from pluripotent stem cells by the method of the present application.

Examples of FGF used for producing syndetome cells from sclerotome cells include FGF2, FGF7, FGF8, and FGF10. For example, the FGF is FGF8. The concentration of the FGF is not particularly limited and may be appropriately determined by those skilled in the art. When FGF8 is used as the FGF, its concentration in the medium is for example 0.1 ng/ml to 100 ng/ml, preferably 1 ng/ml to 50 ng/ml, and more preferably about 20 ng/ml.

Examples of BMP used for producing syndetome cells from sclerotome cells include BMP2, BMP4, and BMP7. For example, the BMP is BMP7. The concentration of the BMP is not particularly limited and may be appropriately determined by those skilled in the art. When BMP7 is used as the BMP, its concentration in the medium is for example 0.1 ng/ml to 100 ng/ml, preferably 1 ng/ml to 50 ng/ml, and more preferably about 10 ng/ml.

In step (7-1), the medium may further comprise TGFβ. Examples of TGFβ used for producing syndetome cells from sclerotome cells include TGFβ1, TGFβ2, and TGFβ3. For example, the TGFβ is TGFβ3. The concentration of the TGFβ is not particularly limited and may be appropriately determined by those skilled in the art. When TGFβ3 is used as the TGFβ, its concentration in the medium is for example 0.1 ng/ml to 100 ng/ml, preferably 1 ng/ml to 50 ng/ml, and more preferably about 10 ng/ml.

In one aspect, sclerotome cells are once taken from sclerotome cell culture, seeded in the medium for syndetome culture, and then cultured. Each culture period in the steps (7-1) and (7-2) is not particularly limited and may be appropriately determined by those skilled in the art. When the medium in the step (7-1) does not comprise TGFβ, the culture period in the step (7-1) may be for example 1 to 7 days, preferably about 3 days, and the culture period in the step (7-2) may be about 15 to 25 days, preferably about 18 days. When the medium in the step (7-1) comprises TGFβ, the culture period in the step (7-1) may be for example 1 to 5 days, preferably about 2 days, and the culture period in the step (7-2) may be about 4 to 8 days, preferably about 6 days.

SCX, MKX, COL1A1, COL1A2 and the like are known as syndetome cell markers. The production of syndetome cells can be confirmed by the appropriate combination of one or more of the expression of these known markers and the disappearance of the expression of sclerotome cell markers. The obtained syndetome cell culture may also be purified by FACS using the antibody against a marker known to be expressed and/or not expressed in syndetome cells.

(8) Induction of the Differentiation from Somite Cells (SM) into Somite Cell-Derived Mesenchymal Stromal Cells (SMMSC)

Mesenchymal stroma is known to differentiate into bone, cartilage, and adipose. A mesenchymal stromal cell is a pluripotent cell which can be obtained from multiple sites in a body such as bone marrow, adipose tissue or blood. In one aspect of the present application, provided is a method of producing mesenchymal stromal cells (somite cell-derived mesenchymal stromal cells), comprising the step of culturing somite cells in a medium comprising FGF. The somite cells may be isolated from a living body, or produced from other cell types. In one aspect, the somite cells induced from pluripotent stem cells by the above steps (1) and (2) are used.

The FGF used for producing mesenchymal stromal cells from somite cells may be the same as described above, and for example FGF2. The concentration of the FGF is not particularly limited and may be appropriately determined by those skilled in the art. When FGF2 is used as the FGF, its concentration in the medium is for example 0.4 ng/ml to 40 ng/ml, preferably 1 ng/ml to 10 ng/ml, and more preferably about 4 ng/ml. The medium used for producing a mesenchymal stromal cell from somite cells is, for example, αMEM medium. The medium used in this step preferably comprises serum. Fetal bovine serum (FBS) may be used as the serum. The serum from other animal species may also be used. For example, when the differentiation of human cells is induced, human serum may be used. The concentration of the FBS is not particularly limited and may be appropriately determined by those skilled in the art. For example, the concentration of the FBS may be about 10%.

The culture period for producing mesenchymal stromal cells from somite cells is not particularly limited and may be appropriately determined by those skilled in the art. The culture period may be for example 4 to 30 days, preferably 8 to 18 days, more preferably 10 to 15 days, and still more preferably about 12 days.

CD44, CD73, CD105, CD90 and the like are known as mesenchymal stromal cell markers. The production of mesenchymal stromal cells can be confirmed by the appropriate combination of one or more of the expression of these known markers and the disappearance of somite cell markers. The obtained mesenchymal stromal cell culture may also be purified by FACS using the antibody against a marker known to be expressed and/or not expressed in mesenchymal stromal cells.

As detailed above, the present application provides a method of obtaining somite cells from pluripotent stem cells. The somite cells obtained by the methods of the present application can further be differentiated in a stepwise manner into dermatome cells and myotome cells through dermomyotome cells and syndetome cells through sclerotome cells. The somite cells obtained by the methods of the present application can also be differentiated into mesenchymal stromal cells.

Accordingly, the present application provides a method of inducing the differentiation from a pluripotent stem cell into a myotome cell, comprising:
  inducing a presomitic mesoderm cell (PSM) from a pluripotent stem cell (PSC) according to the above (1),
  inducing a somite cell (SM) from the induced presomitic mesoderm cell (PSM) according to the above (2),
  inducing a dermomyotome cell (DM) from the induced somite cell (SM) according to the above (3), and
  inducing a myotome cell (MYO) from the induced dermomyotome cell (DM) according to the above (4).

The present application also provides a method of inducing the differentiation from a pluripotent stem cell into a dermatome cell, comprising:
  inducing a presomitic mesoderm cell (PSM) from a pluripotent stem cell (PSC) according to the above (1),
  inducing a somite cell (SM) from the induced presomitic mesoderm cell (PSM) according to the above (2),
  inducing a dermomyotome cell (DM) from the induced somite cell (SM) according to the above (3), and
  inducing a dermatome cell (D) from the induced dermomyotome cell (DM) according to the above (5).

The present application further provides a method of inducing the differentiation from a pluripotent stem cell into a sclerotome cell, comprising:
  inducing a presomitic mesoderm cell (PSM) from a pluripotent stem cell (PSC) according to the above (1),
  inducing a somite cell (SM) from the induced presomitic mesoderm cell (PSM) according to the above (2), and
  inducing a sclerotome cell (SCL) from the induced somite cell (SM) according to the above (6).

The present application further provides a method of inducing the differentiation from a pluripotent stem cell into a syndetome cell, comprising:
  inducing a presomitic mesoderm cell (PSM) from a pluripotent stem cell (PSC) according to the above (1),
  inducing a somite cell (SM) from the induced presomitic mesoderm cell (PSM) according to the above (2),
  inducing a sclerotome cell (SCL) from the induced somite cell (SM) according to the above (6), and
  inducing a syndetome cell (SYN) from the induced sclerotome cell (SCL) according to the above (7).

The present application further provides a method of inducing the differentiation from a pluripotent stem cell into a somite cell-derived mesenchymal stromal cell, comprising:
  inducing a presomitic mesoderm cell (PSM) from a pluripotent stem cell (PSC) according to the above (1),
  inducing a somite cell (SM) from the induced presomitic mesoderm cell (PSM) according to the above (2), and
  inducing a somite cell-derived mesenchymal stromal cell (SMMSC) from the induced somite cell (SM) according to the above (8).

The present application also provide a method for cell translation therapy using cells induced from pluripotent stem cells by the methods of the present application. For example, various iPS cell-derived somite-derived cells obtained in the present application can be used for the treatment of musculoskeletal disorders such as muscular dystrophy and tendon rupture. Specifically, the syndetome cells can be used for the treatment of tendon/ligament-related diseases such as ossification of longitudinal posterior ligament and fibrodysplasia ossificans progressiva, and tendon rupture.

When the iPS cell-derived syndetome cells obtained by the methods of the present application are used for the treatment of tendon/ligament-related diseases or tendon rupture, the syndetome cells may be dispersed in a biocompatible base material and then injected into the diseased/damaged site. A known biocompatible base material can be appropriately adopted as the biocompatible base material. For example, the biocompatible base material may be Matrigel. The number of the injected cells and the injection site may be appropriately determined depending on the disease/damage to be treated and are not particularly limited. For example, 1012 to 106, 101 to 107, or 1010 to 108 of the iPS cell-derived syndetome cells are injected per an injection site. If necessary, a surgical procedure such as the suture of a diseased/damaged site is also performed.

EXAMPLE

The present invention is described in more detail referring to following Examples. The present invention, however, is not limited by those Examples in any way.

Cell Culture

Human iPS cells were prepared and maintained by the methods described in Takahashi et al., 2007. Specifically, human iPS cells were maintained on SNL feeder cells in primate ES cell medium (ReproCELL, Tokyo, Japan) supplemented with 4 ng/ml FGF2 (WAKO, Osaka, Japan). Unless otherwise indicated, we used 201B7-PAX3-GFP iPS cells, in which EGFP replaces one allele of the PAX3 coding sequence of exon 1, in all experiments of Examples 1 to 5. $Pax3^{GFP/+}$ heterozygous mice having the same knock-in design were viable and fertile. The GFP expression means the endogenous Pax3 expression in mice (Lagha, M. et al., 2010). In Example 1, various iPS cell lines 201B7, TIG118-4f, 414C2, 409B2 and 1231A3, which were produced as described in Koyanagi-Aoi et al., 2013; Nakagawa et al., 2014; Okita et al., 2011; Takahashi et al., 2007, were also used to check the reproducibility due to differences in the iPS cell lines.

Medium

The composition of CDM basal medium used in Examples is as follow:
  Iscove's modified Eagle's medium/Ham's F-12 1:1 (GIBCO, Grand Island, NY, USA) supplemented with 1× chemically defined lipid concentrate (GIBCO), 15 mg/ml apo-transferrin (Sigma, St. Louis, MO), 450 mM monothioglycerol (Sigma), 5 mg/ml purified BSA (99% purified by crystallization; Sigma), 7 mg/ml. Insulin (WAKO), and penicillin/streptomycin (Invitrogen, Carlsbad, CA, USA).

Rt-qPCR Analysis

Total RNA was purified with RNeasy Kit (Qiagen, Valencia, CA) and treated with DNase-one Kit (Qiagen) to remove genomic DNA. Reverse transcription was carried out using one microgram of total RNA and Superscript III reverse transcriptase (Invitrogen), according to the manufacturer's instructions. RT-qPCR was carried out with Thunderbird SYBR qPCR Mix (TOYOBO, Osaka, Japan) and analyzed using QunatStudio12K Flex PCR system (Applied Biosystems, Forester City, CA) or StepOne real-time PCR system (Applied Biosystems).

Immunocytochemistry, Immunohistochemistry, and Histological Analysis

Prior to performing immunocytochemistry with antibodies, cells on plates were fixed with 2% paraformaldehyde at 4° C. for 10 minutes, washed twice with PBS, incubated with 0.2% MeOH (Nacalai Tesque) or 0.2% tween20 (sigma)/PBS at 4° C. for 15 minutes as the surface-active agent for penetration processing, treated with Blocking One (Nacalai Tesque) or 1% BSA/PBS at 4° C. for one hour, and treated with primary antibodies at 4° C. overnight. Next, samples were washed several times in 0.2% tween20/PBS and incubated with secondary antibodies for one hour at room temperature. DAPI (1:5000; Sigma) was used to counterstain nuclei. Immunohistochemistry of anti-Type II collagen antibody and histological analysis such as HE staining, Alcian Blue staining and Safranin O staining of induced 3DCI pellets were carried out by Center for Anatomical, Pathological. and Forensic Medical Researches, Graduate School of Medicine, Kyoto University. The observation and assessment of samples were performed with BZ-X700 (Keyence, Osaka, Japan). With respect to the immunocytochemistry of MHC, pictures were taken using the optical sectioning system of BZ-X700.

Fluorescence-Activated Cell Sorting (FACS) and Analysis

Fluorescence-activated cell sorting (FACS) was performed by AriaII (BD) according to the manufacturer's protocol. Intracellular flow cytometry analysis was also performed by AriaII (BD) according to the manufacturer's protocol. Briefly, cells were fixed and permeabilized prior to the antibody staining. The expression rate of each differentiation marker was calculated by comparing that of iPSCs or induced somite cells.

GAG (Glycosaminoglycan) Assay

The GAG content in pellets was quantified with the Blyscan™ Glycosaminoglycan Assay Kit (Biocolor Ltd., Belfast, UK). The DNA content was quantified using the PicoGreen™ dsDNA Quantitation Kit (Invitrogen).

Microarray Analysis

Total RNA was prepared using the RNeasy Mini Kit (Qiagen). CDNA was synthesized using the GeneChip® WT (Whole Transcript) Sense Target Labeling and Control Reagents Kit, as described by the manufacturer (Affymetrix, Santa Clara, CA). Hybridization to the GeneChip® Human Gene 1.0 ST expression arrays, washing, and scanning were performed according to the manufacturer's protocol (Affymetrix). Expression values were calculated using the RMA summarization method, and the data obtained were analyzed by GeneSpring GX 14.5 (Agilent Technologies, Santa Clara, CA, USA) for heatmaps and principal. component analysis (PCA). PCA analysis was done on the expression values (two-fold higher with statistical. significance). Statistical analyses were performed using a one-way ANOVA with a Benjamini and Hochberg False Discovery Rate (BH-FDR 50.01) multiple testing correction followed by Tukey HSD post hoc tests (GeneSpring GX).

Statistics

The statistical significance of all experiments was calculated by using GraphPad Prism7 (GraphPad Software, inc., La Jolla, CA, USA). P values less than 0.05 were considered as statistically significant.

Examples 1 to 4

Figure 2A:
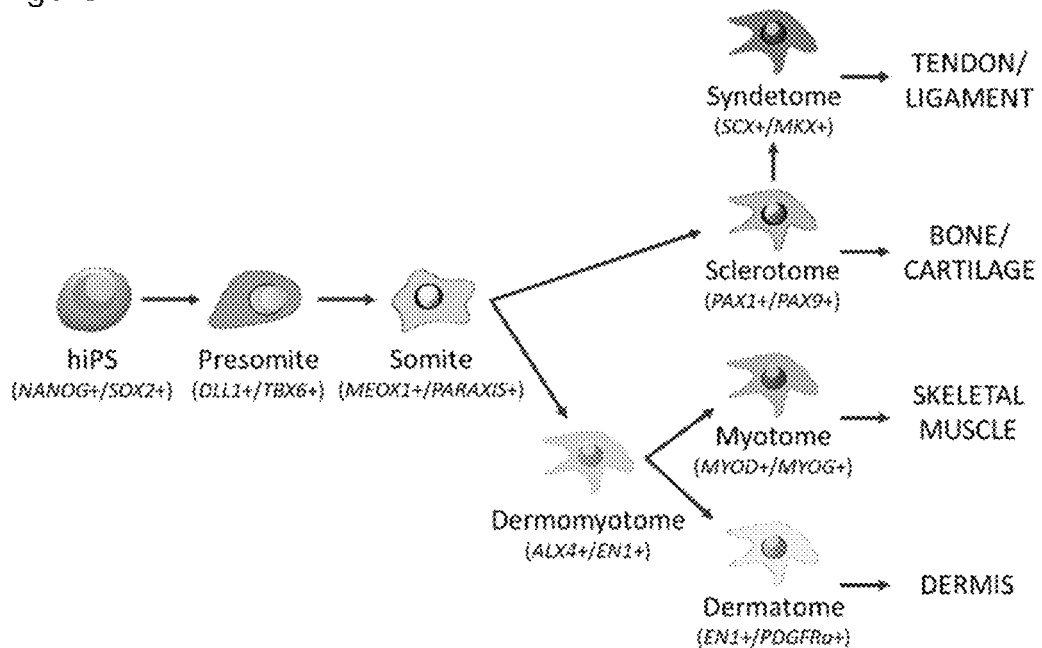
FIG. 2A Schematic view of the differentiation from human iPS cells through presomitic mesoderm (PSM) into somite cells (SM), the hierarchical differentiation from somite cells (SM) into sclerotome cells (SCL) and syndetome cells (SYN), and the hierarchical induction from somite cells (SM) through dermomyotome (DM) cells into myotome cells (MYO) and dermatome cells (D).

FIG. 2A illustrates the summary of Examples 1 to 4.

Example 1

(1) Induction of the Differentiation from Human iPS Cells into Presomitic Mesoderm Cells (PSM)

Figure 2B:
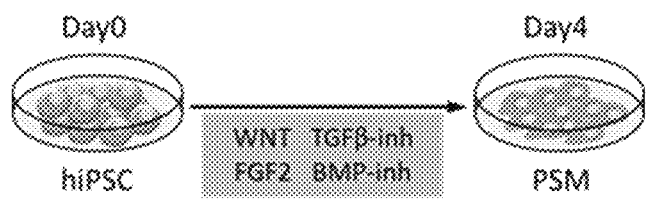
FIG. 2B shows a schematic view of a protocol for presomitic mesoderm cell (PSM) induction from human iPS cells in Example 1.

To minimize the effect of growth factors secreted from feeder cells or contained in a culture medium, SNL feeders were removed from an iPS cell culture, and human iPS cells were seeded onto matrigel (BD, Bedford, MA, USA) coated dishes ($1.3 \times 10^6$ cells/10-cm dish). The iPS cells were cultured under feeder-free condition with mTeS™1 medium (STEMCELL Technology, Vancouver, Canada) for 3 days. The iPS cells were then cultured in CDM basal medium supplemented with one of four factors or the appropriate combination of the four factors for 4 days (FIG. 2B). The added factors are as follows. When two or more factors are used in combination, each symbol is described side by side:

S: 10 µM SB431542 (TGFβ inhibitor; Sigma)
C: 10 µM CHIR99021 (GSK3β inhibitor; WAKO)
D: 2 µM DMH1 (BMP inhibitor; Tocris, Bristol, UK)
F: 20 ng/ml FGF2

Figure 2C:
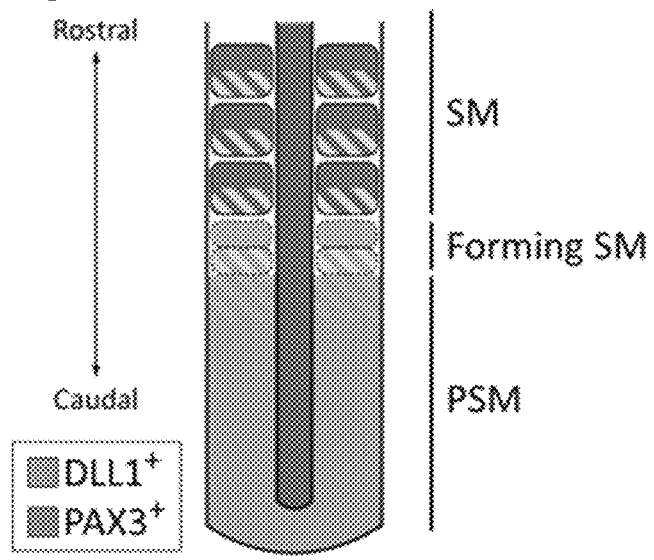
FIG. 2C shows the expression patterns of DLL1 and PAX3 in the process of the formation of somite cells (SM) from presomitic mesoderm cells (PSM).
Figure 2D:
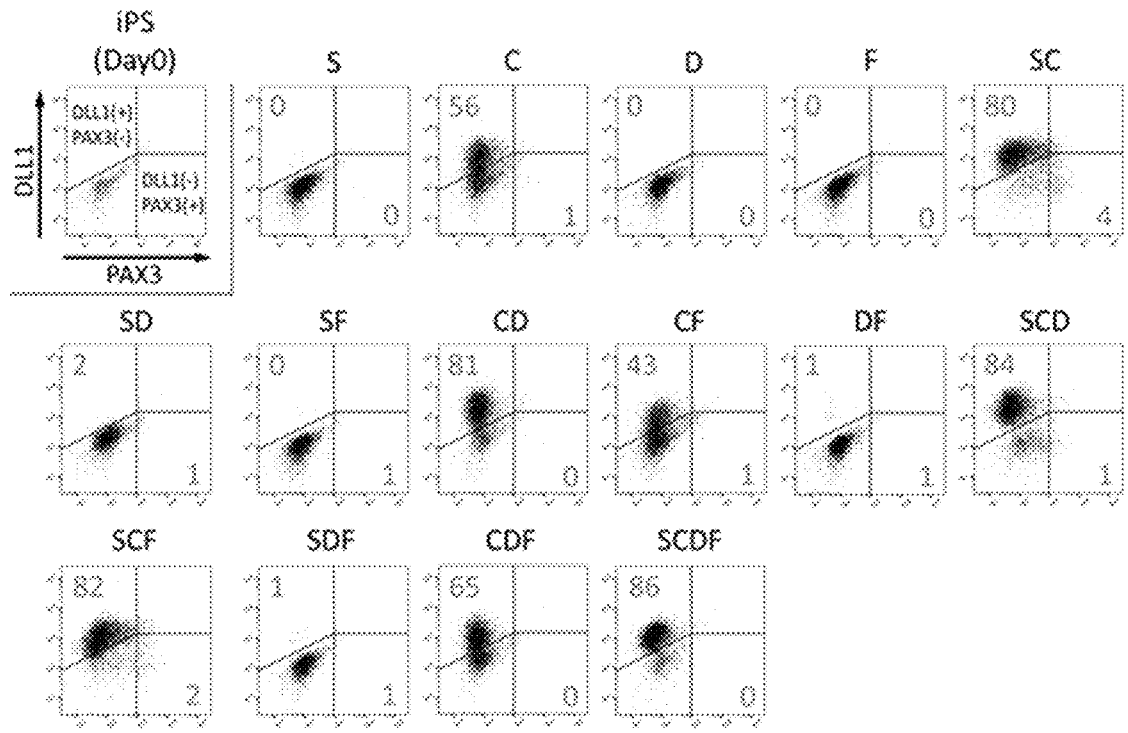
FIG. 2D Results of sorting the cells by FACS for DLL1 and PAX3-GFP, which were obtained by culturing human iPS cells under various differentiation-inducing conditions, in order to determine the optimal protocol for inducing presomitic mesoderm cells. Each symbol in this figure indicates each component added to the medium. S: SB431542 10 µM, C: CHIR99021 10 µM, D: DMH1 2 µM, F: FGF2 20 ng/ml.

The medium was changed at day 3. To detect the induction efficiency of presomitic mesoderm cells, the cell population positive for DLL1, a surface marker for a presomitic mesoderm cell and the posterior portion of somite, and negative for PAX3-GFP, showing a newly formed and segmented somite cell, were detected by FACS (FIG. 2C). Since PAX3 is a transcription factor, PAX3-GFP knock-in iPS cells (PAX3-GFP iPS cells) were used to detect PAX3-positive cells. The results are shown in FIG. 2D.

The effects of the four factors (SB431542, CHIR99021, DMH1 and FGF2) were analyzed one by one. Consistent with previous reports (Chal et al., 2015; Loh et al., 2016; Sudheer et al., 2016; Umeda et al., 2012; Xi et al., 2017), CHIR99021 efficiently induced DLL1$^+$/PAX3-GFP$^-$ cells (56.3±3.1%). Next the combination of two factors was assessed, and SB431542 or DMH1 in addition to CHIR99021 (SC or CD) was found to induce DLL1$^+$/PAX3-GFP$^-$ cells more efficiently (80.5±1.7% and 80.6±1.2%, respectively), while FGF2 with CHIR99021 (CF) conversely suppressed the efficiency (42.7±1.1%). SB431542 and CHIR99021 in combination with DMH1 (SCD) induced DLL1$^+$/PAX3-GFP$^-$ cells nearly maximally (83.8±1.1%), but DLL1$^-$/PAX3-GFP$^+$ cells also appeared, suggesting that cells differentiate to PAX3$^+$ somite cells and/or neural cells in this condition.

Next, we added all four molecules (SCDF) and cultured the cells. We found that under this condition, DLL1$^+$/PAX3-GFP$^-$ cells were induced from PAX3-GFP iPS cells without PAX3-GFP$^+$ cells (85.4±0.4%). Even though there's no obvious difference among SCD, SCF and SCDF in terms of the induction efficiency of DLL1$^+$ cells, SCDF recapitulates accurate endogenous signaling environment, and therefore we employed SCDF condition for further analyses.

The induction of presomitic mesoderm cells under SCDF condition was also confirmed by immunohistochemistry with anti-TBX6, BRACHYURY and CDX2 antibodies (data not shown).

Figure 2E:
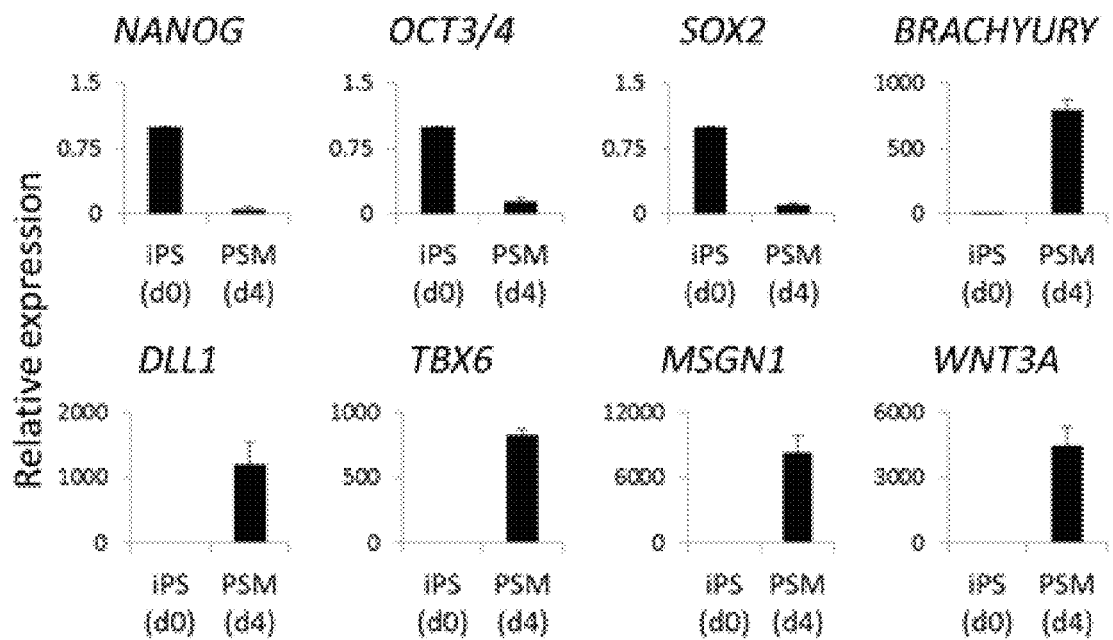
FIG. 2E shows the results of RT-qPCR analysis for iPS cell markers and presomitic mesoderm cell markers of iPS cells and the cells cultured in the medium for presomitic mesoderm cell induction for 4 days. The gene expressions of the cells obtained by sorting each cell culture for DLL1 were analyzed. Error bar indicates mean±SE (n=3).
Figure 2F:
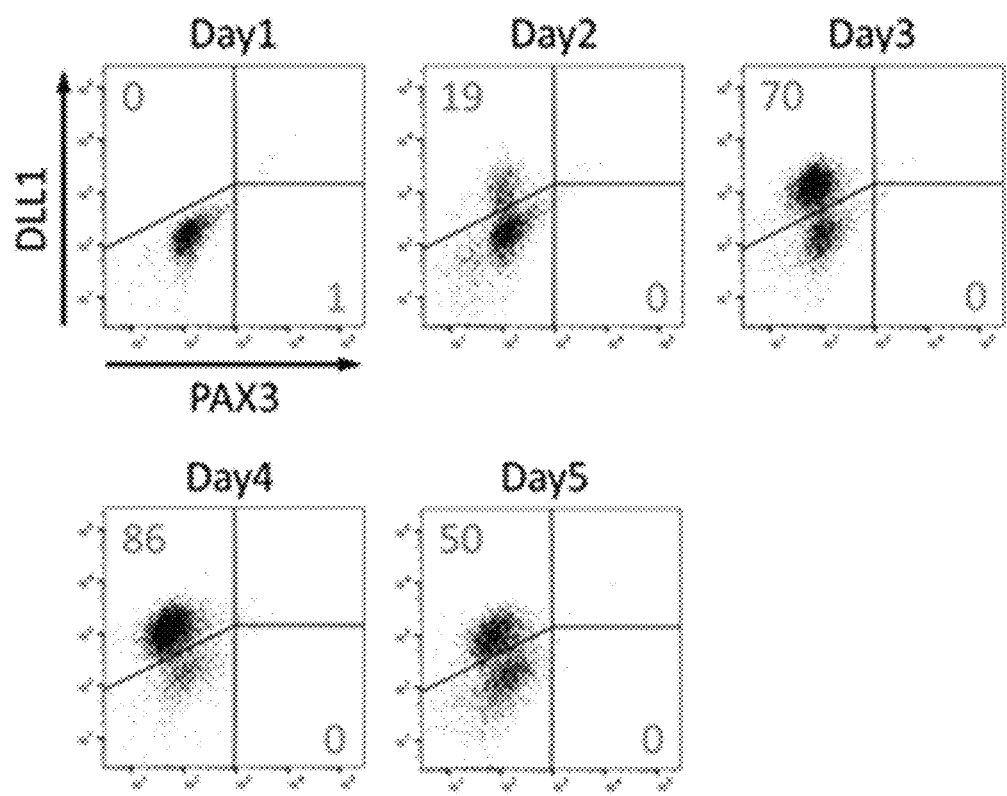
FIG. 2F Results of investigating the optimum culture period for presomitic mesoderm cell induction from iPS cells. The expressions of DLL1 and PAX3 in the cultured cells obtained by culturing iPS cells under SCDF condition (FIG. 2D) for 1 to 5 days were analyzed by FACS.

We determined the relative expression levels of iPS cell markers (NANOG, OCT3/4, and SOX2) and presomitic mesoderm cell markers (BRACHYURY, DLL1, TBX6, MSGN1, and WNT3A) by RT-qPCR before and after the culture in SCDF condition for 4 days. The results are shown in FIG. 2E. When the culture period under SCDF condition was 1 to 5 days, the induction efficiency of DLL1$^+$/PAX3-GFP$^-$ cells peaked at day 4 (FIG. 2F).

Figure 2G:
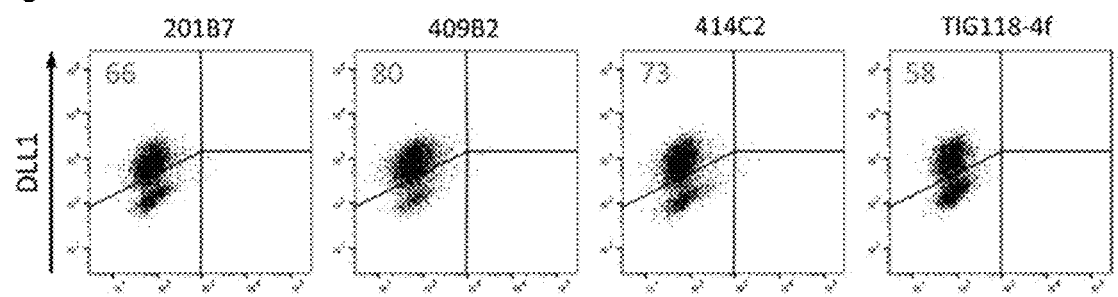
FIG. 2G The expression of DLL1 in the cultured cells obtained by culturing different iPS cell lines under SCDF condition (FIG. 2D) for 4 days was analyzed by FACS.
Figure 2H:
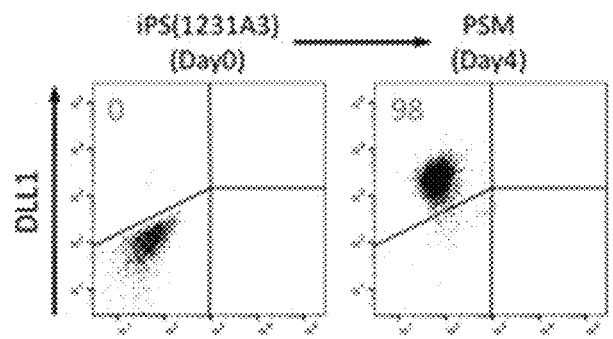
FIG. 2H The expression of DLL1 in the cultured cells obtained by culturing 1231A3, an iPS cell line maintained under serum-free and feeder-free condition, under SCDF condition (FIG. 2D) for 4 days was analyzed by FACS.

To confirm the robustness of the protocol, we determined the induction efficiency of DLL1$^+$ cells from other iPS cell clones (201B7, 409B2, 414C2, TIG118-4f, and 1231A3). Each iPS cell clone was cultured under SCDF condition for 4 days and then analyzed by FACS. The results are shown in FIGS. 2G and 2F. DLL1+ cells were obtained from all types of iPS cell clones with high efficiency. We also found the induction of DLL1+ cells from 1231A3, an iPS cell line maintained in a feeder-free and serum-free medium.

(2) Induction of the Differentiation from Presomitic Mesoderm Cells (PSM) into Somite Cells (SM)

Figure 3A:
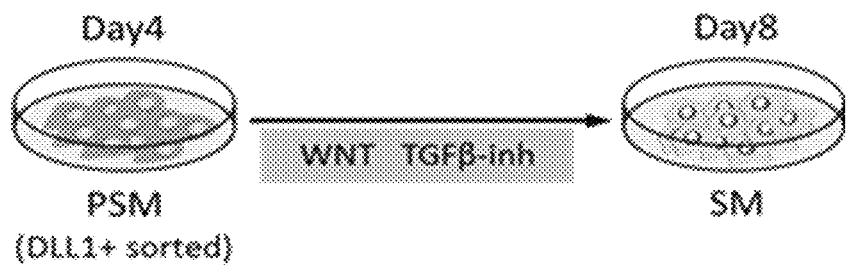
FIG. 3A Schematic view of a protocol for somite cell induction from presomitic mesoderm cells in Example 2.

IPS cells were cultured in SCDF condition of Example 1 for 4 days, and a total of $1.0 \times 10^5$ DLL1$^+$ presomitic mesoderm cells sorted by FACS were seeded onto one well of a matrigel-coated 12-well plate and subsequently underwent the induction of somite cells (FIG. 3A). The induction of somite cells was carried out for 4 days in CDM basal medium supplemented with SB431542 and/or 5 µM CHIR99021. The medium was changed at day 3 of the induction of somite cells. The expression of PAX3-GFP was used as a somite cell marker.

Figure 3B:
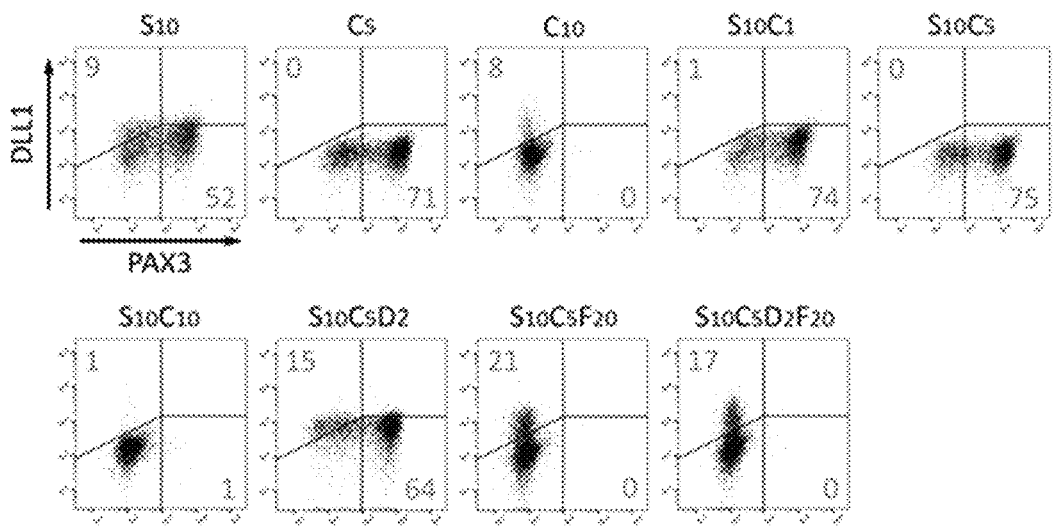
FIG. 3B The expressions of DLL1 and PAX3-GFP in the cells cultured in the mediums comprising various concentrations of C and S for 4 days were analyzed by FACS. S10: SB431542 10 µM, C1, C5, and C10: CHIR99021 1, 5, and 10 µM, respectively, D2: DMH1 2 µM, F20: FGF2 20 ng/ml.

The added factors and their concentrations are as follows:
S10: SB431542 10 µM
C1: CHIR99021 1 µM
C5: CHIR99021 5 µM
C10: CHIR99021 10 µM
D2: DMH1 2 µM
F20: FGF2 20 ng/ml
I10: IWR1 10 µM The results are shown in FIG. 3B. After four days culture, either 10 µM SB431542 (S10) or 5 µM CHIR99021 (C5) efficiently induced PAX3-GFP$^+$ cells (52.1±0.8% or 70.7±0.1%, respectively), and the treatment of both compounds (S10C5) maximized the induction of somite cells (74.7±0.5%). However, higher amounts of CHIR99021 (10 µM) conversely failed to induce PAX3-GFP$^+$ cells (0.3±0.0% in C10, and 0.7±0.1% in S10C10), suggesting that excess WNT signaling suppresses the induction of somite cells. Additionally, the effects of FGF and BMP inhibition were also assessed, and 10 µM SB431542 and 5 µM CHIR99021 (S10C5) were found to induce PAX3-GFP$^+$ cells most efficiently from presomitic mesoderm cells.

Similar to the results obtained by FACS shown in FIG. 3B, PARAXIS-expressing cells, indicating somite cells (SM), were found in C4, S10C1, S10C5 and S10C5D2 by immunohistochemistry using anti-PARAXIS (TCF15) antibody, and the ratio of the cells was highest in the S10C5 group.

Figure 3C:
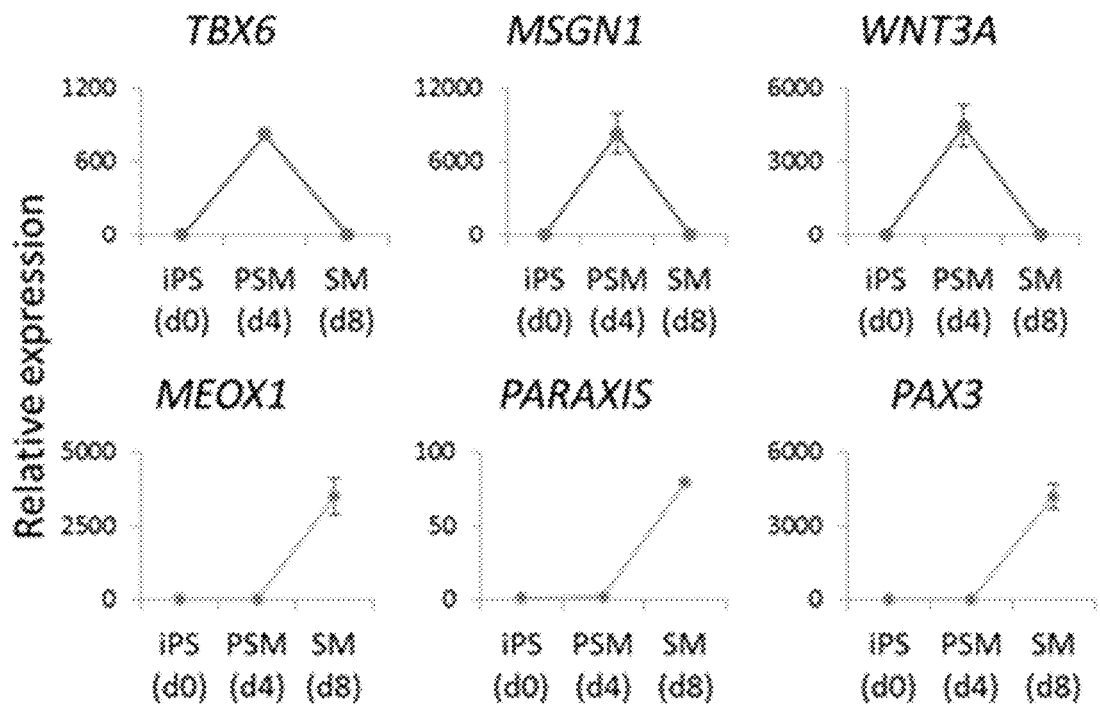
FIG. 3C The expressions of cell markers before and after the induction in the step of inducing somite cells from presomitic mesoderm cells were analyzed by RT-qPCR. Error bar: mean±SE (n=3).

The expression levels of presomitic mesoderm cell markers (TBX6, MSGN1 and WNT3A) and somite cell markers (MEOX1, PARAXIS and PAX3) were determined by RT-qPCR before and after the induction in S10C5 conditions. The results are shown in FIG. 3C. The somite cell markers also peaked at day 4 of the somite cell induction, i.e. day 8 from iPS cells. Immunocytochemistry with anti-TBX6, PARAXIS and MEOX1 antibodies and the fluorescence due to PAX3-GFP expression before and after the induction in the same condition showed similar results to those in FIG. 3C.

Figure 3D:
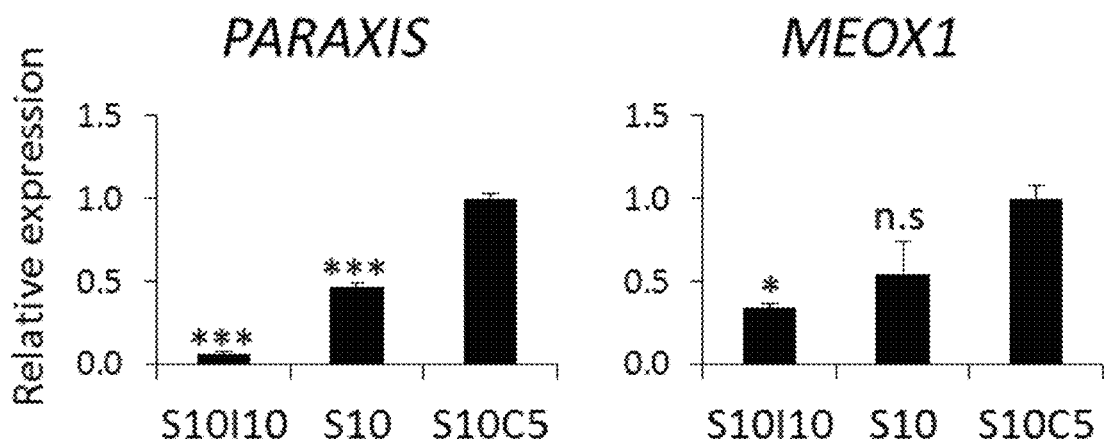
FIG. 3D The expressions of somite cell-specific cell marker genes at day 4 of somite cell induction (day 8 from the start of culturing iPS cells) were analyzed by RT-qPCR. Error bar: mean±SE (n=3). S10: SB431542 10 µM, I10: IWR1 10 µM, C5: CHIR99021 5 µM. *p<0.05; ***p<0.001 (Dunnett's multiple comparisons t-test). n.s: no significant difference.

Presomitic mesoderm cells were cultured in S10I10, S10 or S10C5 condition for 4 days. The expression levels of somite markers PARAXIS and MEOX1 in obtained cells were determined by RT-qPCR. The results are shown in FIG. 3D. PARAXIS and MEOX1 expressions were highly induced with CHIR99021.

The expression of CDH11, a marker for an epithelial somite cell, was determined by immunohistochemistry. CDH11 expression was found in the cell-cell junction only in the condition with CHIR99021 (S10C5).

Due to the low survival of the PAX3$^+$ cells after FACS sorting, obtained cells were used in Example 3 without sorting.

Example 3

Induction of Myotome Cells (MYO) and Dermatome Cells (D) Through Dermomyotome Cells (DM) from Somite Cells (SM)

Figure 4A:
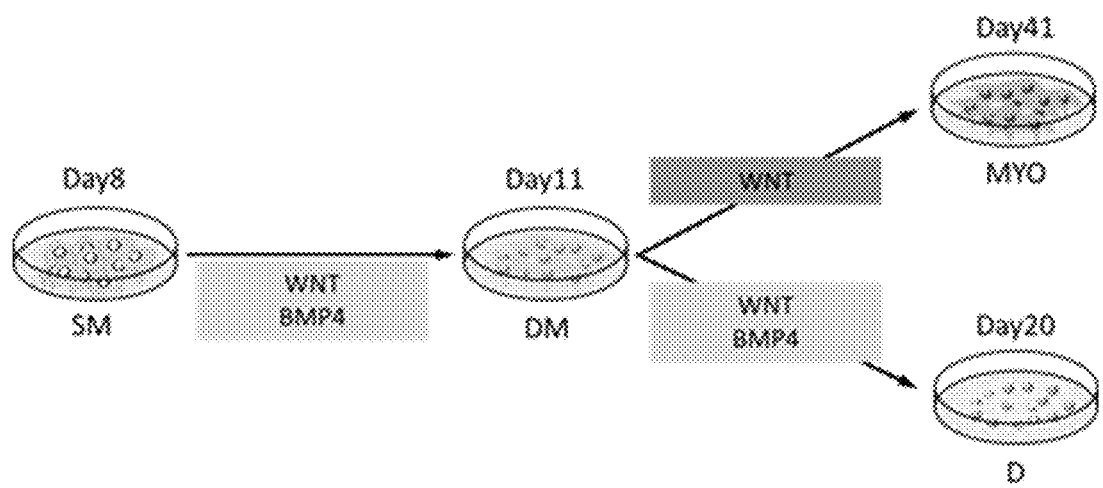
FIG. 4A Schematic view of protocols for inducing directed differentiation from somite cells (SM) through dermomyotome cells (DM) into myotome cells (MYO) and dermatome cells (D) in Example 3.

FIG. 4A illustrates the summary.

(3) Induction of Dermomyotome Cells (DM) from Somite Cells (SM)

The culture was further continued by replacing the medium used for the somite cell induction with the medium for the dermomyotome cell induction. Ten micromolar of IWR1 (Cayman chemical, Michigan, USA) (I10) or CHIR99021 (0, 0.1, 1 and 5 µM) (C0, C0.1, C1 and C5) was used to inhibit or activate WNT signaling. BMP4 (R&D, Minneapolis, KA, USA) (0, 0.1, 1 and 10 ng/ml) (B0, B0.1, B1 and B10) and 10 µM of DMH1 (Tocris) (D10) were used to regulate BMP activity.

The medium of the somite cell culture obtained in Example 2 was replaced with CDM basal medium supplemented with the factor for regulating WNT signaling and the factor for regulating BMP activity, and the cell culture was further cultured to induce dermomyotome cells. The culture was performed for 3 days, and the medium was changed at day 2.

Figure 4B:
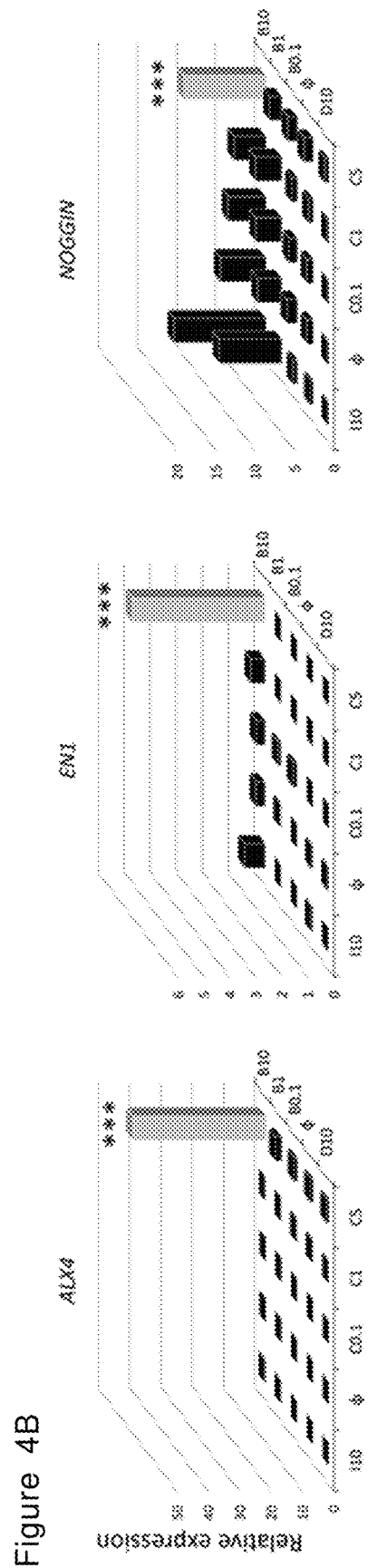
FIG. 4B The expressions of various marker genes were analyzed by RT-qPCR at day 3 of culturing somite cells (SM) in dermomyotome cell induction media supplemented with various concentrations of CHIR99021 and BMP4. ***p<0.001 by Dunnett's multiple comparisons t-test compared with no additional supplement control (¢, ¢).
Figure 4C:
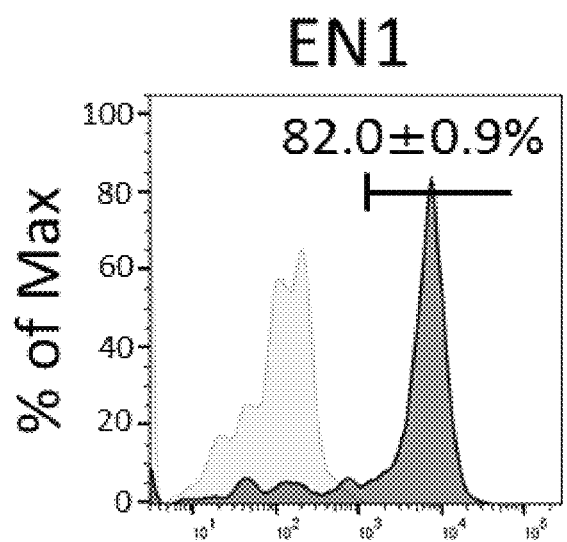
FIG. 4C The expression of EN1, which is an indicator of differentiation into dermomyotome cells, was analyzed by FACS using iPS cells as control. Error bar: mean±SE (n=3).

The relative expression level of dermomyotome cell markers ALX4, EN1 and NOGGIN in the cells after 3 days of the culture was determined by RT-qPCR. The results are shown in FIG. 4B. These dermomyotome cell markers were most induced when the concentrations of both of the GSK3β inhibitor, which is the WNT signal activator, and the BMP activator were high. The generation of dermomyotome cells in obtained cells was also confirmed by immunocytochemistry with anti-ALX4 and EN1 antibodies and PAX3-GFP, which is expressed in both of somite cells and dermomyotome cells. In addition, the generation of dermomyotome cells was confirmed by FACS using anti-EN1 antibody (FIG. 4C).

(4) Induction of Myotome Cells (MYO) from Dermomyotome Cells (DM)

Figure 4D:
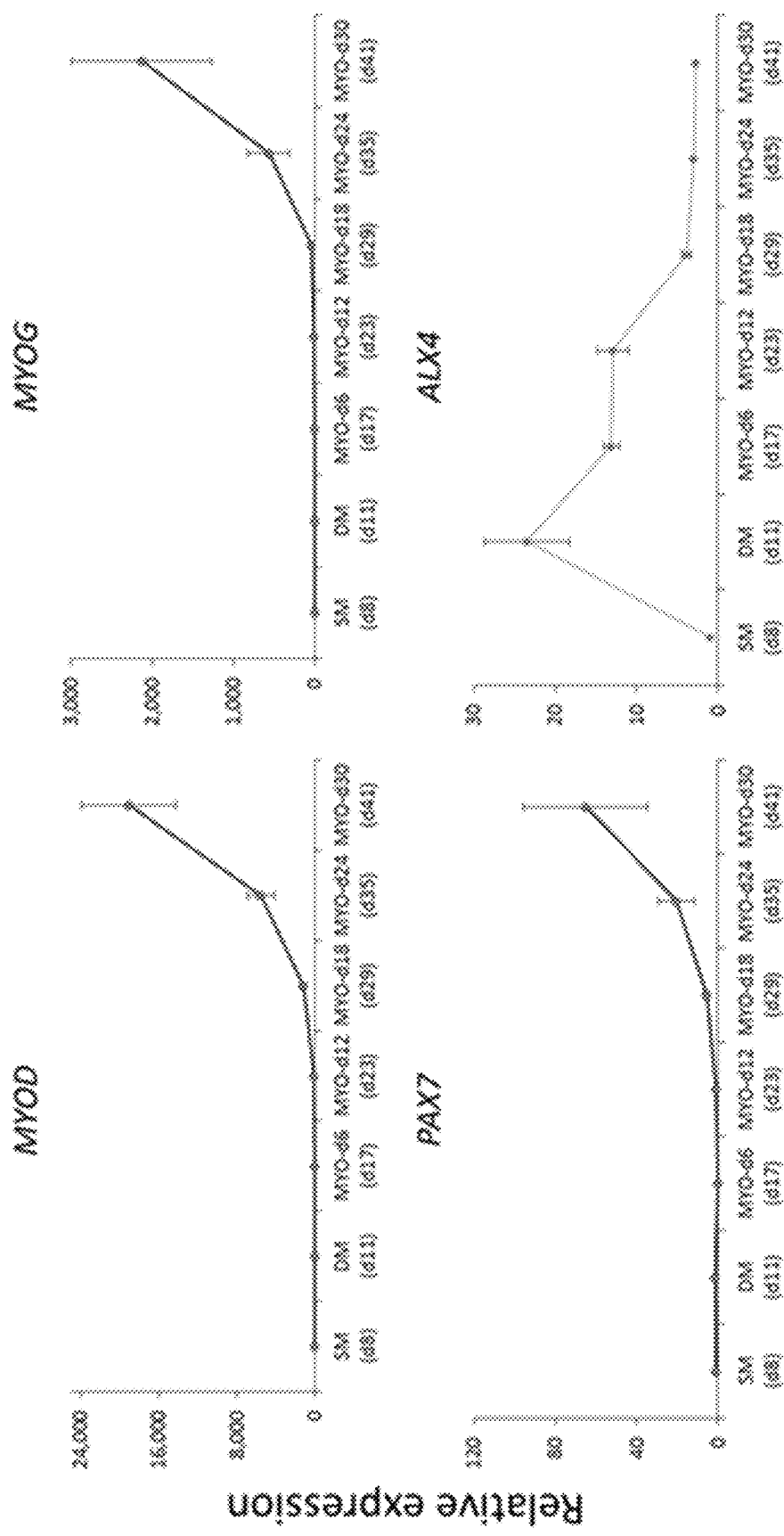
FIG. 4D In the progress of the differentiation into myotome cells, the expression levels of myotome cell markers MYOD, MYOG, and PAX7, and a dermomyotome cell marker ALX4 gene were measured by RT-qPCR. Error bar: mean±SE (n=3).

We next tried to induce myotome cells directly from dermomyotome cells obtained in the above (3). The medium of the dermomyotome cell culture obtained in (3) was replaced with CDM basal medium supplemented with 5 µM of CHIR99021, and the cell culture was further cultured. The medium was changed every 3 days, and the culture was performed for 30 days. A small amount of cultured cells was collected every 6 days, and the expression of myogenic markers MYOD, MYOG and PAX7 was examined over time. Induction of the myogenic markers was found 18 to 30 days after the replacement of the medium. On the other hand, the expression of the dermomyotome cell marker ALX4 was decreased in a time dependent manner (FIG. 4D). The expression of MYOD and MYOG was also determined by immunocytochemistry. The induction efficiency from dermomyotome cells into myotome cells was estimated at approximately 22% based on the number of MYOD- and MYOG-positive cells.

(5) Induction of Dermatome Cells (D) from Dermomyotome Cells (DM)

Figure 4E:
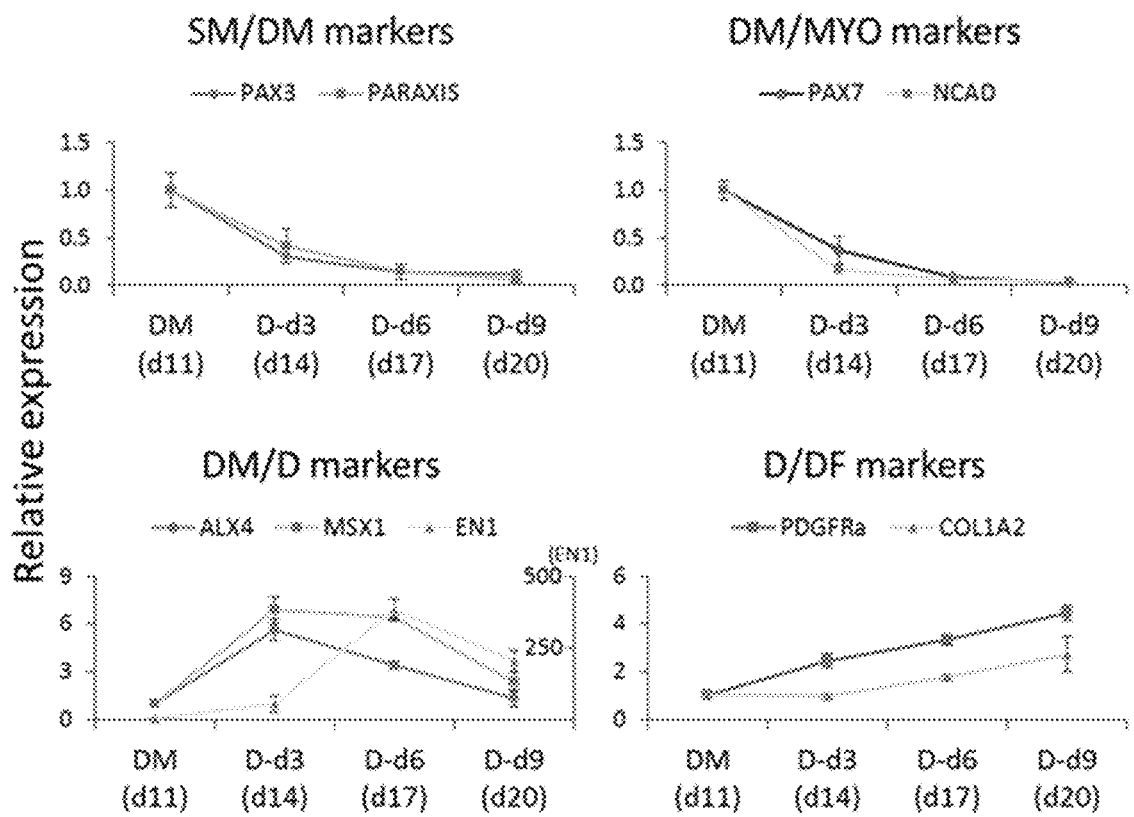
FIG. 4E Temporal changes in the expression levels of marker genes for somite cells (SM), dermomyotome cells (DM), dermatome cells (D), myotome cells (MYO), and dermal fibroblasts (DF) were analyzed by RT-qPCR. The right vertical axis in the lower left graph (DM/D marker) indicates the relative expression level of EN1. Error bar: mean±SE (n=3).
Figure 4F:
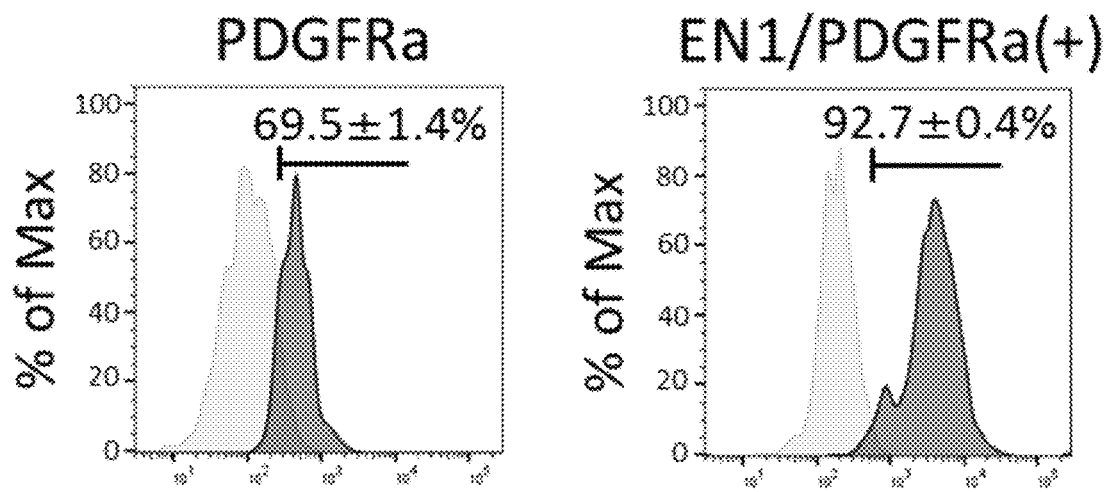
FIG. 4F The expressions of EN1 and PDGFRa were examined by FACS at day 9 of the induction from dermomyotome cells (DM) into dermatome cells (D). The mean±SE from three sets of experiments is indicated. IPS cells were used as control populations. Error bar: mean±SE (n=3).

Dermomyotome cells differentiate into dermatome cells in a living body, and dermatome cells differentiate into the dermis of the back. However, the induction protocol of the dermis through dermatome cells from dermomyotome cells in vitro is not established. The culture was continued in the dermomyotome cell induction medium (C5B10) of the above (3) without passage, from day 11 (day 3 from somite cells) and after the formation of the dermomyotome cells. The expressions of various cell markers were examined by RT-qPCR. As a result, the expression levels of PAX3 and PARAXIS (dermomyotome cell and somite cell markers: SM/DM markers) and PAX7 and NCAD (dermomyotome cell and myotome cell markers: DM/MYO markers) were decreased 6 days after the production of the dermomyotome cells (the upper side of FIG. 4E). The induction of dermatome cells from dermomyotome cells was then performed by further culturing dermomyotome cells in the dermomyotome cell induction medium (i.e. the medium in the above (3)). After the production of dermomyotome cells, the cells were further cultured for 9 days. The medium was changed every 3 days. It is known that PDGFRα is expressed in a dermatome cell (D) and a dermal fibroblast (DF) (Orr-Urtreger et al., 1992), and EN1 is expressed in a dermatome cell (D) and a dermomyotome cell (DM) (Ahmed et al., 2006). We checked the expression of PDGFRα and EN1 by RT-qPCR (the lower side of FIG. 4E) and immunocytochemistry (data not shown) and found that these markers were mostly expressed at day 9 of the step of the dermatome cell induction. The expressions of ALX4 and MSX1 (dermomyotome cell and dermatome cell markers: DM/D markers) and COL1A2 (dermatome cell and dermal fibroblast marker: D/DF marker) were also upregulated at day 9 of the step of the dermatome cell induction (the lower side of FIG. 4E). FACS analysis with anti-PDGFRA and anti-EN1 antibodies revealed that 69.5±1.4% of the dermatome cell culture were PDGFRα$^+$, and 92.7±0.4% of the PDGFRα$^+$ cells were EN1' (FIG. 4F), showing the induction of dermatome cells (D).

Example 4

Induction of the Differentiations of Chondrocytes, Osteocytes and Syndetome Cells (SYN) Through Sclerotome Cells (SCL) from Somite Cells (SM)

Figure 5A:
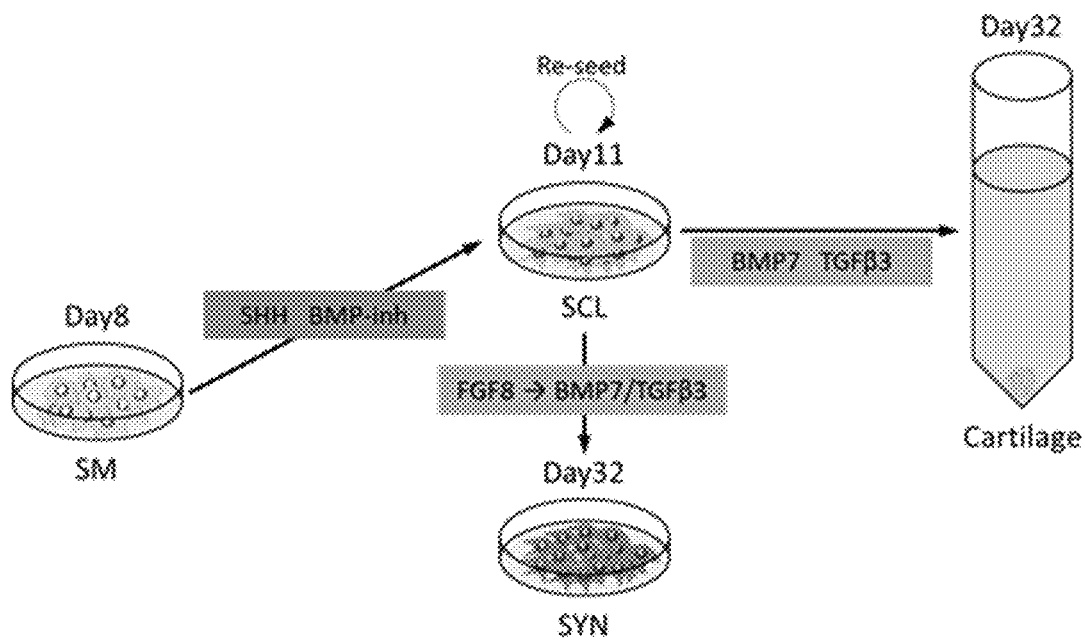
FIG. 5A Schematic view of protocols for the induction from somite cells (SM) into sclerotome cells (SCL), and the induction from sclerotome cells into syndetome cells (SYN) and cartilage.

FIG. 5A illustrates the summary.

(6) Induction of the Differentiation of Sclerotome Cells from Somite Cells

The induction of sclerotome cells from somite cells was performed by a known method (Zhao et al., 2014). Specifically, the somite cell induction medium was replaced with the sclerotome cell induction medium, which contains 100 nM SAG (SHH activator; Calbiochem, La Jolla, CA, USA) and 0.6 µM LDN193189 (BMP inhibitor; Stemgent, Cambridge, MA, USA) in CDM basal medium. The culture was performed for three days and the medium was changed at day 2.

Figure 5B:
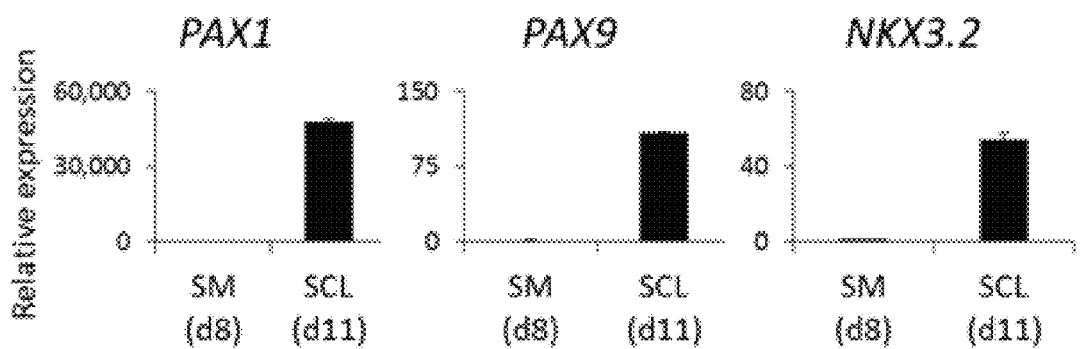
FIG. 5B The expression levels of sclerotome cell marker genes (PAX1, PAX9, and NKX3.2) were examined by RT-qPCR at day 4 of the induction from somite cells (SM) into sclerotome cells (SCL). The mean±SE from three sets of experiments is indicated.

The expression of PAX1, PAX9, and NKX3.2 was observed in the cells obtained by culturing the somite cells for 3 days (at day 11 from iPS cells) (FIG. 5B). The induction ratio of sclerotome cells from somite cells was around 45%, which was calculated based on immunocytochemistry with anti-PAX1 and anti-PAX9 antibodies.

3D Chondrogenic Induction (3DCI) from Sclerotome Cells (SCL)

A total of $1.0 \times 10^6$ induced sclerotome cells (SCL) were suspended in 0.5 ml of chondrogenic basal medium (DMEM: F12 (Invitrogen), 1% (v/v) ITS+Premix (BD Biosciences, San Jose, CA, USA), 0.1 µM dexamethasone (WAKO), 0.17 mM L-Ascorbic acid 2-phosphate sesquimagnesium salt hydrate (Sigma), 0.35 mM Proline (Sigma), 0.15% (v/v) glucose (Sigma), 1 mM Na-pyruvate, 2 mM GlutaMax (Invitrogen) and 1% (v/v) FBS)) supplemented with 10 ng/ml BMP7 (R&D) and 10 ng/ml TGFβ3 (R&D), transferred into 15 ml tubes (Corning Inc., Corning, NY, USA), centrifuged to form pellets, and incubated at 37° C. in 5% $CO_2$. The medium was changed every 3 days.

Figure 5C:
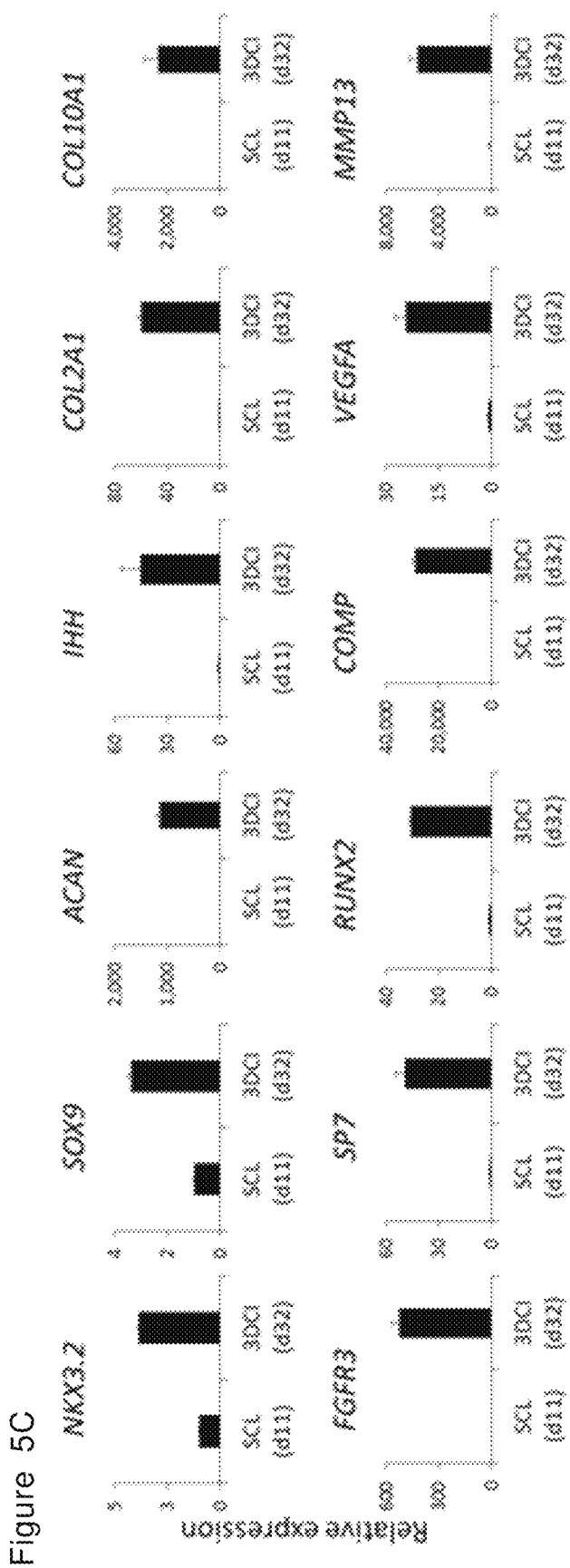
FIG. 5C Relative expression levels of chondrogenic markers at day 21 of 3D chondrogenic induction (3DOI) from sclerotome cells (SCL). The expression level in sclerotome cells is set as 1. Error bar: mean±SE (n=3).

The cultured sclerotome cells were collected, centrifuged to form pellets, and further cultured in chondrogenic basal medium. At day 21 of the cartilage induction from sclerotome cells (at day 32 from iPS cells), the generation of chondrocytes was observed by Alcian blue staining, Safranin O staining, immunocytochemistry with anti-Type II collagen antibody (data not shown), and RT-qPCR for chondrogenic markers (FIG. 5C).

2D Osteogenic Induction (2DOI) from Sclerotome Cells (SCL)

Figure 5D:
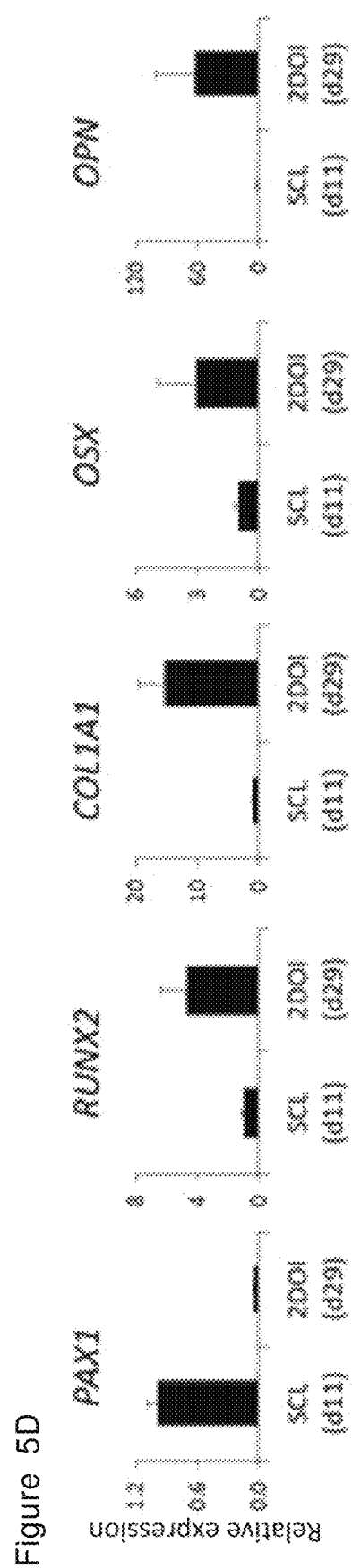
FIG. 5D Relative expression levels of osteogenic markers at day 18 of 2D osteogenic induction (2DOI) from sclerotome cells (SCL). The expression level in sclerotome cells is set as 1. Error bar: mean±SE (n=3).

A total of $4.0 \times 10^5$ induced sclerotome cells (SCL) were seeded onto a matrigel-coated 12 well plate and subsequently underwent 2D osteogenic induction by using MSC go rapid osteogenic medium (Biological Industries, Kibbutz Beit-Haemek, Israel). At day 18 of osteocyte induction (at day 29 from iPS cells), the differentiation from sclerotome cells into osteocytes was confirmed by the expression of PAX1, RUNX2, COL1A1, OSX and OPN (FIG. 5D) and Alizarin Red staining (data not shown).

(7) Induction of Syndetome Cells (SYN) from Sclerotome Cells (SCL)

The dorsal part of sclerotome has been defined as syndetome, which is a primordium of tendons and ligaments (Brent et al., 2003). The induction protocol of syndetome from sclerotome cells has not been known prior to this application. Induced sclerotome cells were detached from the dish with 0.25% trypsin-EDTA (GIBCO), and a total of $5.0 \times 10^4$ cells were seeded onto one well of a matrigel-coated 24-well plate and subsequently underwent the syndetome cell induction.

The sclerotome cells were cultured in syndetome cell induction medium A (CDM basal medium supplemented with 20 ng/ml FGF8 (Peprotech, Rocky Hill, NJ, USA)) for 3 days (step 7-1). The medium was then replaced with syndetome cell induction medium B, which contains 10 ng/ml BMP7 (R&D) and 10 ng/ml TGFβ3 (R&D) in CDM basal medium, without passage, and the cells were cultured for 18 days (step 7-2). The medium was changed every 3 days.

Figure 5E:
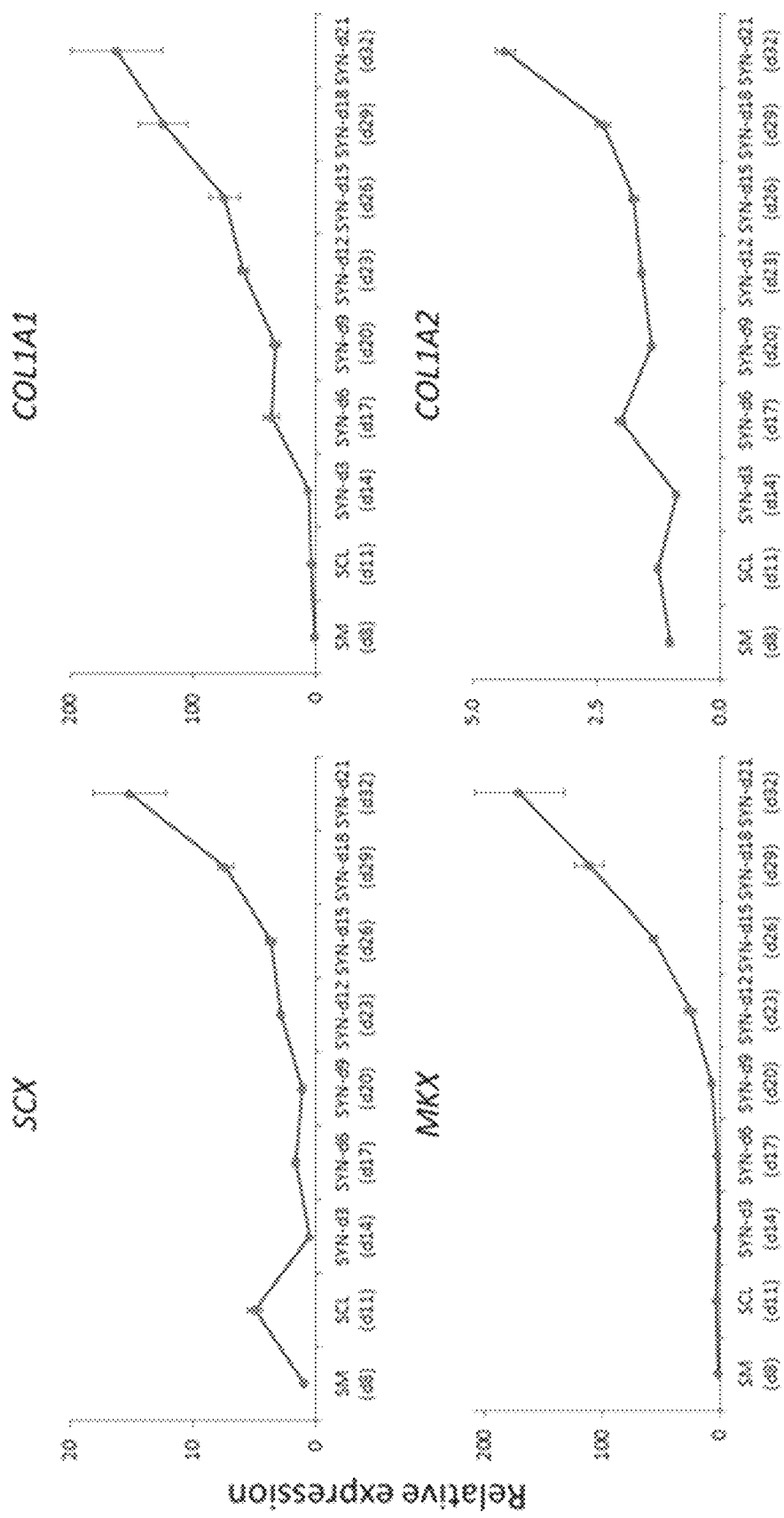
FIG. 5E Temporal changes of the expression levels of syndetome cell marker genes SCX, COLIA1, MKX, and COLIA2 during 21 days of the induction from sclerotome cells (SCL) into syndetome cells (SYN). The mean±SE from three sets of experiments is indicated.
Figure 5F:
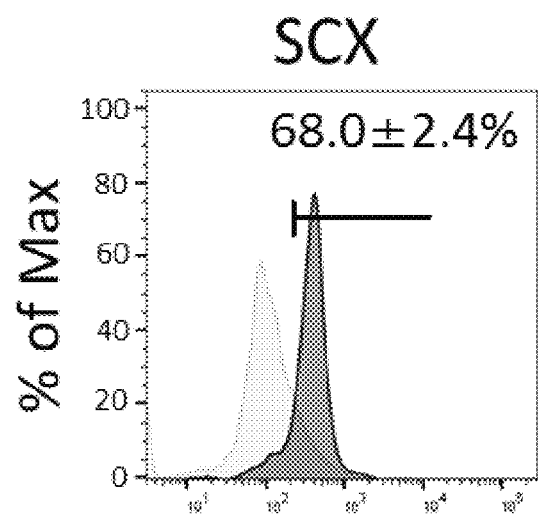
FIG. 5F The expression of SCX was examined by FACS at day 21 of the induction from sclerotome cells (SCL) into syndetome cells (SYN), IPS cells were used as control.

In the later phase of the induction of syndetome cells, the expression of syndetome cell markers SCX, MKX, COL1A1, and COL1A2 was upregulated in a time dependent manner (FIG. 5E). The protein expression of each factor was also confirmed by immunocytochemistry at day 21 of the syndetome cell induction, which showed the similar results to those in FIG. 5E. SCX-expressing cells were confirmed by FACS and the induction efficiency into syndetome cells was estimated to be 68.0 2.4% (FIG. 5F).

Somite cells (SM) were induced from pluripotent stem cells through presomitic mesoderm cells (PSM) in Examples of the present application. Further, the differentiations from somite cells (SM) into dermatome cells (DM), myotome cells (MYO), sclerotome cells (SCL) and syndetome cells (SYN) were induced.

Figure 6A:
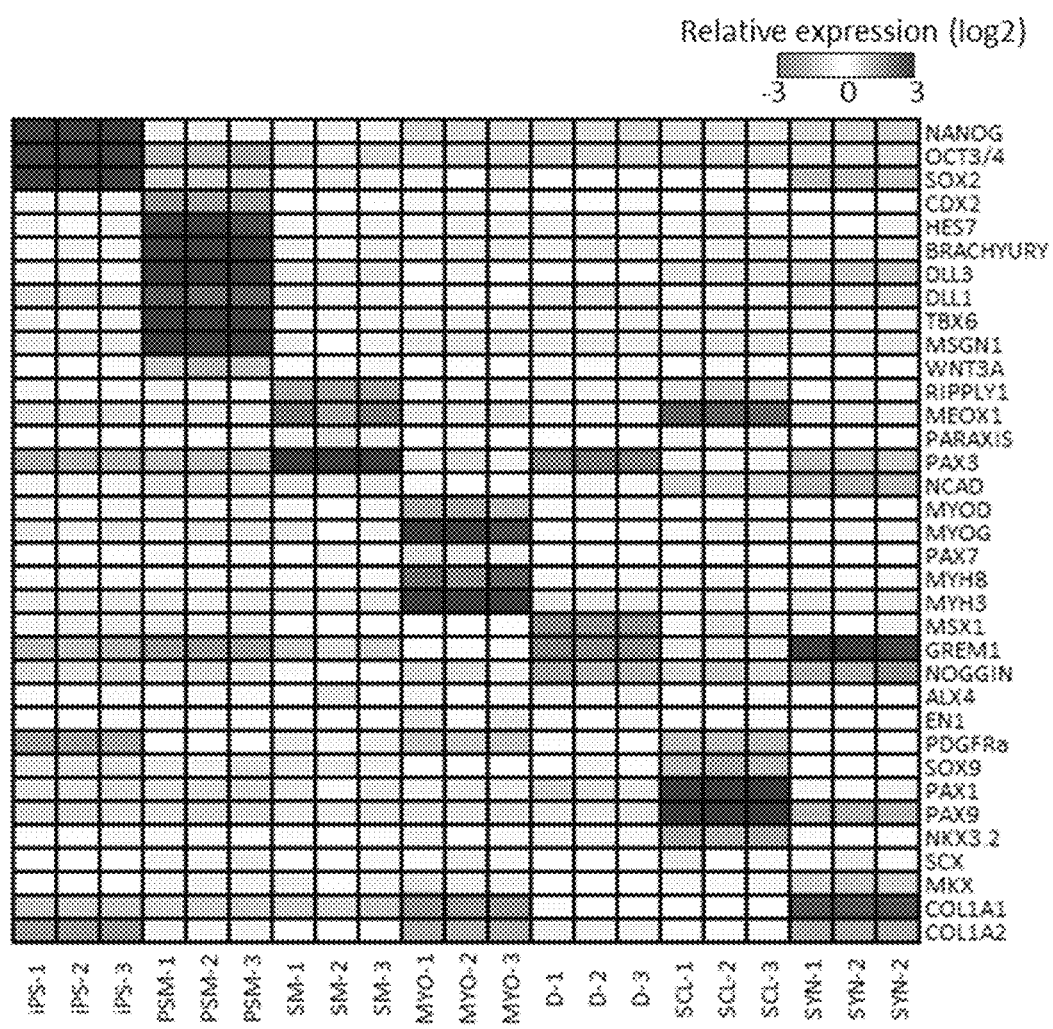
FIG. 6A A heatmap analysis of each marker gene in the cells at each induction stage of the stepwise induction from iPS cells.
Figure 6B:
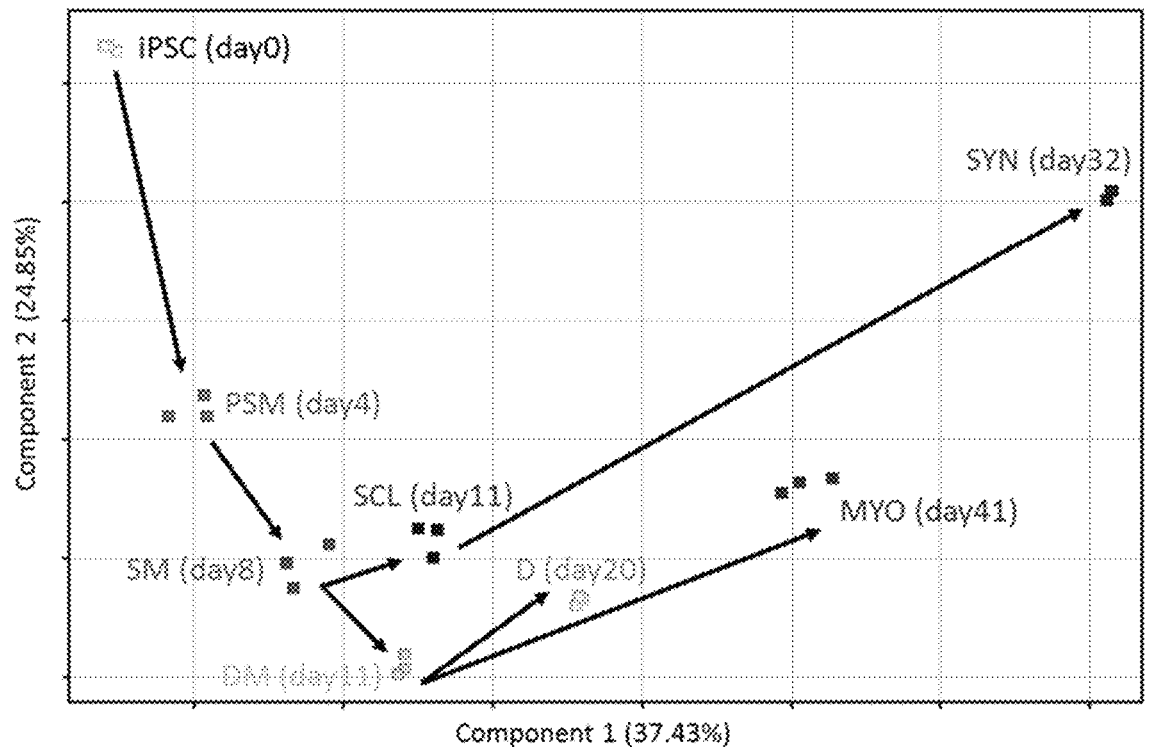
FIG. 6B A PCA plot showing stepwise induction from iPS cells through presomitic mesoderm cells and somite cells into four types of cells.

The gene expression profile of each induced cell was assessed. Heatmap analysis and a PCA plot are shown in FIG. 6A and FIG. 6B, respectively. These figures indicated the preferential and stepwise differentiation of each derivative, supporting the rationale of each procedure.

Example 5

(8) Induction of Mesenchymal Stromal Cells (MSC) from Somite Cells (SM)

Figure 7A:
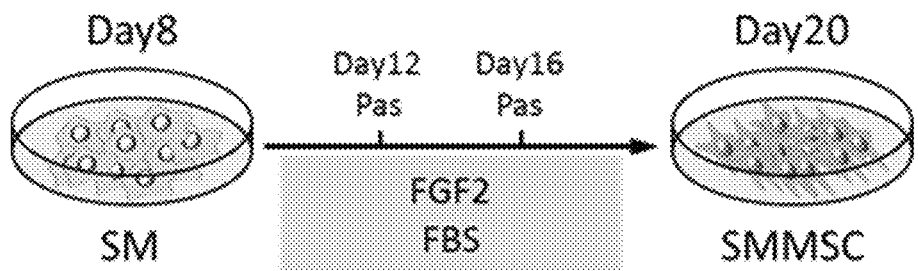
FIG. 7A Schematic view of a protocol for the induction from somite cells (SM) into somite cell-derived mesenchymal stromal cells (SMMSC).

A somite cell could be a progenitor of a mesenchymal stromal cell, but no report has induced mesenchymal stromal cells from human pluripotent stem cells through somite cells. To induce mesenchymal stromal cells from somite cells, the somite cell induction medium was replaced with the somite cell-derived mesenchymal stromal cell induction medium, which contains 10% fetal bovine serum (Nichirei Inc., Tokyo, Japan) and 4 ng/ml FGF2 (WAKO) in QMEM (Nacalai Tesque, Kyoto, Japan), and the culture was further performed (FIG. 7A). Passage was performed every 4 days by detaching the cultured cells from the dish with 0.25% trypsin-EDTA (GIBCO). Cells were seeded onto a tissue culture dish at a density of $2 \times 10^4$ cells/$cm^3$.

Figure 7B:
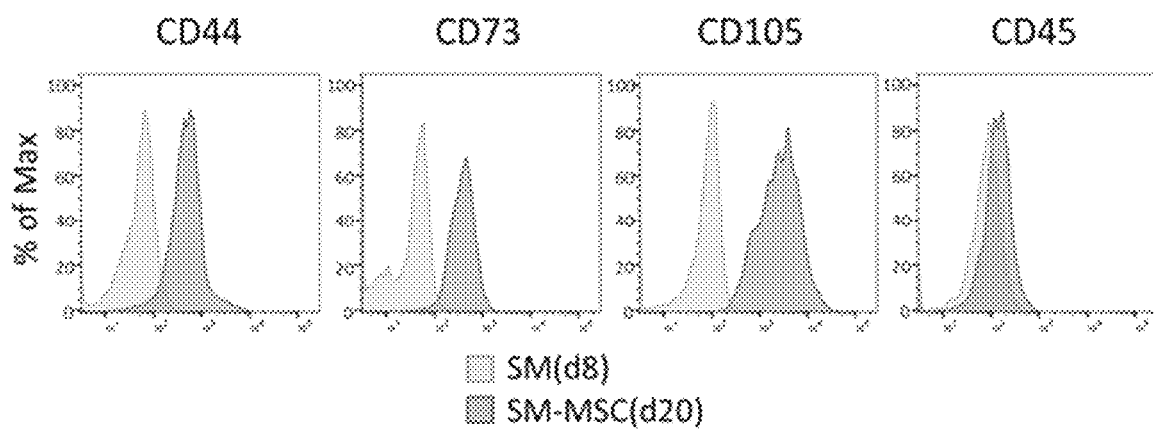
[FIG. 7B] FACS analysis of the cells obtained by culturing somite cells in the medium comprising 10% FBS supplemented with EGF2 (4 ng/ml) for 12 days. $CD44^+$, $CD73^+$, $CD105^+$ and $CD45^-$ mesenchymal stromal cells were induced. Somite cells were used as control populations.

The induction of somite cell-derived mesenchymal stromal. cells was performed for 12 days, and the expression level of each marker was analyzed by FACS at day 12. Cells changed their morphology to fibroblast-like and became positive for the mesenchymal stromal cell markers CD44, CD73, and CD105 (FIG. 7B), confirming the generation of mesenchymal stromal cells.

For obtained mesenchymal stromal cells, osteogenic induction (OI), chondrogenic induction (CI) and adipogenic induction (AI) were performed by above known methods to confirm the differentiation potencies of the mesenchymal stromal cells induced from the somite cells (SMMSC). CI, OI, AI and the assays thereof (Alizarin Red staining, Alcian Blue staining, Oil Red O staining) were performed as described previously (Fukuta et al., 2014), confirming the generations of chondrocytes, osteocytes, and adipocytes.

Figure 7C:
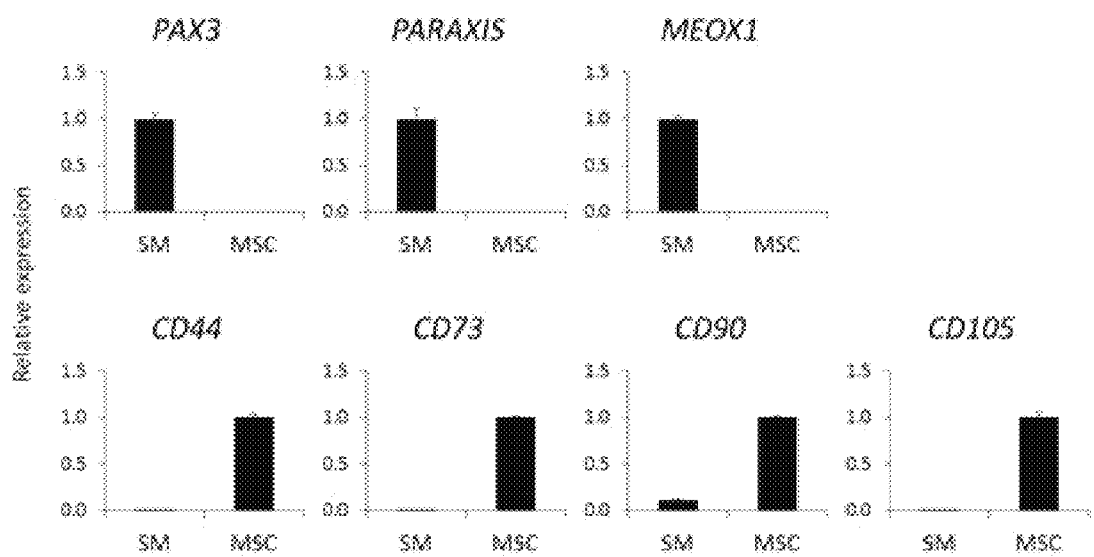
FIG. 7C Relative expression levels of various cell markers in somite cells and somite cell-derived mesenchymal stromal cells. Higher expression level is set as 1.
Figure 7D:
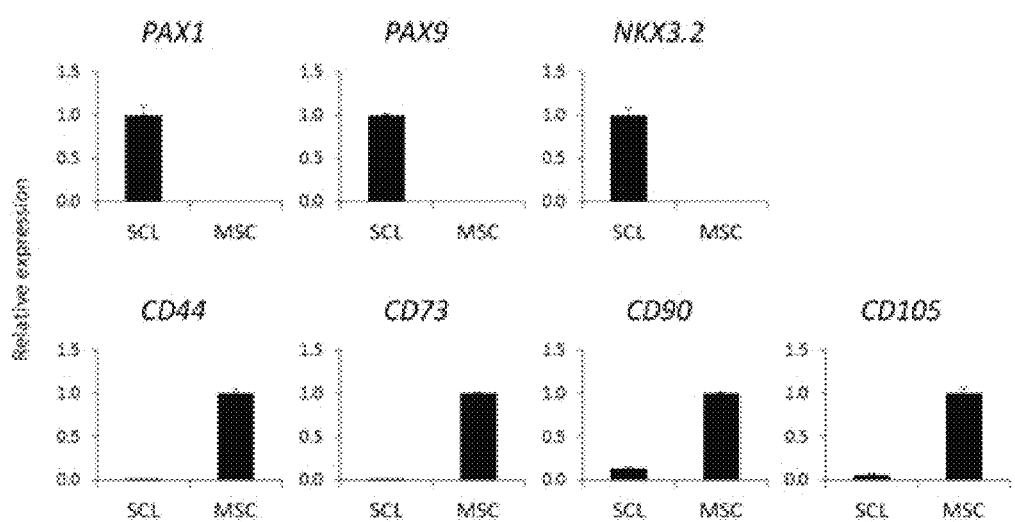
FIG. 7D Relative expression levels of various cell markers in somite cell-derived sclerotome cells and somite cell-derived mesenchymal stromal cells. Higher expression level is set as 1.

Sclerotome cells induced somite from cells, and mesenchymal stromal cells are capable of osteogenesis and chondrogenesis. To discriminate somite cells, sclerotome cells, and mesenchymal stromal cells, the expressions of somite cell markers (PAX3, PARAXIS, and MEOX1), mesenchymal stromal cell markers (CD44, CD73, CD90, and CD105), and sclerotome cell markers (PAX1, PAX9, and NKX3.2) were analyzed by RT-qPCR for each cell culture. Induced mesenchymal stromal cells were positive for mesenchymal stromal cell markers CD44, CD73, CD90 and CD105, but not for somite cell or sclerotome cell markers (FIGS. 7C and 7D). These results showed that the cells induced in the above (8) are mesenchymal stromal cells.

Example 6

Difference in Chondrogenesis Between Mesenchymal Stromal Cells Induced from Somite Cells and Sclerotome Cells Induced from Somite Cells One of the promising uses of iPS cells is disease modeling with patient-specific iPS cells. In Examples 4 and 5, we succeeded to induce two different types of chondrocytes, sclerotome cell-derived chondrocytes and somite cell-derived mesenchymal stromal cell-derived chondrocytes. We applied the protocols to iPS cells produced from somatic cells in patients with fibrodysplasia ossificans progressiva (FOP) caused by genetic mutations (FOP-iPS cells). FOP is an intractable rare disease characterized by endochondral ossification in soft tissues of a patient mainly after birth and is known to be caused by mutations and excessive activity of ACVR1. Our previous published work shows the enhancement of chondrogenesis from mesenchymal stromal cells by using mesenchymal stromal cells induced from FOP-iPS-derived neural crest cells (Hino et al., 2015; Matsumoto et al., 2015). We speculated that somite cell-derived mesenchymal stromal cell-derived chondrocytes from FOP-iPS cells would have enhanced chondrogenesis, while sclerotome cell-derived embryonic chondrocytes would not.

Figure 8A:
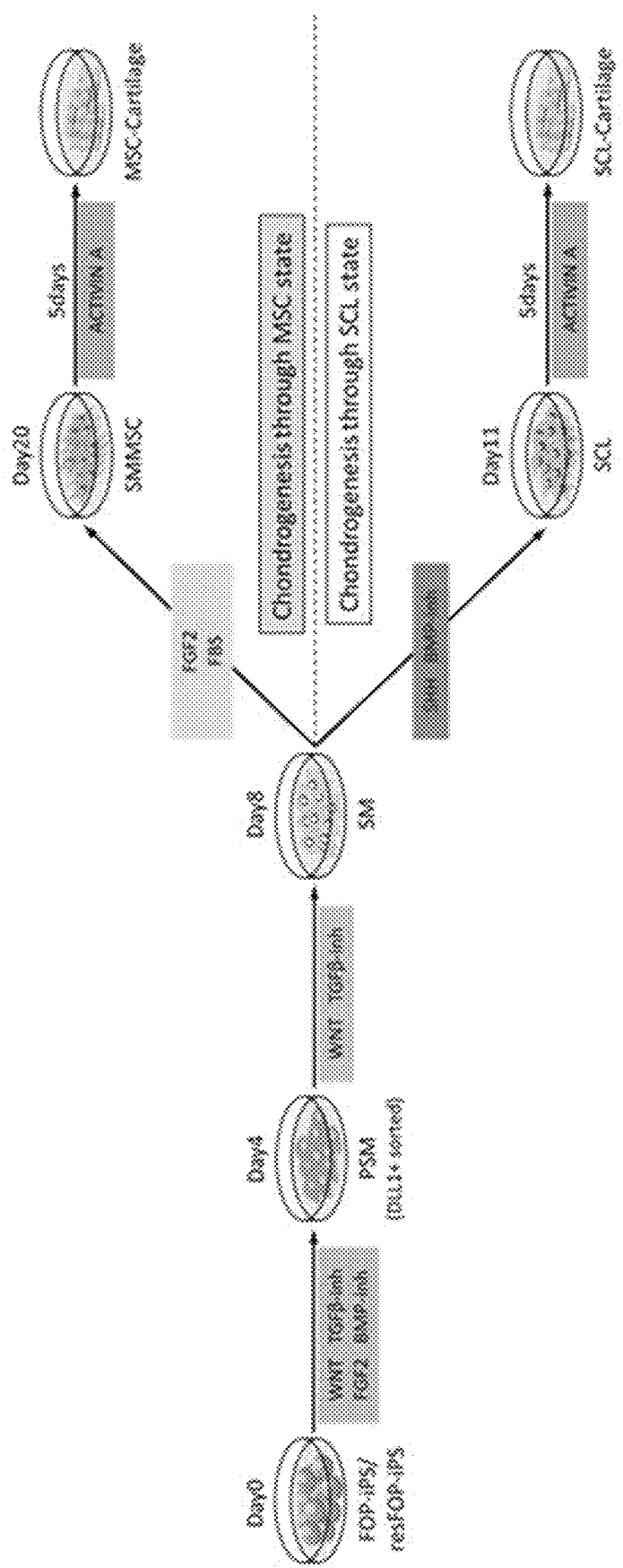
FIG. 8A shows summary of the protocols in Example 6. Mesenchymal stromal cells (SMMSC) and sclerotome cells (SCL) were induced from FOP-iPS cells and resFOP-iPS cells through somite cells, and then these cells were spotted onto fibronectin-coated dishes and treated under chondrogenic induction conditions in chondrogenic induction basal media supplemented with Activin A (30 ng/ml) for 5 days.

The summary of the test is shown in FIG. 8A. Somite cells were induced from FOP-iPS cells (Matsumoto et al., 2013) and gene-corrected (rescued) FOP-iPS cells (resFOP-iPS cells) (Hino et al., 2015; Matsumoto et al., 2015) according to the protocols of above Examples 1 and 2. Mesenchymal stromal cells and sclerotome cells were induced from the somite cells according to the protocols of Examples 4 and 5.

Obtained mesenchymal stromal cells and sclerotome cells were underwent two-dimensional chondrogenic induction with chondrogenic medium supplemented with or without Activin A, a stimulator of mutant ACVR1 (Hino et al., 2015).

2D Chondrogenic Induction (2DCI)

A total of $1.5 \times 10^5$ induced mesenchymal stromal cells or sclerotome cells were suspended in 5 µL of chondrogenic basal. medium (DMEM: F12 (Invitrogen), 1% (v/v) ITS+ Premix (BD Biosciences, San Jose, CA, USA), 0.1 µM dexamethasone (WAKO), 0.17 mM L-Ascorbic acid 2-phosphate sesquimagnesium salt hydrate (Sigma), 0.35 mM Proline (Sigma), 0.15% (v/v) glucose (Sigma), 1 mM Na-pyruvate, 2 mM GlutaMax (Invitrogen) and 1% (v/v) FBS), and subsequently transferred to one well of a fibronectin-coated 24-well plate (BD Biosciences). After one hour of incubation at 37° C. in 5% $CO_2$, cells formed micromass.

Then, the micromass was cultured in 1 ml of chondrogenic basal medium supplemented with 10 ng/ml BMP7 (R&D) and 10 ng/ml TGFβ3 (R&D) with or without 30 ng/ml Activin A (R&D) at 37° C. in 5% $CO_2$ for 5 days.

The micromass induced from somite cell-derived mesenchymal stromal cells from FOP-iPS cells was also cultured in 1 mL of chondrogenic basal medium supplemented with 30 ng/ml Activin A (R&D) with/without 10 nM R667 (Toronto Research Chemicals, Toronto, ON, Canada) or 10 nM Rapamycin (MedChem Express, Monmouth Junction, NJ, USA).

Differentiation properties of obtained cells were analyzed by RT-qPCR analysis, glycosaminoglycans (GAG) quantification and Alcian Blue staining. Briefly, induced cells were fixed for 30 minutes with 4% paraformaldehyde (WAKO), rinsed with PBS, and then stained overnight with Alcian Blue solution (1% Alcian Blue, pH1) (MUTO PURE CHEMICAL CO., LTD, Tokyo, Japan).

Figure 8B:
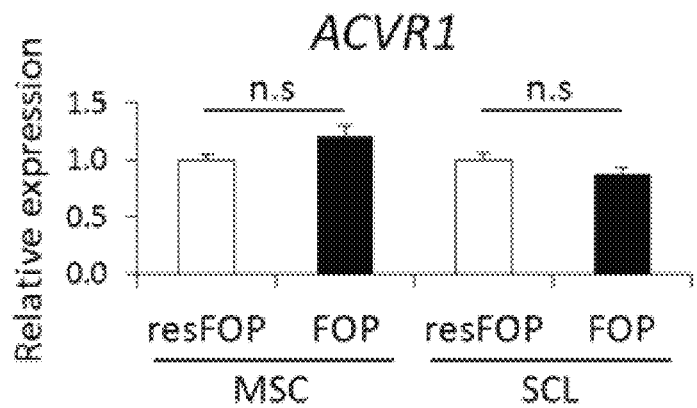
FIG. 8B Relative expression of ACVR1 in induced mesenchymal stromal cells and sclerotome cells. Error bar: mean±SE (n=6). The expression level in resFOP-iPS cell-derived mesenchymal stromal cells or sclerotome cells is set as 1.
Figure 8C:
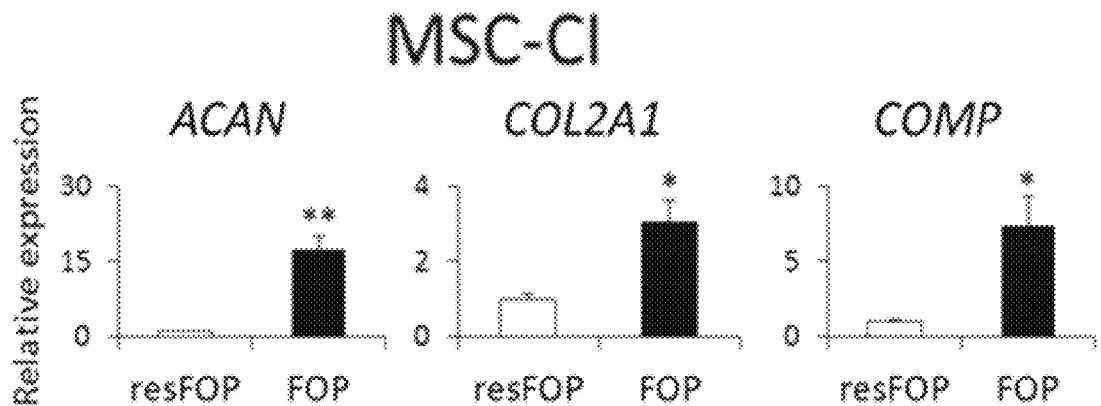
Figure 8D:
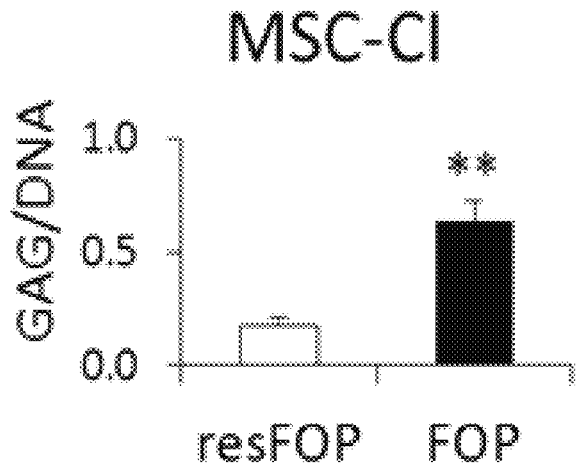

The results are shown in FIGS. 8B to 8D. There was no difference in the expression level of ACVR1 in the chondrocytes derived from somite cell-derived mesenchymal stromal cells and those derived from sclerotome cells, regardless of the derived cell types and the presence or absence of the repair of ACVR1 mutation (FIG. 8B).

Without the stimulation of Activin A, there was no difference in the expression level of chondrogenesis markers, regardless of the derived cell types and the presence or absence of the repair of ACVR1 mutation (data not shown).

Figure 8E:
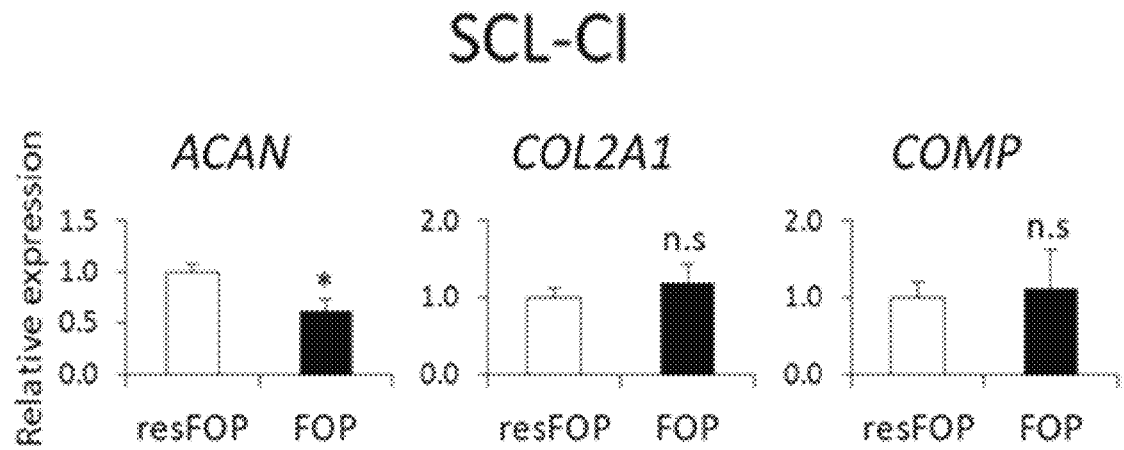
Figure 8F:
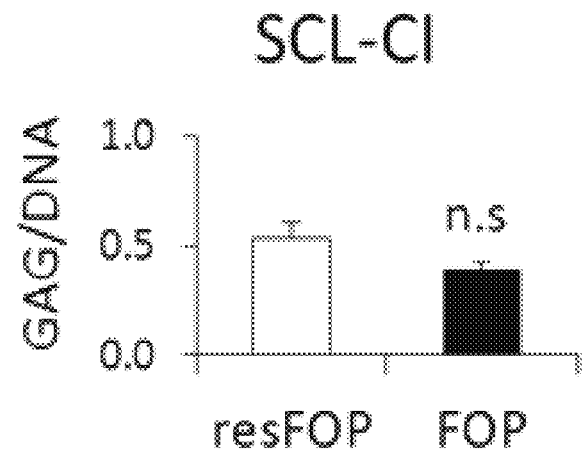

When somite cell-derived mesenchymal stromal cells induced from FOP-iPS cells were induced into cartilage with Activin stimulation, the enhancement of the chondrogenesis was observed in terms of the expression level of chondrogenic markers and the production level of glycosaminoglycan (GAG), compared to the cells induced from resFOB-iPS cells (FIGS. 8C and 8D). The enhancement of the chondrogenesis in the somite cell-derived mesenchymal stromal cells induced from FOB-iPS cells was also observed by Alcian Blue staining (data not shown). On the other hand, when cartilage cells were induced from somite cell-derived sclerotome cells with the stimulation of Activin A, there was no difference in chondrogenic marker expressions, glycosaminoglycan (GAG) production and Alcian Blue staining result in the FOB-iPS-derived cells and resFOB-iPS-derived cells (FIGS. 8E and 8F).

Figure 8G:
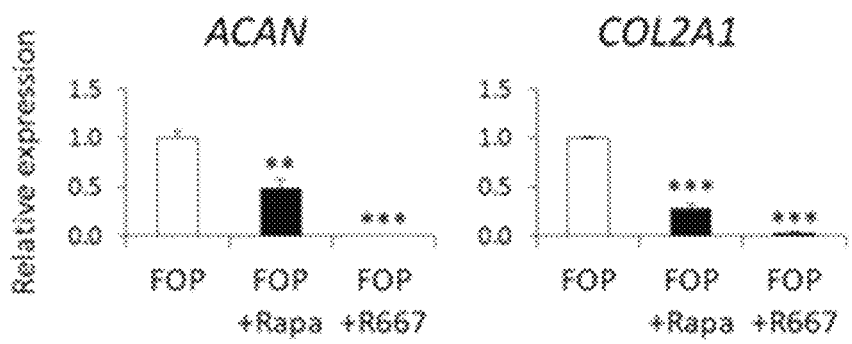
Figure 8H:
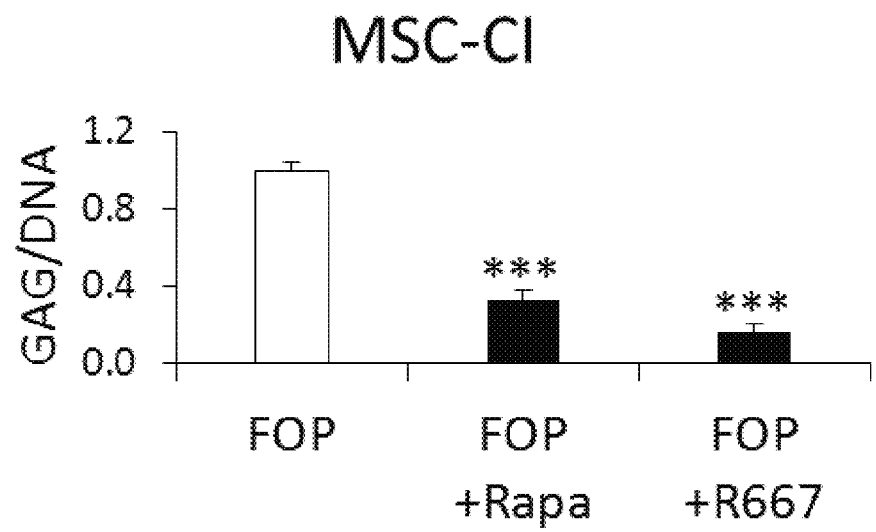

When R667 or Rapamycin were added in the cartilage induction from somite cell-derived mesenchymal stromal cells induced from FOP-iPS cells with Activin stimulation, the enhancement of chondrogenic marker expressions and glycosaminoglycan (GAG) production was significantly inhibited (FIGS. 8G and 8H). The inhibition of the enhanced chondrogenesis was also confirmed by Alcian Blue staining. It is reported that R667, a retinoic acid receptor-γ agonist, and Rapamycin, an mTOR inhibitor, are potent inhibitors of heterotopic ossification (Hino et al., 2017).

Figure 8I:
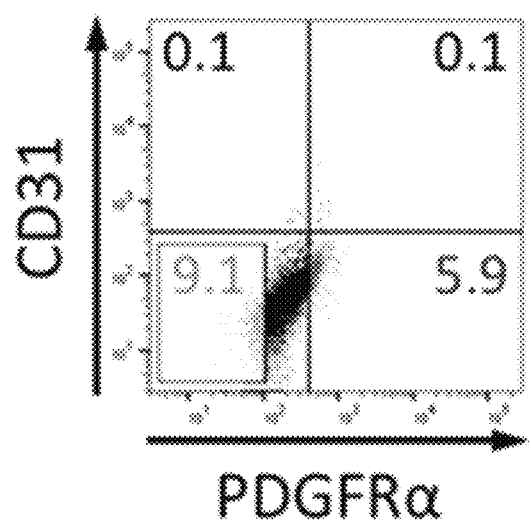
FIG. 8I Mesenchymal stromal cells were induced from FOP-iPS cells through somite cells, and then $PDGFR\alpha^+/CD31^-$ and $PDGFR\alpha^-/CD31^-$ populations were isolated by FACS.
Figure 8J:
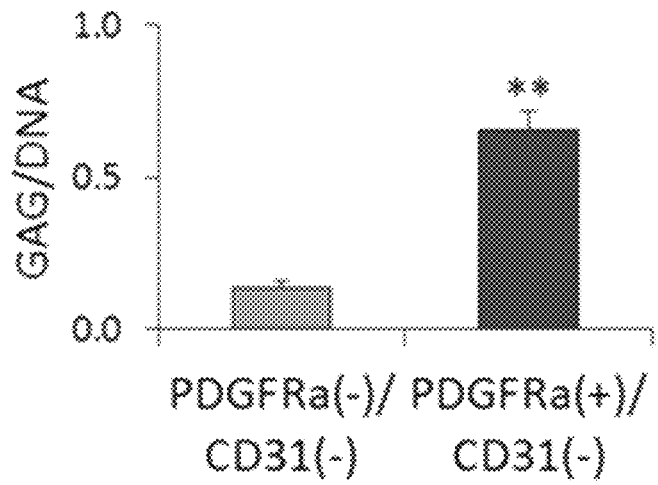
Figure 8K:
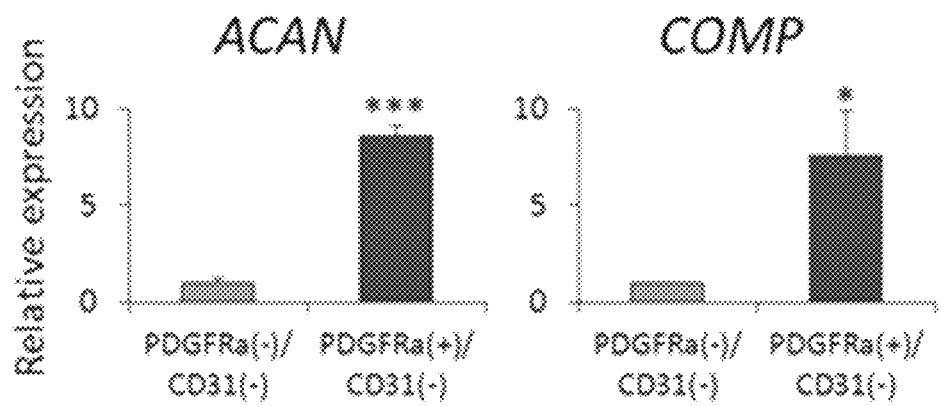
Figure 8L:
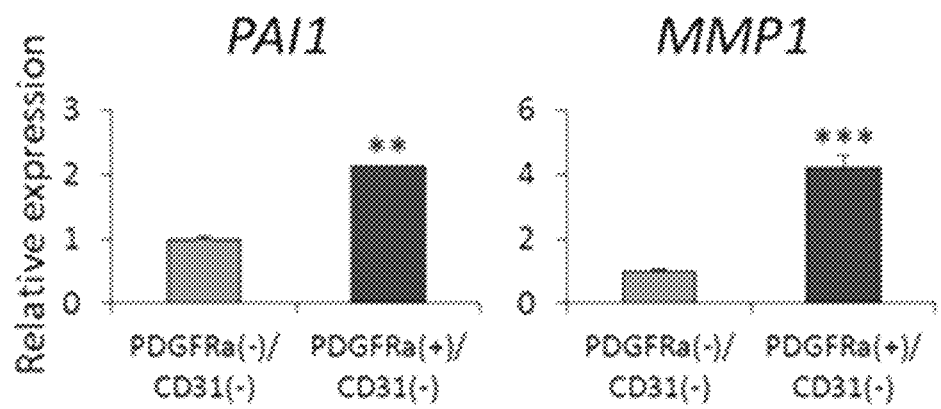

Recently, PDGFRα$^+$/CD31$^-$ cells was proposed as one of the cell-of-origins of the FOP lesion (Dey et al., 2016). PDGFRα$^+$/CD31$^-$ cells and PDGFRα$^-$/CD31$^-$ cells were separately sorted from FOP-SMMSCs by FACS (FIG. 8I) and underwent 2D chondrogenic differentiation by the above protocols. There was no difference in the expression level of ACVR1 in isolated cells (data not shown). As expected, PDGFRα$^+$/CD31$^-$ cells showed enhanced chondrogenesis compared with PDGFRα$^+$/CD31$^-$ cells (FIGS. 8J and 6K). Interestingly, the expressions of PAIN and MMP1, indicator genes of mutant ACVR1 activation, were significantly upregulated in PDGFRα$^+$/CD31$^-$ cells (FIG. 8L).

Figure 8M:
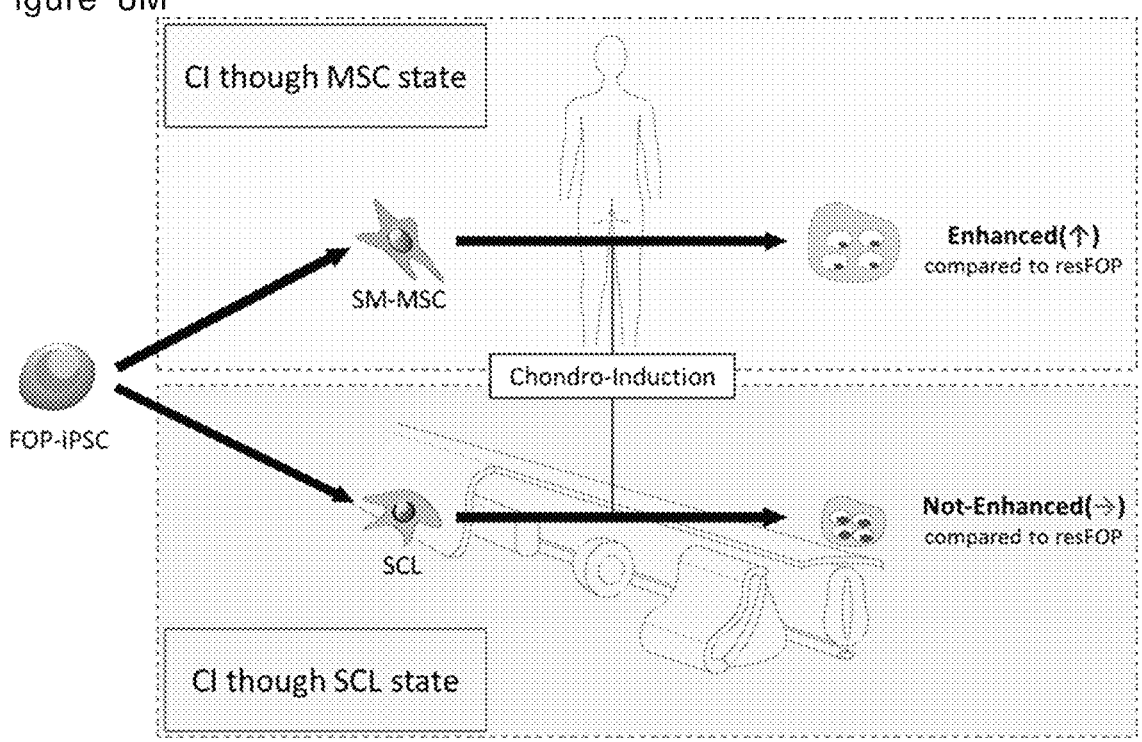
FIG. 8M illustrates the result of Example 6.

These results are shown in FIG. 8M, indicating cell type specificity of FOP phenotypes and that our protocols can be used for disease modeling, phenotype analyses and drug findings.

Example 7

Induction of the Differentiation from Sclerotome Cells (SCL) into Syndetome Cells (SYN) Under Xeno-Free Condition Sclerotome cells were induced in xeno-free environment from iPS cells induced under xeno-free condition. Specifically, 1231A3 cells were used as the iPS cells induced under xeno-free condition. First, the iPS cells were cultured under the SCDF condition described in Example 1 for 4 days to induce presomitic mesoderm cells. StemFit® AK03 (not comprising C liquid) Medium (Ajinomoto Co., Inc., hereinafter AK03 (–C) medium) was used as the medium. For somite cell induction, a total of $1.0 \times 10^5$ DLL1$^+$ presomitic mesoderm cells sorted by FACS were seeded onto each well of a iMatrix511 (Nippi Corporation)-coated 12-well plate comprising AK03 (–C) medium supplemented with 10 µM SB431542 and 5 µM CHIR99021 and cultured for 4 days. The medium was changed at day 3 of the somite cell induction. For sclerotome cell induction, the medium was replaced with AK03 (–C) medium comprising 100 nM SAG and 0.6 µM LDN193189 and the culture was performed for 3 days. The medium was changed at day 2 of the sclerotome cell induction.

An iMatrix511-coated plate was prepared the day before the initiation of the syndetome cell induction. To prepare the iMatrix511-coated 24-well plate, 0.5 mL of iMatrix511 solution was added into each well at 4° C. and left overnight.

The medium of the induced sclerotome cell culture was aspirated and each well was then washed with PBS. 0.2 mL of the cell dissociation reagent Accutase® (Innovative Cell Technologies, Inc.) was added to each well and left for 3 minutes at room temperature. 0.8 mL of AK03 (–C) medium was added to each well and all of the cells were then scraped and collected into a 15 ml conical tube. The cell culture was then centrifuged at 280×g for 3 minutes. The supernatant was carefully aspirated and the cell culture was resuspended in 1 mL of syndetome cell induction medium A' (AK03 (–C) medium supplemented with 20 ng/mL FGF8 and 10 ng/mL TGFβ3). The number of the cells was counted using an automated cell counter.

$5.0 \times 10^4$ cells were seeded onto each well of the iMatrix511-coated 24-well plate containing 1 mL of syndetome cell induction medium A' and incubated at 37° C. in 5% CO$_2$ for 2 days (step 7-1). At day 2 of the syndetome cell induction, the medium was replaced with syndetome cell induction medium B' (AK03 (–C) medium supplemented with 10 ng/ml BMP7 and 10 ng/ml TGFβ3). The cell culture was incubated at 37° C. in 5% CO$_2$ for 6 days until day 8 (step 7-2). The medium was changed every 2 days.

For step 7-1, the medium supplemented with 20 ng/ml FGF8 (syndetome cell induction medium A) was used in Example 4, while the medium supplemented with 20 ng/ml FGF8 and 10 ng/ml: TGFβ3 (syndetome cell induction medium A') was used in this example. As a result, the culture period in step 7-1 was shortened to 2 days, and the culture period in step 7-2 was shortened to 6 days.

Figure 9A:
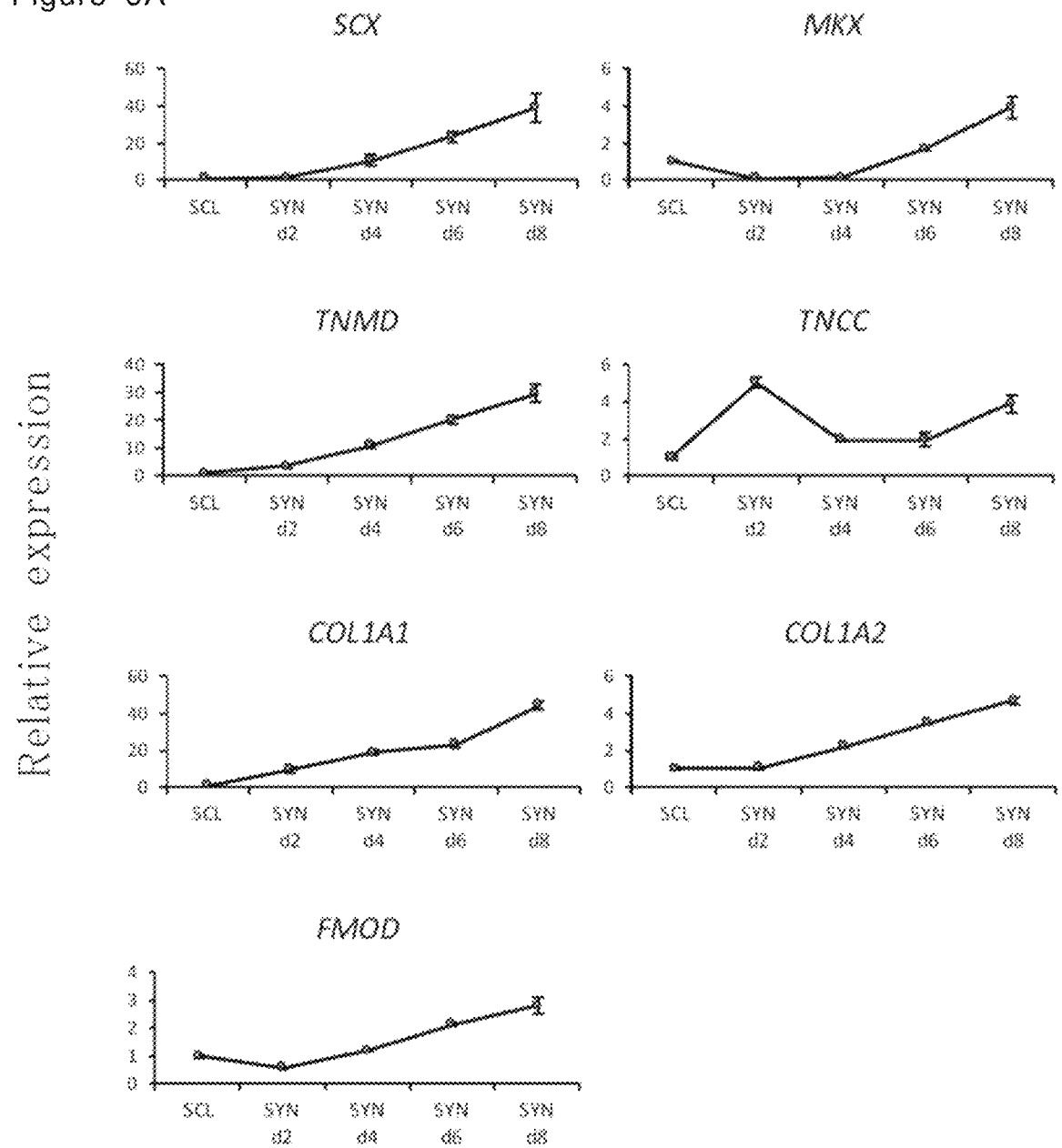
FIG. 9A Temporal changes of the expression levels of syndetome cell-associated marker genes (SCX, MKX, TNMD, TNCC, COL1A1, COL1A2, and FMOD) until day 8 of the induction from sclerotome cells (SCL) into syndetome cells (SYN) in xeno-free environment. For the vertical axis, the expression level in sclerotome cells is set as 1.
Figure 9B:
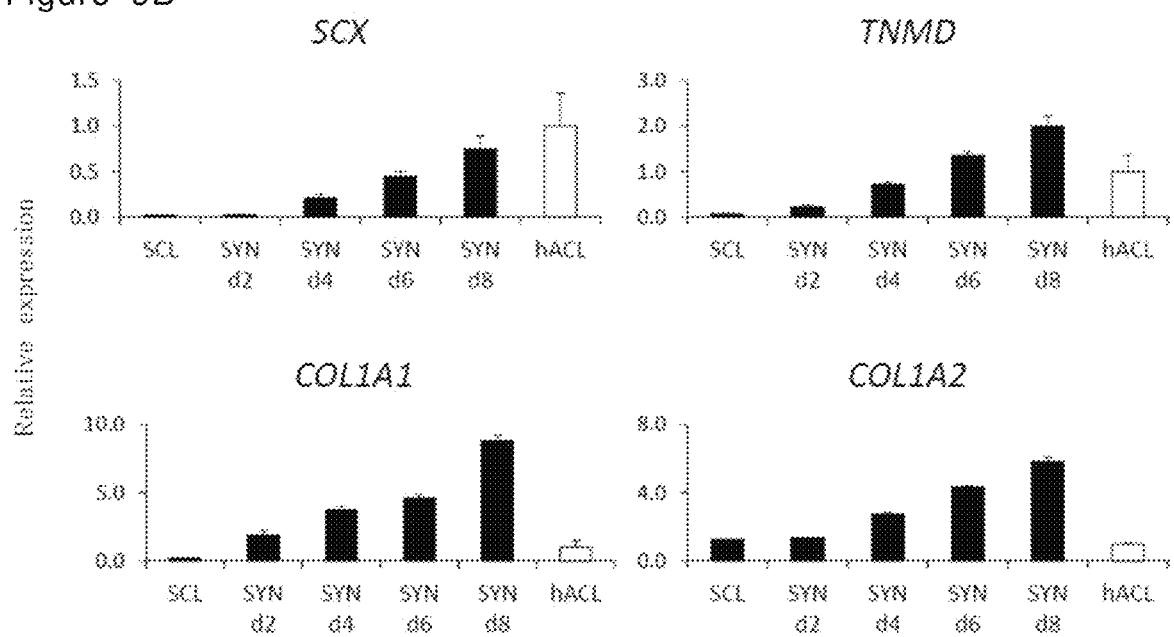
FIG. 9B Comparison of the expression levels of syndetome cell-associated marker genes (SCX, TNMD, COL1A1, and COL1A2) until day 8 of the induction from sclerotome cells (SCL) into syndetome cells (SYN) in xeno-free environment with those in human healthy anterior cruciate ligament (hACL) samples.
Figure 9C:
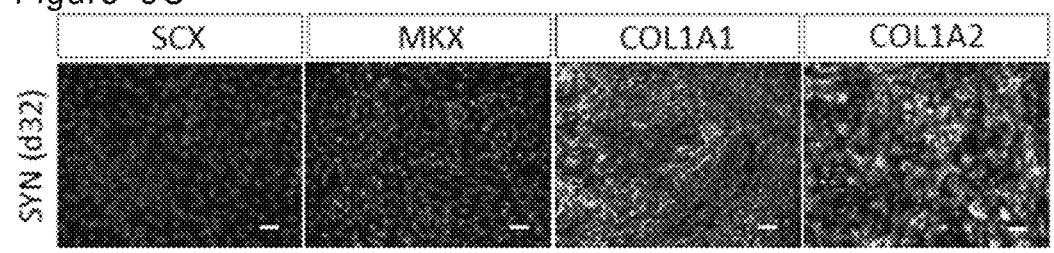
FIG. 9C Immunostaining image at day 21 of the syndetome cell (SYN) induction.

The expressions of seven syndetome cell-associated markers (SCX, MKX, TNMD, TNCC, COL1A1, COL1A2, and FMOD) were upregulated in a time dependent manner from the initiation of the syndetome cell induction to day 8 (FIG. 9A). The mRNA expression levels of syndetome cell-associated markers (SCX, TNMD, COL1A1, and COL1A2) were also examined at day 8 of the induction. For comparison, the expression level of each marker in human healthy anterior cruciate ligament samples (CDD-H-6800-N-R, Articular Engineering, LLC) was examined. The mRNA expression level of each marker in both samples were comparable (FIG. 9B). In addition, the protein expression of each marker (SCX, TNMD, COL1A1 and COL1A2) was confirmed by immunostaining at day 21 of the induction (FIG. 9C).

Example 8

Therapeutic Effect of the Transplantation of iPS Cell-Derived Syndetome Cells

At day 8 of the syndetome cell induction in Example 7, the cells were transplanted into Achilles tendon rupture model rats, and the therapeutic effect of the transplantation was observed for 4 weeks.

Figure 10A:
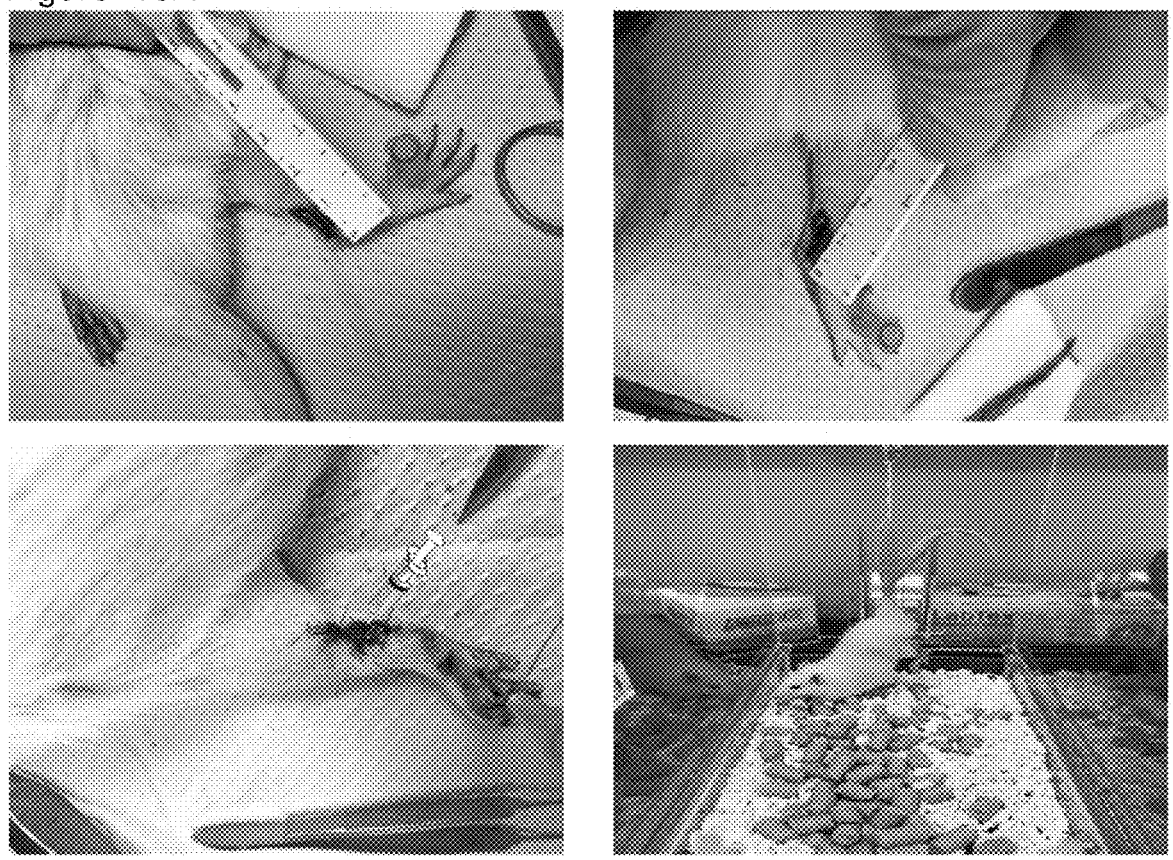
FIG. 10A Schematic summary of production and breeding methods of an Achilles tendon rupture model rat.

The summary of the production and breeding of the Achilles tendon rupture model rat is shown in FIG. 10A. To produce the Achilles tendon rupture model rat, the left hind limb of 8-week-old F344/NSlc male rat was incised (the upper left side of FIG. 10A), and the Achilles tendon site 5 mm away from the calcaneus was cut (the upper right side of FIG. 10A). The incision site was then sutured, and the solution of $3 \times 10^6$ iPS cell-derived syndetome cells/50 µL Matrigel: DMEM/F12=1:1 was injected (the lower left side of FIG. 10A). The rat was bred with hanging its tail for 1 week (the lower right side of FIG. 10A), and then observed for 3 weeks.

Figure 10B:
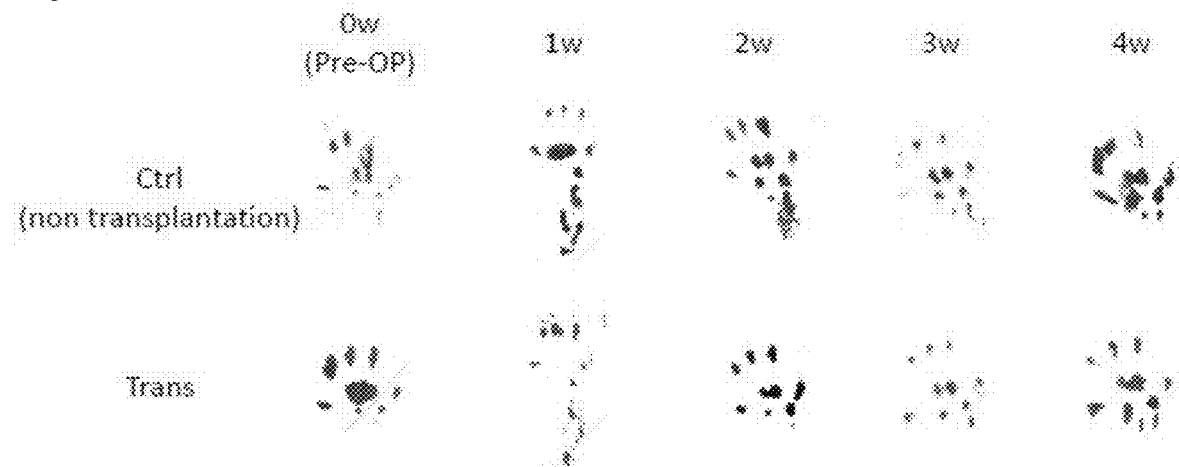
FIG. 10B Right hind limb footprints of rats in the transplantation group (Trans) and in the non-transplantation group (Ctrl) obtained every week after the transplantation.

The footprints of the left hind limbs in the transplantation group (Trans) and the non-transplantation group (Ctrl) were obtained every week after the transplantation (FIG. 10B). Healthy rats walked with raising their heels (see pre-operation (Pre-OP) in FIG. 10B). Compared to the non-transplantation group, the significant recovery in the transplantation group was observed 2 weeks after the transplantation.

Figure 10C:
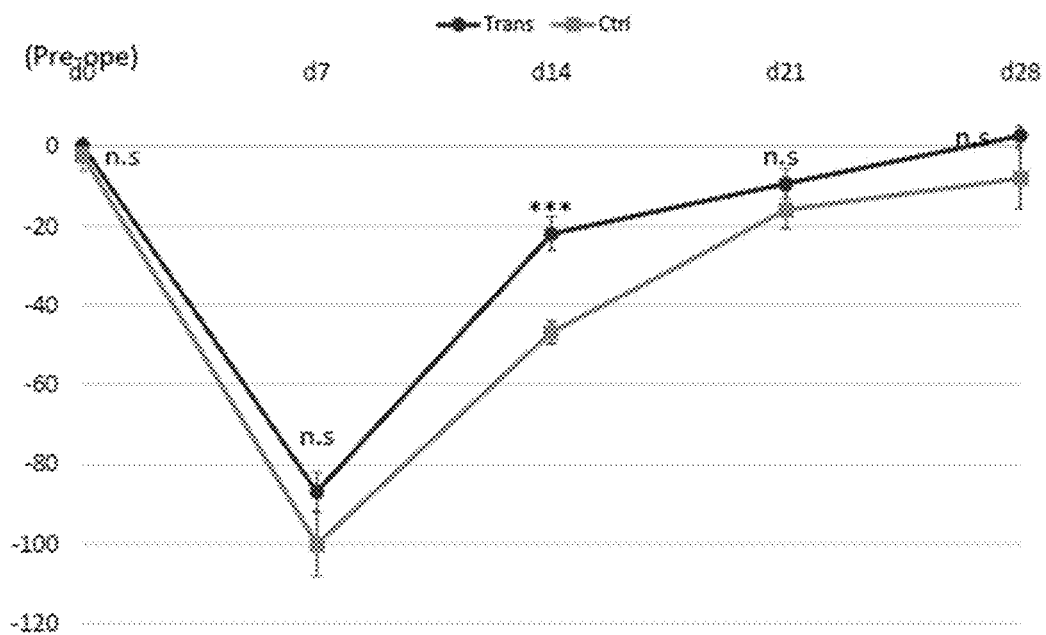
FIG. 10C Achilles Functional Index (AFI) of rats in the transplantation group (Trans) and in the non-transplantation group (Ctrl). At days 0, 7, and 14, n=8; at days 21 and 28, n=4. *p<0.05; p<0.01; *p<0.001 (Student's t-test). n.s: no significant difference.

The therapeutic effect of the transplantation was assessed based on the Achilles Functional Index (AFI; Murrell et al., 2014) (FIG. 10C). Compared to the non-transplantation group, the significant recovery in the transplantation group was observed 2 weeks after the transplantation.

Figure 10D:
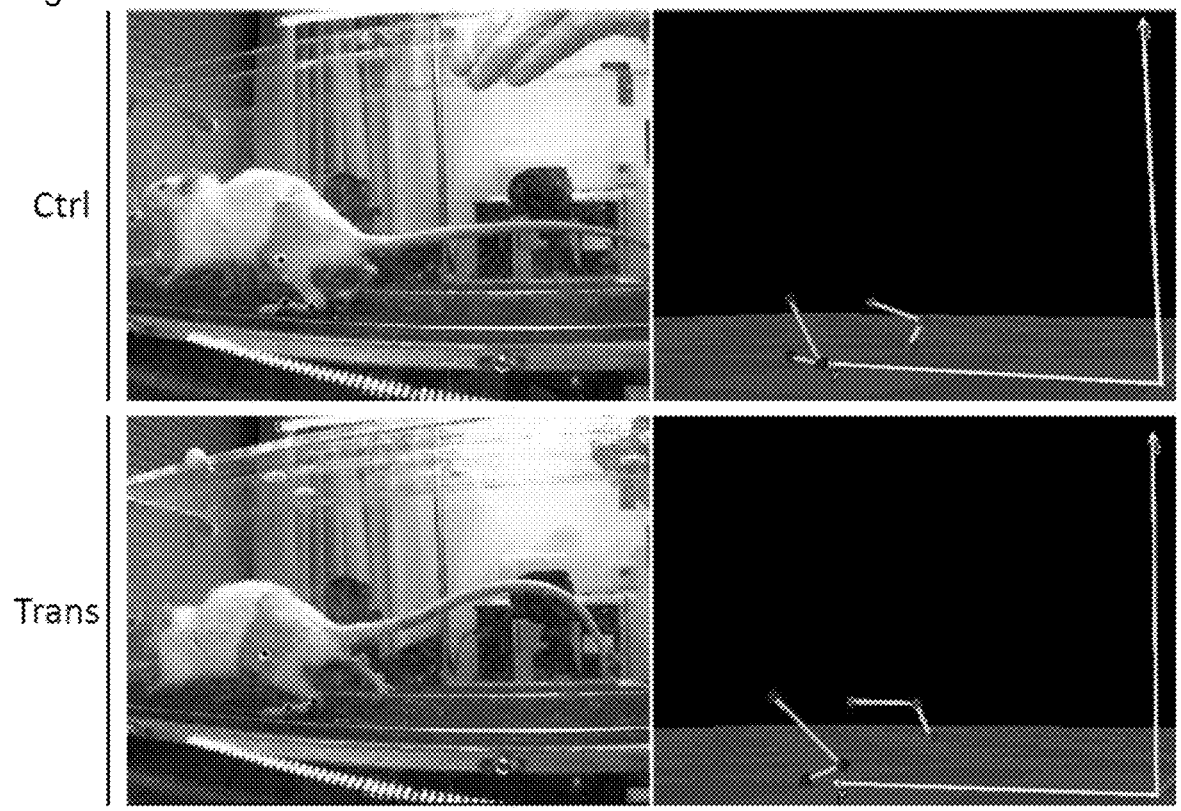
FIG. 10D Observation of the walk function of rats by using a treadmill in the transplantation group (Trans) and in the non-transplantation group (Ctrl) 2 weeks after the transplantation.

Further, the walk function was observed using a treadmill 4 weeks after the transplantation (FIG. 10D). Compared to the non-transplantation group, the transplantation group showed the significant recovery in terms of the height from the floor to their heels and the angles of their ankles.

REFERENCES

Ahmed, M. U., Cheng, L., and Dietrich, S. (2006). Establishment of the epaxial-hypaxial boundary in the avian myotome. Dev Dyn 235, 1884-1894.

Benazeraf, B., and Pourquie, O. (2013). Formation and segmentation of the vertebrate body axis. Annual review of cell and developmental biology 29, 1-26.

Bernardo, A. S., Faial, T., Gardner, L., Niakan, K. K., Ortmann, D., Senner, C. E., Callery, E. M., Trotter, M. W., Hemberger, M., Smith, J. C., et al. (2011). BRACHYURY and CDX2 mediate BMP-induced differentiation of human and mouse pluripotent stem cells into embryonic and extraembryonic lineages. Cell Stem Cell 9, 144-155.

Brent, A. E., Schweitzer, R., and Tabin, C. J. (2003). A somitic compartment of tendon progenitors. Cell 113, 235-248.

Brent, A. E., and Tabin, C. J. (2002). Developmental regulation of somite derivatives: muscle, cartilage and tendon. Current opinion in genetics & development 12, 548-557.

Buckingham, M., Bajard, L., Chang, T., Daubas, P., Hadchouel, J., Meilhac, S., Montarras, D., Rocancourt, D., and Relaix, F. (2003). The formation of skeletal muscle: from somite to limb. Journal of anatomy 202, 59-68.

Chal, J., Oginuma, M., Al Tanoury, Z., Gobert, B., Sumara, O., Hick, A., Bousson, F., Zidouni, Y., Mursch, C., Moncuquet, P., et al. (2015). Differentiation of pluripotent stem cells to muscle fiber to model Duchenne muscular dystrophy. Nat Biotechnol 33, 962-969.

Chambers, S. M., Fasano, C. A., Papapetrou, E. P., Tomishima, M., Sadelain, M., and Studer, L. (2009). Highly efficient neural. conversion of human ES and iPS cells by dual inhibition of SMAD signaling. Nat Biotechnol 27, 275-280.

Chapman, S. C., Brown, R., Lees, L., Schoenwolf, G. C., and Lumsden, A. (2004). Expression analysis of chick Wnt and frizzled genes and selected inhibitors in early chick patterning. Dev Dyn 229, 668-676.

Chapman, S. C., Schubert, F. R., Schoenwolf, G. C., and Lumsden, A. (2002). Analysis of spatial and temporal gene expression patterns in blastula and gastrula stage chick embryos. Developmental biology 245, 187-199.

Chong, J. J., Yang, X., Don, C. W., Minami, E., Liu, Y. W., Weyers, J. J., Mahoney, W. M., Van Biber, B., Cook, S. M., Palpant, N. J., et al. (2014). Human embryonic-stem-cell-derived cardiomyocytes regenerate non-human primate hearts. Nature 510, 273-277.

Dey, D., Bagarova, J., Hatsell, S. J., Armstrong, K. A., Huang, L., Ermann, J., Vonner, A. J., Shen, Y., Mohedas, A. H., Lee, A., et al. (2016). Two tissue-resident progenitor lineages drive distinct phenotypes of heterotopic ossification. Science translational medicine 8, 366ra163.

Fasano, C. A., Chambers, S. M., Lee, G., Tomishima, M. J., and Studer, L. (2010). Efficient derivation of functional floor plate tissue from human embryonic stem cells. Cell Stem Cell 6, 336-347.

Faure, S., de Santa Barbara, P., Roberts, D. J., and Whitman, M. (2002). Endogenous patterns of BMP signaling during early chick development. Developmental biology 244, 44-65.

Fomenou, M. D., Scaal, M., Stockdale, F. E., Christ, B., and Huang, R. (2005). Cells of all somitic compartments are determined with respect to segmental identity. Dev Dyn 233, 1386-1393.

Fukuta, M., Nakai, Y., Kirino, K., Nakagawa, M., Sekiguchi, K., Nagata, S., Matsumoto, Y., Yamamoto, T., Umeda, K., Heike, T., et al. (2014). Derivation of mesenchymal stromal cells from pluripotent stem cells through a neural crest lineage using small molecule compounds with defined media. PLOS One 9, e112291.

Galli, L. M., Willert, K., Nusse, R., Yablonka-Reuveni, Z., Nohno, T., Denetclaw, W., and Burrus, L. W. (2004). A proliferative role for Wnt-3a in chick somites. Developmental biology 269, 489-504.

Gouti, M., Delile, J., Stamataki, D., Wymeersch, F. J., Huang, Y., Kleinjung, J., Wilson, V., and Briscoe, J. (2017). A Gene Regulatory Network Balances Neural and Mesoderm Specification during Vertebrate Trunk Development. Developmental cell 41, 243-261 e247.

Hardy, K. M., Yatskievych, T. A., Konieczka, J., Bobbs, A. S., and Antin, P. B. (2011). FGF signalling through RAS/MAPK and PI3K pathways regulates cell movement and gene expression in the chicken primitive streak without affecting E-cadherin expression. BMC developmental biology 11, 20.

Hino, K., Horigome, K., Nishio, M., Komura, S., Nagata, S., Zhao, C., Jin, Y., Kawakami, K., Yamada, Y., Ohta, A., et al. (2017). Activin-A enhances mTOR signaling to promote aberrant chondrogenesis in fibrodysplasia ossificans progressiva. The Journal of clinical investigation 127, 3339-3352.

Hino, K., Ikeya, M., Horigome, K., Matsumoto, Y., Ebise, H., Nishio, M., Sekiguchi, K., Shibata, M., Nagata, S., Matsuda, S., et al. (2015). Neofunction of ACVR1 in fibrodysplasia ossificans progressiva. Proc Natl Acad Sci USA 112, 15438-15443.

Hirsinger, E., Duprez, D., Jouve, C., Malapert, P., Cooke, J., and Pourquie, O. (1997). Noggin acts downstream of Wnt and Sonic Hedgehog to antagonize BMP4 in avian somite patterning. Development 124, 4605-4614.

Hubaud, A., and Pourquie, O. (2014). Signalling dynamics in vertebrate segmentation. Nature reviews Molecular cell biology 15, 709-721.

Iimura, T., Yang, X., Weijer, C. J., and Pourquie, 0. (2007). Dual mode of paraxial mesoderm formation during chick gastrulation. Proc Natl Acad Sci USA 104, 2744-2749.

Ikeya, M., and Takada, S. (1998). Wnt signaling from the dorsal neural tube is required for the formation of the medial. dermomyotome. Development 125, 4969-4976.

Jiang, Y. J., Aerne, B. L., Smithers, L., Haddon, C., Ish-Horowicz, D., and Lewis, J. (2000). Notch signalling and the synchronization of the somite segmentation clock. Nature 408, 475-479.

Jouve, C., Iimura, T., and Pourquie, O. (2002). Onset of the segmentation clock in the chick embryo: evidence for oscillations in the somite precursors in the primitive streak. Development 129, 1107-1117.

Kam, R. K., Deng, Y., Chen, Y., and Zhao, H. (2012). Retinoic acid synthesis and functions in early embryonic development. Cell & bioscience 2, 11.

Koyanagi-Aoi, M., Ohnuki, M., Takahashi, K., Okita, K., Noma, H., Sawamura, Y., Teramoto, I., Narita, M., Sato, Y., Ichisaka, T., et al. (2013). Differentiation-defective phenotypes revealed by large-scale analyses of human pluripotent stem cells. Proc Natl Acad Sci USA 110, 20569-20574.

Lagha, M., Sato, T., Regnault, B., Cumano, A., Zuniga, A., Licht, J., Relaix, F., and Buckingham, M. (2010). Transcriptome analyses based on genetic screens for Pax3 myogenic targets in the mouse embryo. BMC genomics 11, 696.

Lee, J. Y., Zhou, Z., Taub, P. J., Ramcharan, M., Li, Y., Akinbiyi, T., Maharam, E. R., Leong, D. J., Laudier, D. M., Ruike, T., et al. (2011). BMP-12 treatment of adult mesenchymal stem cells in vitro augments tendon-like tissue formation and defect repair in vivo. PLOS One 6, e17531.

Loh, K. M., Chen, A., Koh, P. W., Deng, T. Z., Sinha, R., Tsai, J. M., Barkal, A. A., Shen, K. Y., Jain, R., Morganti, R. M., et al. (2016). Mapping the Pairwise Choices Leading from Pluripotency to Human Bone, Heart, and Other Mesoderm Cell. Types. Cell 166, 451-467.

Marcelle, C., Stark, M. R., and Bronner-Fraser, M. (1997). Coordinate actions of BMPs, Wnts, Shh and noggin mediate patterning of the dorsal somite. Development 124, 3955-3963.

Maretto, S., Cordenonsi, M., Dupont, S., Braghetta, P., Broccoli, V., Hassan, A. B., Volpin, D., Bressan, G. M., and Piccolo, S. (2003). Mapping Wnt/beta-catenin signaling during mouse development and in colorectal tumors. Proc Natl Acad Sci USA 100, 3299-3304.

Matsumoto, Y., Hayashi, Y., Schlieve, C. R., Ikeya, M., Kim, H., Nguyen, T. D., Sami, S., Baba, S., Barruet, E., Nasu, A., et al. (2013). Induced pluripotent stem cells from patients with human fibrodysplasia ossificans progressiva show increased mineralization and cartilage formation. Orphanet journal of rare diseases 8, 190.

Matsumoto, Y., Ikeya, M., Hino, K., Horigome, K., Fukuta, M., Watanabe, M., Nagata, S., Yamamoto, T., Otsuka, T., and Toguchida, J. (2015). New Protocol to Optimize iPS Cells for Genome Analysis of Fibrodysplasia Ossificans Progressiva. Stem Cells 33, 1730-1742.

Moriyama, A., Kii, I., Sunabori, T., Kurihara, S., Takayama, I., Shimazaki, M., Tanabe, H., Oginuma, M., Fukayama, M., Matsuzaki, Y., et al. (2007). GFP transgenic mice reveal active canonical Wnt signal in neonatal brain and in adult liver and spleen. Genesis 45, 90-100.

Nakagawa, M., Taniguchi, Y., Senda, S., Takizawa, N., Ichisaka, T., Asano, K., Morizane, A., Doi, D., Takahashi, J., Nishizawa, M., et al. (2014). A novel efficient feeder-free culture system for the derivation of human induced pluripotent stem cells. Sci. Rep 4, 3594.

Nimmagadda, S., Geetha Loganathan, P., Huang, R., Scaal, M., Schmidt, C., and Christ, B. (2005). BMP4 and noggin control. embryonic blood vessel formation by antagonistic regulation of VEGFR-2 (Quek1) expression. Developmental biology 280, 100-110.

Okita, K., Matsumura, Y., Sato, Y., Okada, A., Morizane, A., Okamoto, S., Hong, H., Nakagawa, M., Tanabe, K., Tezuka, K., et al. (2011). A more efficient method to generate integration-free human iPS cells. Nature methods 8, 409-412.

Orr-Urtreger, A., Bedford, M. T., Do, M. S., Eisenbach, L., and Lonai, P. (1992). Developmental expression of the alpha receptor for platelet-derived growth factor, which is deleted in the embryonic lethal Patch mutation. Development 115, 289-303.

Patwardhan, V., Gokhale, M., and Ghaskadbi, S. (2004). Acceleration of early chick embryo morphogenesis by insulin is associated with altered expression of embryonic genes. Int J Dev Biol 48, 319-326.

Pryce, B. A., Watson, S. S., Murchison, N. D., Staverosky, J. A., Dunker, N., and Schweitzer, R. (2009). Recruitment and maintenance of tendon progenitors by TGFbeta signaling are essential for tendon formation. Development 136, 1351-1361.

Rhinn, M., and Dolle, P. (2012). Retinoic acid signalling during development. Development 139, 843-858.

Sakurai, H., Inami, Y., Tamamura, Y., Yoshikai, T., Sehara-Fujisawa, A., and Isobe, K. (2009). Bidirectional induction toward paraxial mesodermal derivatives from mouse ES cells in chemically defined medium. Stem cell research 3, 157-169.

Sakurai, H., Sakaguchi, Y., Shoji, E., Nishino, T., Maki, I., Sakai, H., Hanaoka, K., Kakizuka, A., and Sehara-Fujisawa, A. (2012). In vitro modeling of paraxial mesodermal progenitors derived from induced pluripotent stem cells. PLOS One 7, e47078. Schwarting, T., Lechler, P., Struewer, J., Ambrock, M., Frangen, T. M., Ruchholtz, S., Ziring, E., and Frink, M. (2015). Bone morphogenetic protein 7 (BMP-7) influences tendon-bone integration in vitro. PLOS One 10, e0116833.

Sheng, G. (2015). The developmental basis of mesenchymal stem/stromal cells (MSCs). BMC developmental biology 15, 44.

Streit, A., and Stern, C. D. (1999). Establishment and maintenance of the border of the neural plate in the chick: involvement of FGF and BMP activity. Mechanisms of development 82, 51-66.

Sudheer, S., Liu, J., Marks, M., Koch, F., Anurin, A., Scholze, M., Senft, A. D., Wittler, L., Macura, K., Grote, P., et al. (2016). Different Concentrations of FGF Ligands, FGF2 or FGF8 Determine Distinct States of WNT-Induced Presomitic Mesoderm. Stem Cells 34, 1790-1800.

Sumi, T., Tsuneyoshi, N., Nakatsuji, N., and Suemori, H. (2008). Defining early lineage specification of human embryonic stem cells by the orchestrated balance of canonical Wnt/beta-catenin, Activin/Nodal and BMP signaling. Development 135, 2969-2979.

Tajbakhsh, S., Borello, U., Vivarelli, E., Kelly, R., Papkoff, J., Duprez, D., Buckingham, M., and Cossu, G. (1998). Differential activation of Myf5 and MyoD by different Wnts in explants of mouse paraxial mesoderm and the later activation of myogenesis in the absence of Myf5. Development 125, 4155-4162.

Takada, S., Stark, K. L., Shea, M. J., Vassileva, G., McMahon, J. A., and McMahon, A. P. (1994). Wnt-3a regulates somite and tailbud formation in the mouse embryo. Genes & development 8, 174-189.

Takahashi, K., Tanabe, K., Ohnuki, M., Narita, M., Ichisaka, T., Tomoda, K., and Yamanaka, S. (2007). Induction of pluripotent stem cells from adult human fibroblasts by defined factors. Cell 131, 861-872.

Takemoto, T., Uchikawa, M., Yoshida, M., Bell, D. M., Lovell-Badge, R., Papaioannou, V. E., and Kondoh, H. (2011). Tbx6-dependent Sox2 regulation determines neural or mesodermal fate in axial stem cells. Nature 470, 394-398.

Tanaka, A., Woltjen, K., Miyake, K., Hotta, A., Ikeya, M., Yamamoto, T., Nishino, T., Shoji, E., Sehara-Fujisawa, A., Manabe, Y., et al. (2013). Efficient and reproducible myogenic differentiation from human iPS cells: prospects for modeling Miyoshi Myopathy in vitro. PLOS One 8, e61540.

Thomson, J. A., Itskovitz-Eldor, J., Shapiro, S. S., Waknitz, M. A., Swiergiel, J. J., Marshall, V. S., and Jones, J. M. (1998). Embryonic stem cell lines derived from human blastocysts. Science (New York, NY) 282, 1145-1147.

Umeda, K., Zhao, J., Simmons, P., Stanley, E., Elefanty, A., and Nakayama, N. (2012). Human chondrogenic paraxial mesoderm, directed specification and prospective isolation from pluripotent stem cells. Sci Rep 2, 455.

Xi, H., Fujiwara, W., Gonzalez, K., Jan, M., Liebscher, S., Van Handel, B., Schenke-Layland, K., and Pyle, A. D. (2017). In Vivo Human Somitogenesis Guides Somite Development from hPSCs. Cell Rep 18, 1573-1585.

Yoshikawa, Y., Fujimori, T., McMahon, A. P., and Takada, S. (1997). Evidence that absence of Wnt-3a signaling promotes neuralization instead of paraxial mesoderm development in the mouse. Developmental biology 183, 234-242.

Zhao, J., Li, S., Trilok, S., Tanaka, M., Jokubaitis-Jameson, V., Wang, B., Niwa, H., and Nakayama, N. (2014). Small molecule-directed specification of sclerotome-like chondroprogenitors and induction of a somitic chondrogenesis program from embryonic stem cells. Development 141, 3848-3858.

What is claimed is:

1. A method of producing a syndetome cell, comprising the following steps:
    (a) obtaining a sclerotome cell;
    (b) culturing the sclerotome cell in a first medium comprising FGF and TGFβ to form a cell culture; and
    (c) culturing the cell culture obtained by the step (b) in a second medium comprising BMP and TGFβ.

2. The method according to claim 1, wherein FGF is FGF8.

3. The method according to claim 1, wherein BMP is BMP7.

4. The method according to claim 1, wherein TGFβ in both steps (b) and (c) is TGFβ3.

5. The method according to claim 1, wherein the step of obtaining a sclerotome cell comprises the following steps:
   obtaining a somite cell; and
   culturing the somite cell in a medium comprising a sonic hedgehog activator and a BMP inhibitor to obtain a sclerotome cell culture.

6. The method according to claim 5, wherein the step of obtaining a somite cell comprises the following steps:
   (1) providing a pluripotent stem cell;
   (2) culturing the pluripotent stem cell in a medium comprising a GSK3β inhibitor to obtain a presomitic mesoderm cell culture; and
   (3) culturing the presomitic mesoderm cell culture in a medium comprising a GSK3β inhibitor and a TGFβ inhibitor to obtain a somite cell culture.

7. The method according to claim 6, wherein the GSK3β inhibitor is CHIR99021.

8. The method according to claim 7, wherein the concentration of CHIR99021 in step (3) is 0.1 µM to 50 µM.

9. The method according to claim 6, wherein the TGFβ inhibitor is SB431542.

10. The method according to claim 6, wherein the culture period in step (2) is 1 to 7 days, and the culture period in step (3) is 1 to 7 days.

11. The method according to claim 6, wherein the pluripotent stem cell is a human pluripotent stem cell.

12. The method according to claim 1, wherein the culture period in step (b) is at least 1 day.

13. The method according to claim 1, wherein the culture period in step (c) is at least 4 days.

14. The method according to claim 2, wherein the concentration of FGF8 is 1 ng/ml to 50 ng/ml.

15. The method according to claim 3, wherein the concentration of BMP7 is 1 ng/ml to 50 ng/ml.

16. The method according to claim 4, wherein the concentration of TGFβ3 in each of steps (b) and (c) is 1 ng/ml to 50 ng/ml.

17. The method according to claim 1, wherein both steps (b) and (c) are performed under xeno-free conditions.

18. The method according to claim 6, wherein the pluripotent stem cell is an induced pluripotent stem cell.

* * * * *